(12) United States Patent
Bode et al.

(10) Patent No.: US 12,184,394 B2
(45) Date of Patent: Dec. 31, 2024

(54) UNIFIED ANALYTICS ENGINE

(71) Applicant: Atlas Space Operations, Inc., Traverse City, MI (US)

(72) Inventors: Brad Arnold Bode, Pacific Palisades, CA (US); Kyle Stephen Polich, Los Angeles, CA (US)

(73) Assignee: Atlas Space Operations, Inc., Traverse City, MI (US)

( * ) Notice: Subject to any disclaimer, the term of this patent is extended or adjusted under 35 U.S.C. 154(b) by 0 days.

(21) Appl. No.: 18/363,583

(22) Filed: Aug. 1, 2023

(65) Prior Publication Data

US 2024/0129027 A1    Apr. 18, 2024

Related U.S. Application Data

(60) Provisional application No. 63/394,222, filed on Aug. 1, 2022.

(51) Int. Cl.
  *H04B 7/185* (2006.01)
(52) U.S. Cl.
  CPC ..... *H04B 7/18519* (2013.01); *H04B 7/18517* (2013.01)
(58) Field of Classification Search
  CPC ............ H04B 7/18519; H04B 7/18517; H04B 7/185–18528
  See application file for complete search history.

(56) References Cited

U.S. PATENT DOCUMENTS

| | | | |
|---|---|---|---|
| 5,918,157 A | 6/1999 | Wiedeman et al. |
| 6,690,934 B1 | 2/2004 | Conrad, Jr. et al. |
| 8,639,182 B2 | 1/2014 | Moore, III |
| 9,059,784 B2 | 6/2015 | Enge et al. |

(Continued)

FOREIGN PATENT DOCUMENTS

| | | |
|---|---|---|
| CN | 103648132 A | 3/2014 |
| EP | 1031242 B1 | 8/2000 |

(Continued)

OTHER PUBLICATIONS

Bode, Corrected Notice of Allowability dated Sep. 22, 2020, directed to U.S. Appl. No. 16/290,734; 3 pages.

(Continued)

*Primary Examiner* — Syed Ali
*Assistant Examiner* — Najeeb Ansari
(74) *Attorney, Agent, or Firm* — Morrison & Foerster LLP

(57) ABSTRACT

The present application relates to techniques for proactively monitoring and detecting failures associated with downlinking data during satellite passes. In some embodiments, first data representing a performance of a hardware device during a satellite pass may be obtained and performance metrics may be computed based on the first data. Second data may be generated based on the performance metrics and a first machine learning model may be used to determine changepoints within the second data and times associated with each changepoint. A second machine learning model may be used to determine a likelihood that the satellite pass will be successful based on at least one of the quantity of changepoints or the times associated with each changepoint, and a quality of service (QoS) score of a client may be updated based on the likelihood.

20 Claims, 30 Drawing Sheets

(56) References Cited

U.S. PATENT DOCUMENTS

| | | |
|---|---|---|
| 10,225,000 B1 | 3/2019 | Chowdhury et al. |
| 10,659,148 B2 | 5/2020 | Trutna et al. |
| 11,463,158 B2 | 10/2022 | Devaraj |
| 11,488,046 B2 | 11/2022 | McCormick |
| 2003/0081582 A1 | 5/2003 | Jain et al. |
| 2004/0111465 A1 | 6/2004 | Chuang et al. |
| 2005/0037706 A1 | 2/2005 | Settle |
| 2006/0135058 A1 | 6/2006 | Karabinis |
| 2012/0131650 A1 | 5/2012 | Gutt et al. |
| 2013/0329630 A1 | 12/2013 | Becker |
| 2015/0215670 A1 | 7/2015 | Patel et al. |
| 2016/0037434 A1 | 2/2016 | Gopal et al. |
| 2018/0034536 A1 | 2/2018 | Trutna |
| 2018/0083741 A1 | 3/2018 | Motoyoshi |
| 2018/0098247 A1 | 4/2018 | Gopal et al. |
| 2018/0167136 A1 | 6/2018 | Eickhoff |
| 2018/0183855 A1 | 6/2018 | Sabella et al. |
| 2018/0198516 A1 | 7/2018 | Garcia et al. |
| 2018/0227272 A1 | 8/2018 | Zaruba et al. |
| 2018/0278323 A1 | 9/2018 | Trutna |
| 2018/0309507 A1 | 10/2018 | Vaughan |
| 2019/0121665 A1 | 4/2019 | Clancy |
| 2019/0253133 A1 | 8/2019 | Choquette |
| 2019/0313357 A1 | 10/2019 | Wang et al. |
| 2019/0377989 A1 | 12/2019 | Dizengof et al. |
| 2020/0007224 A1 | 1/2020 | Hawthorne et al. |
| 2020/0007414 A1 | 1/2020 | Smith et al. |
| 2020/0280366 A1 | 9/2020 | Bode |
| 2020/0380056 A1 | 12/2020 | Morris et al. |
| 2021/0044348 A1 | 2/2021 | Bode |
| 2021/0044350 A1 | 2/2021 | Karim |
| 2021/0126704 A1 | 4/2021 | McDaniel |
| 2021/0247519 A1 | 8/2021 | Reid |
| 2021/0263164 A1 | 8/2021 | Gunning |
| 2022/0038172 A1 | 2/2022 | Kargieman |
| 2022/0216911 A1 | 7/2022 | McDaniel |
| 2022/0329485 A1 | 10/2022 | McCormick |
| 2022/0360323 A1* | 11/2022 | Dooling ............ H04B 7/18519 |
| 2022/0360518 A1 | 11/2022 | McCormick et al. |
| 2022/0376777 A1 | 11/2022 | Bode et al. |
| 2023/0130388 A1 | 4/2023 | Reid |
| 2023/0412260 A1 | 12/2023 | Bode et al. |
| 2024/0056556 A1* | 2/2024 | Aoki ........................ G06T 1/00 |

FOREIGN PATENT DOCUMENTS

| | | |
|---|---|---|
| EP | 2779481 A1 | 9/2014 |
| JP | 2001-285170 A | 10/2001 |
| JP | 2001-522177 A | 11/2001 |
| JP | 2002-27009 A | 1/2002 |
| JP | 2018-530200 A | 10/2018 |
| KR | 10-2013-0129363 A | 11/2013 |
| KR | 10-2019-0116385 A | 10/2019 |
| WO | 99/22529 A1 | 5/1999 |
| WO | 2020/006160 A1 | 1/2020 |

OTHER PUBLICATIONS

Bode, U.S. Office Action dated Apr. 3, 2020, directed to U.S. Appl. No. 16/290,734; 8 pages.

Decision to Grant a Patent dated Jun. 30, 2023, directed to JP Application No. 2021-552242; 5 pages.

Extended European Search Report dated Oct. 17, 2022, directed to EP Application No. 20766418.6; 11 pages.

First Office Action dated Feb. 4, 2024, directed to CN Application No. 202080032184.3; 16 pages.

Hearing Notice dated Jan. 15, 2024, directed to IN Application No. 202147044702; 3 pages.

International Search Report and Written Opinion mailed Feb. 18, 2021, directed to International Application No. PCT/US2020/057381; 9 pages.

International Search Report and Written Opinion mailed Jun. 5, 2020, directed to International Application No. PCT/US2020/016988; 13 pages.

McDaniel, U.S. Office Action mailed Aug. 2, 2023, directed to U.S. Appl. No. 17/578,046; 7 pages.

McDaniel, U.S. Office Action mailed Feb. 15, 2023, directed to U.S. Appl. No. 17/578,046; 26 pages.

McDaniel, U.S. Office Action mailed Mar. 18, 2021, directed to U.S. Appl. No. 16/663,990; 25 pages.

Notice of Reasons for Refusal dated Dec. 20, 2022, directed to JP Application No. 2021-552242; 10 pages.

Office Action dated Apr. 8, 2022, directed to IN Application No. 202147044702; 6 pages.

Office Action dated Dec. 26, 2022, directed to SG Application No. 11202109558U; 8 pages.

Hu, P. (Dec. 2021). "Closing the Management Gap for Satellite-Integrated Community Networks: A Hierarchical Approach to Self-Maintenance," IEEE Communications Magazine 59(12):43-49.

International Search Report and Written Opinion mailed Apr. 15, 2024, directed to International Application No. PCT/US2023/071457; 18 pages Kodheli et al. (Oct. 2020). "Satellite Communications in the New Space Era: A Survey and Future Challenges," IEEE Communications Surveys & Tutorials, 23(1):70-109.

Vazquez et al. (Mar. 2021). "Machine Learning for Satellite Communications Operations," IEEE Communications Magazine 59(2):22-27.

* cited by examiner

```
1  { "taskId" : 40714, "accountId" : 17, "siteId" : 27, "siteName" : "AIB1", "siteInternalMetaData" : {}, "con
2  { "taskId" : 40695, "accountId" : 5,  "siteId" : 23, "siteName" : "CLD1", "siteInternalMetaData" : {}, "conf
3  { "taskId" : 40509, "accountId" : 17, "siteId" : 27, "siteName" : "AIB1", "siteInternalMetaData" : {}, "con
4  { "taskId" : 40510, "accountId" : 17, "siteId" : 27, "siteName" : "AIB1", "siteInternalMetaData" : {}, "con
5  { "taskId" : 40515, "accountId" : 17, "siteId" : 28, "siteName" : "CLD2", "siteInternalMetaData" : {}, "con
6  { "taskId" : 40516, "accountId" : 17, "siteId" : 28, "siteName" : "CLD2", "siteInternalMetaData" : {}, "con
7  { "taskId" : 40532, "accountId" : 17, "siteId" : 27, "siteName" : "AIB1", "siteInternalMetaData" : {}, "con
8  { "taskId" : 40707, "accountId" : 5,  "siteId" : 23, "siteName" : "CLD1", "siteInternalMetaData" : {}, "conf
9  { "taskId" : 40538, "accountId" : 17, "siteId" : 28, "siteName" : "CLD2", "siteInternalMetaData" : {}, "conf
10 { "taskId" : 40709, "accountId" : 5,  "siteId" : 23, "siteName" : "CLD1", "siteInternalMetaData" : {}, "conf
11 { "taskId" : 40711, "accountId" : 5,  "siteId" : 23, "siteName" : "CLD1", "siteInternalMetaData" : {}, "conf
12 { "taskId" : 40713, "accountId" : 5,  "siteId" : 23, "siteName" : "CLD1", "siteInternalMetaData" : {}, "con
13 { "taskId" : 40539, "accountId" : 17, "siteId" : 28, "siteName" : "CLD2", "siteInternalMetaData" : {}, "conf
14 { "taskId" : 40716, "accountId" : 5,  "siteId" : 23, "siteName" : "CLD1", "siteInternalMetaData" : {}, "conf
```

FIG. 2

```
 1  {"type": "site.hardware.modem.ttc.tx.modulator.bitrate", "collected": "2021-08-07T07:58:36.227Z", "value":
 2  {"type": "site.hardware.modem.commands.sent", "collected": "2021-08-07T07:58:36.227Z", "value": 0, "hardwa
 3  {"type": "site.hardware.modem.commands.buffer.depth", "collected": "2021-08-07T07:58:36.227Z", "value": 0,
 4  {"type": "site.hardware.modem.commands.received", "collected": "2021-08-07T07:58:36.227Z", "value": 0, "ha
 5  {"type": "site.hardware.digitizer.output.rate", "collected": "2021-08-07T07:58:36.227Z", "value": 64000.0,
 6  {"type": "site.hardware.modem.ttc.rx.demodulator.bitrate", "collected": "2021-08-07T07:58:36.227Z", "value"
 7  {"type": "site.hardware.modem.carrier.lock", "collected": "2021-08-07T07:58:36.227Z", "value": false, "har
 8  {"type": "site.hardware.modem.ebn0", "collected": "2021-08-07T07:58:36.227Z", "value": -7.4028706550598145,
 9  {"type": "site.hardware.modem.acquisition.range", "collected": "2021-08-07T07:58:36.227Z", "value": 200000.
10  {"type": "site.hardware.modem.carrier.power", "collected": "2021-08-07T07:58:36.227Z", "value": -100.061091
11  {"type": "site.hardware.modem.symbol.lock", "collected": "2021-08-07T07:58:36.227Z", "value": false, "hard
12  {"type": "site.hardware.modem.symbol.processing.rate", "collected": "2021-08-07T07:58:36.227Z", "value": 10
13  {"type": "site.hardware.modem.viterbi.lock", "collected": "2021-08-07T07:58:36.227Z", "value": false, "har
```

UNIFIED ANALYTICS ENGINE

CROSS-REFERENCE TO RELATED APPLICATION

This application claims the benefit of U.S. Provisional Application No. 63/394,222, filed Aug. 1, 2022, the entire contents of which is incorporated herein by reference.

GOVERNMENT SUPPORT

This invention was made with government support under Contract No. 80NSSC21C0145 awarded by NASA. The government has certain rights to the invention.

BACKGROUND

The number of satellites being sent into low earth orbit (LEO) or further orbital patterns has increased exponentially. Satellite owners and operators, which may be the same entity, create a schedule for contacting satellites using a custom scheduler. The schedule that is created indicates when a satellite operator can access an antenna of a satellite ground station to provide data to the satellites, monitor the health of the satellites, retrieve data from the satellite, or perform other tasks. Issues related to data retrieved from the satellite typically and/or the data retrieval process are not detected until after a satellite is no longer within communication range of a satellite ground station antenna. Thus, a satellite operator may have to wait until another scheduled satellite pass to obtain the data, losing precision time, revenue, and computing resources.

SUMMARY

The following is a non-exhaustive listing of some aspects of the present techniques. These and other aspects are described in the following disclosure.

In some embodiments, first data representing a performance of a hardware device during a satellite pass may be obtained. The hardware device may be configured to receive the first data from a satellite during the satellite pass. One or more performance metrics for the satellite pass may be computed based on the first data, and second data may be generated based on the one or more performance metrics. Using a first machine learning model, and based on the second data, a quantity of changepoints detected within the second data and times associated with each of the detected changepoints may be determined. Using a second machine learning model and based on at least one of the quantity of changepoints or the times associated with each of the detected changepoints, a likelihood that the satellite pass will be a successful satellite may be determined. A quality of service (QoS) score of a client may be updated based on the determined likelihood to obtain an updated QoS score of the client, where the QoS score of the client indicates a level of compliance associated with satellite constellation access programs provided to the client with respect to one or more satellite constellation access targets specified by the client, and where the updated QoS score is used to generate a satellite constellation access program for the client indicating a time interval that the client is authorized to access a satellite ground station to receive data from the satellite during a subsequent satellite pass.

Various other aspects, features, and advantages of the present application will be apparent through the detailed description and the drawings attached hereto. It is also to be understood that both the foregoing general description and the following detailed description are examples and not restrictive of the scope of the present application.

BRIEF DESCRIPTION OF THE DRAWINGS

The methods, systems, and programming described herein are further described in terms of exemplary embodiments. These exemplary embodiments are described in detail with reference to the drawings. These embodiments are non-limiting exemplary embodiments, in which like referenced numerals represent similar structures throughout several views of the drawings, and wherein:

FIGS. 2 and 3 are illustrative diagrams of exemplary data files, in accordance with various embodiments;

FIG. 25 is an illustrative user interface with which feedback may be provided for identifying successfully/unsuccessful satellite passes, in accordance with various embodiments;

DETAILED DESCRIPTION

Figure 1:
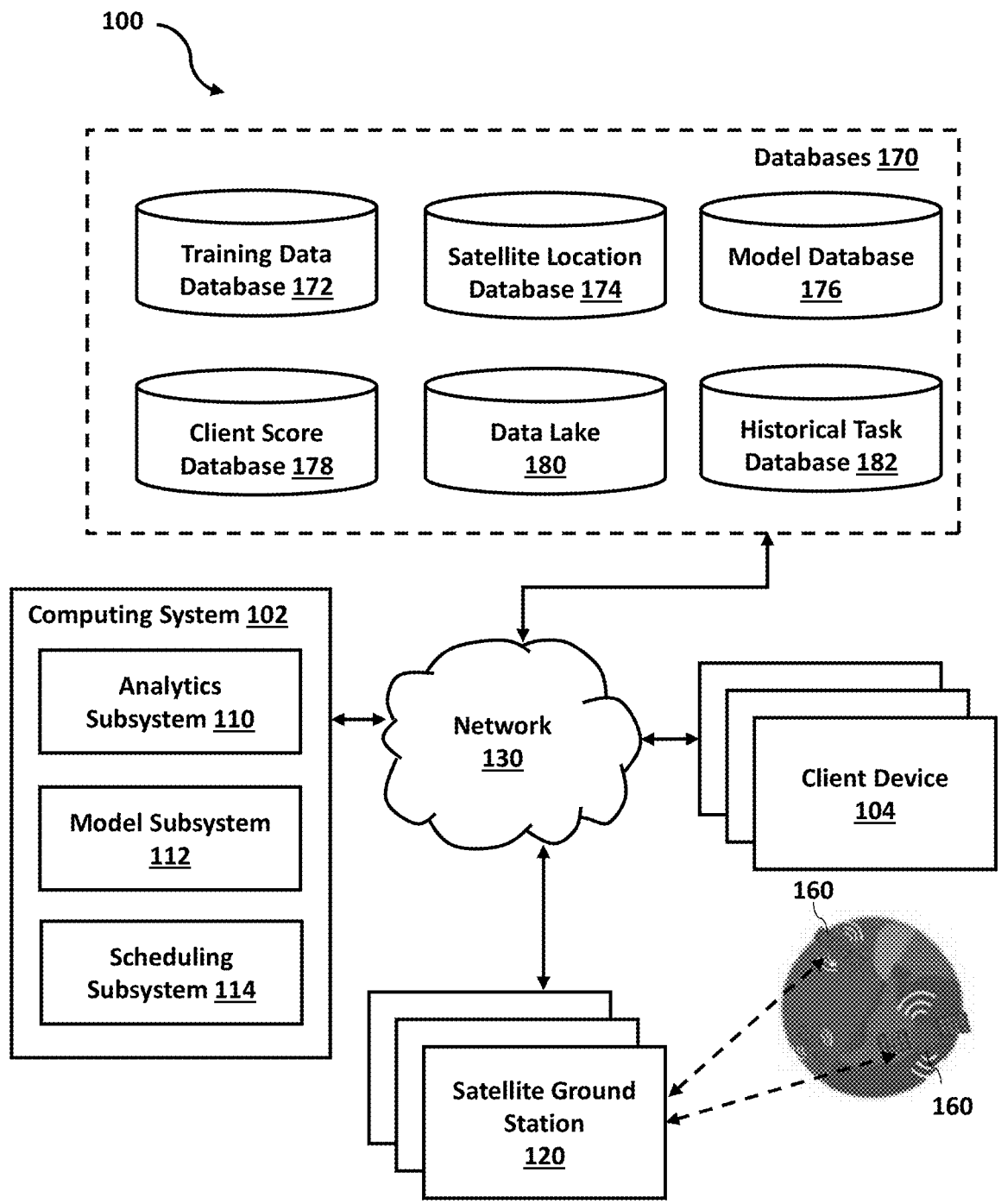
FIG. 1 is an illustrative diagram of an exemplary system for supporting a space-based communications network, in accordance with various embodiments.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Data signals transmitted from/to any of the thousands of satellites in orbit may be received by antennae, which is also referred to herein interchangeably as satellite ground station antennae, located on Earth. Such antennae may be part of a satellite dish. A satellite dish may include an antenna and can often be located at a "satellite ground station." A satellite ground station, as described herein, is a facility that includes one or more satellite dishes capable of communicating with one or more satellites in orbit. Satellite ground stations may also be referred to herein interchangeably as "ground stations" or "ground sites." Each satellite ground station may include hardware to control operations of the satellite ground station, the antenna, communications to and from the satellite ground station, data transmitted to/from the antenna, or perform other functions, or combinations thereof. One hardware component may be a communications device. For example, the communications device may be a satellite modem that receives data signals transmitted from a satellite to a satellite dish located at a satellite ground station. Another hardware component may be a digitizer, which refers to a device configured to transform data signals, such as those received from a satellite, into a digital format capable of being understood by a computing system. In some embodiments, the communications device, digitizer, or other hardware components, may be integrated into or communicatively coupled with one or more computing devices or systems.

In some embodiments, the communications device (e.g., a satellite modem) may be configured to transform received data signals into a format communicable by a client device. This may include converting data signals from a satellite associated with a space-based communications network to data signals understandable by one or more terrestrial-based communications networks. For example, a communications device may transform an input data signal including data encoded using one or more space-based communication protocols into a data signal including data encoded using one or more terrestrial-based communication protocols (e.g., IPv4).

In order for a client device to obtain data from a satellite and/or provide instructions to a satellite, the client device may connect to a communications device located at a satellite ground station whose satellite dish is able to communicate with the satellite. In some embodiments, a client device may be configured to connect to multiple communications devices each associated with a same or different satellite ground station in order to communicate with one or more satellites during each satellite's orbit. Furthermore, in some embodiments, a communications device may be configured to connect to and receive data signals from multiple satellites, each of which may be associated with a same or different space-based communications network.

A satellite may be part of a satellite constellation, which refers to a group of satellites that work together to provide coverage to a large portion of the globe. Here, "coverage" refers to the ability for various computing devices located within such a portion of the world (e.g., New York City and its surrounding counties) to connect with one another, one or more other systems, and/or one or more communications networks. Some satellite constellations provide services, such as Internet access, telephone, navigation, communications, or other services. For example, a satellite constellation may facilitate a space-based communications network and include a unique set of space-based communications protocols. In some embodiments, the satellites may be low earth orbit (LEO) satellites, which typically orbit at less than 2,000 kilometers above the Earth's surface. A satellite may transmit data signals to one or more satellite ground stations, which may receive the data signals via a corresponding satellite dish. Additional details related to satellite communications are described in U.S. Pat. No. 11,228,361, entitled "System and Method for Configuring a Communications Device for Space-Terrestrial Communications," which issued on Jan. 18, 2022, the disclosure of which is incorporated herein by reference in its entirety.

Throughout the course of a day, different satellite ground stations may be capable of receiving data signals from different satellites based on each satellite ground station's geographical location, positioning, elevation, atmospheric conditions, or other factors. In some embodiments, a database may store satellite positioning and orbital trajectories for various satellites, which may be computed in advance, so that a particular satellite ground station's computer system can determine when a particular satellite will be within communication range (e.g., line of sight) of one or more satellite dishes located at that satellite ground station. Additional details related to determining orbital paths of satellites, accounts that are authorized to access communications from satellites at different times, how to determine whether an account is authorized to access communications from a satellite, satellite ground stations that are capable of receiving/transmitting communications to/from satellites at the different times, and other aspects, are described in U.S. Pat. No. 10,841,000, entitled "System and Method for Authorizing Access in Satellite Communications," which issued on Nov. 17, 2020, the disclosure of which is incorporated herein by reference in its entirety.

A technical problem with existing space-based communications networks is the propensity for failures, mission burdens, network operations burden, or other events that cause poor performance for an end user with respect to the space-based communications network. Therefore, there is a need to reduce such burdens to optimize communications capabilities for user mission satellites and/or network infrastructures. Furthermore, there is a need for innovative approaches to increase mission science data return, improve resource efficiencies for government and private entity missions and communication networks, and ensure resilience in unpredictable space environments. In particular, there is a need for advances in space communication driven by onboard data processing and modern space networking capabilities. A technical problem, therefore, exists in that there is a lack of a unified cognitive scheduling system that can sense, detect, adapt, and learn from experience and environment to optimize the space-based communications networks capabilities, performance, and reliability.

Described herein are technical solutions for processing "big data" (e.g., petabyte scale) metrics and telemetry data related to space-based communications networks in a scalable manner, as well as facilitating automated machine learning based detection and alerting of potential system issues (e.g., such as connectivity issues). The technical solutions described herein provide a data processing engine that unifies six layers of service: (1) a data lake architecture; (2) a time series analysis framework; (3) feature engineering/data transformation procedures; (4) statistical modeling approaches; (5) machine learning pipeline and trained model; and (6) real-world use case examples. Technical effects of the technical solutions described herein include application of machine learning algorithms to optimize space communication networks, creating data-centric techniques that are responsive to quality of service (QoS) metrics, and other effects. The technical solutions can be applicable to space communications and ground stations on Earth.

Communications networks operate under a presumption that failures can and do occur. Thus, a goal of communications networks is to minimize the frequency and quantity of failures. In order to successfully operate a communications network, the communications network should be configured to provide tracking of metrics and telemetry data to obtain data for analysis and identification of possible failures. The metrics may be measured by a satellite and/or derived via from other directly measured metrics. Using the data transformations, representations of the metrics data may be generated, which can be input to various machine learning models to detect problems (e.g., system failures, connectivity issues, etc.). In some cases, the metrics may be measured by a hardware device, communications device, or computing system located at a satellite ground station having a satellite ground station antenna that is capable of communicating with the satellite. Based on the metrics, alerts and/or remediating actions can be performed to correct the issue before data loss occurs, or to preserve data that could otherwise be lost if the issue went undetected.

As mentioned above, the data can reach petabyte-levels. Therefore, due to the sheer volume and velocity with which the metrics data arrives, it is infeasible and impracticable for a human operator to continuously monitor the data. To handle the magnitude and velocity of input data, the present application describes a data pipeline and machine learning model that is configured to provide automated and proactive monitoring of satellite communication data. In some cases, automated and/or proactive monitoring may be provided as a service to a system's operator.

In some embodiments, the techniques described herein harness metrics associated with communications networks that are commonly computed for streaming data (where new metrics and observations are constantly being obtained), by introducing a data transformation layer to facilitate analytical queries against the transformed datasets for analyzing satellite-based communications networks. These analytics enable expedient problem detection, alert generation for investigating such problems, and, if possible, intervention to address the problem (such as an equipment inspection). Another technical effect of the technical solutions described herein is obtainment of improved data for input to data-centric scheduling systems that are responsive to quality of service metrics. An example data-centric scheduling systems, also referred to herein interchangeably as "cognitive schedulers" or "schedulers," is described in U.S. patent application Ser. No. 17/327,068, entitled "Satellite Contact Customization," filed May 21, 2021, which is incorporated herein by reference in its entirety. The techniques described herein, particularly, can improve the functionality of scheduling systems, such as those described in U.S. patent application Ser. No. 17/327,068, as the scheduling system (which is already capable of self-adapting when problems occur) can be automatically informed of potential problems prior to those problems even occurring and requiring adaptation.

The present application describes techniques for forming and using a unified analytics engine (UAE) capable of processing big data metrics and telemetry data in a scalable manner, as well as facilitating automated machine learning based detection and alerting of potential issues associated with a satellite communication system. The unified analytics engine may be packaged as a configurable software system that ingests raw data, and automatically processes and transforms that data for analytical purposes. The unified analytics engine may be configured to process time series data in a context-free way, which can allow new data sources to connect to the unified analytics engine and benefit from the existing software platform without requiring extensive configuration, equipment, or time. Thus, the unified analytics engine may be configured to optimize space communication networks. As seen below, historical use-cases are described to illustrate the unified analytics engine's capability to proactively discover issues that, conventionally, would only later be discovered. For instance, the issues may be detected after they arise, and may only be discovered using ad-hoc processes. Furthermore, the unified analytics engine may be scalable, and can leverage billions of data points collected from over tens of thousands of satellite downlinks.

Table 1 includes example values/metadata that may be used to generalize a client's goals for a satellite constellation access program indicating when the client is authorized to interact with a satellite communication network (e.g., connect to a satellite ground station, receive data signals from a satellite within the satellite communication network, transmit requests to the satellite including tasks to be performed, etc.). Some example goals include (i) the satellite communication network providing data/fulfilling requests/being accessible in a timely manner (e.g., with minimal delay), having capacity to handle the requests/traffic of the customer, and allowing for access at particular frequencies. In some embodiments, a number of metadata values may be reduced to minimize the computational complexity.

TABLE 1

| Source | Value | Reason/Use | Unit |
|---|---|---|---|
| Satellite | Satellite Buffer Limit | Inform how many task requests to submit | # of Task requests |
| Satellite | Satellite Current Buffer | Inform how many task requests to submit to reduce buffer to appropriate size. Must be updated post pass | # of Task requests |
| Satellite | Data Rate | Used to calculate the expected amount of data downlinked per minute, which feeds into the number of task requests required | Bytes/second |
| Ground System | Data Rate Min/Max | Used to calculate the expected amount of data downlinked per minute, which feeds into the number of task requests required | Bytes/second |

Technical Problems

Managing satellite constellations for downlinking data can be a time-consuming process. In addition, the management and downlink processes are often performed manually. These processes follow predefined procedures in order to obtain a satellite constellation access schedule that accommodates the needs of each client.

In addition, task requests submitted by clients are not able to be optimized because the scheduling systems are not aware of the end users' underlying goals. The scheduling systems are agnostic to the true intentions of the client and therefore it is difficult, if not impossible, to produce an optimized schedule.

Still further, existing scheduling systems and processes are unable to perform rapid scheduling and/or re-scheduling. For example, if there is a failed satellite pass, performing a re-scheduling process is difficult and labor intensive. Some reasons for this include such existing scheduling systems and processes having to potentially adjust each client's satellite constellation access program, negotiations with existing scheduling systems being manual and employing various file formats, and as mentioned above, the existing scheduling systems being unaware of a client's satellite constellation access targets.

Technical Solutions

Described herein are techniques for overcoming/addressing the aforementioned technical problems. For instance, a unified analytics engine and a machine learning architecture may be generated that is capable of extracting time series features using a real time inference framework, and which may be integrated into a downstream solution such as a scheduling system. Given the predictions of the inference framework, the scheduling system may leverage the predictions to perform various actions, including task deconfliction across multiple ground systems (e.g., satellite ground stations) for a large number of clients. As an example, the number of ground stations may be one or more, 10 or more, 100 or more, 1,000 or more, or other quantities. The number of requests received per day may be 10 or more, 100 or more, 1,000 or more, 100,000 or more, 1,000,000 or more, or other amounts. The scheduling system is configured to scale as the number of ground stations, and the number of requests received per day, increase, and the aforementioned are not to be construed as limiting. Additional details regarding the technical solutions are described below.

Technical Effects

The technical solutions described herein have various technical effects. For instance, the unified analytics engine described herein may be configured to examine ground network data and optimize a scheduling system that improves satellite constellation access programs, which may also be referred to interchangeably as "schedules," produced thereby. In some embodiments, metric data for every satellite contact (e.g., a communication device connecting to a satellite via a satellite ground station antenna) may be collected and analyzed to detect trends in ground station performance as well as identify whether the source of failed contacts is related to a particular ground station or stations, related to a particular satellite, related to a satellite constellation, or another component, or a combination thereof. Trends/patterns in the metric data may indicate an action or actions should be performed to reduce or eliminate failed operations in the satellite ground station's operations or the satellite's operations. This can enable satellite owners and/or ground station operators to modify technical operational parameters, business decisions, or other aspects. Furthermore, the unified analytics engine described herein provides a valuable feature that can be added to some existing scheduling systems to boost operational efficiency. Still further, the unified analytics engine can improve the efficiency and resiliency of a satellite communications network's infrastructure so that it can leverage the satellite communications network and a global hybrid network of satellite ground stations. The technical solutions may also provide a system capable of performing load balancing, acceleration of data pipelines, and scheduling management. In some embodiments, an automated process to reduce latency through system wide and cognitive approaches using user-defined "goals" and "constraints" for spacecraft constellations.

In some embodiments, metric data from a large network (e.g., 100 or more, 1,000 or more, 10,000 or more, 100,000 or more, 1,000,000 or more, etc.) of satellites and satellite ground stations may be obtained and stored. For example, for every satellite contact (e.g., transmitting a data signal to a satellite from a satellite ground station, receiving a data signal from a satellite at a satellite ground station, etc.), metric data may be obtained and stored. The metric data can be used to examine trends in ground station performance as well as discern whether the source of failed contacts is related to a ground station's systems or a spacecraft (e.g., satellite). The metric data is valuable to both ground station operators and satellite owners for making both technical and business decisions. Trends in metric data may indicate action that will preclude failed operations in either ground station systems or space systems.

FIG. 1 is an illustrative diagram of an exemplary system 100 for supporting a space-based communications network, in accordance with various embodiments. In some embodiments, system 100 may include computing system 102, one or more satellite ground stations 120, one or more client devices 104, databases 170, and satellites 160. Computing system 102, satellite ground stations 120, and client devices 104 may communicate with one another via network 130. Although a single instance of computing system 102 is represented within system 100, multiple instances of computing system 102 may be included, and the single instance of computing system 102 is to minimize obfuscation within FIG. 1.

Each of satellites 160 may be in low Earth orbit (e.g., at or less than 2,000 km above the Earth's surface), however some may be at greater distances (e.g., greater than 2,000 km). Depending on the particular distance from the Earth's surface, each of satellites 160 may have a different periodicity with which a complete orbit is made. Furthermore, the orbital path of each of satellites 160 may vary. In some embodiments, satellites 160 may form, or form part of, a satellite constellation. The satellite constellation may provide services to terrestrial-based devices. For example, the satellite constellation may provide navigation services to client device 104. However, other services may additionally or alternatively be provided (e.g., Internet services, telephone services, etc.).

Satellite ground station 120 may include one or more satellite dishes or receivers configured to detect data signals incoming from satellites in LEO (e.g., satellites 160), satellite not in LEO, or from another spacecraft. Depending on the line of sight with respect to the satellite ground station, different satellites may be capable of sending/receiving data signals to/from the satellite ground station. Similarly, depending on the line of sight of the satellite, different satellite ground stations may be capable of sending/receiving data signals to/from the satellite. Some satellites may have orbital trajectories that never coincide with a particular ground station's line of sight. Therefore, entities operating/ owning satellites, such as corporations, governments, and research facilities, may construct satellite ground stations at strategic locations so that their satellites will be accessible.

Network 130 may be a terrestrial-based communications network including one or more Internet Service Providers (ISPs). Each ISP may be operable to provide Internet services, telephonic services, and the like, to one or more client devices, such as client device 104. In some embodiments, network 130 may facilitate communications via one or more terrestrial-based communication protocols, such as those mentioned above (e.g., TCP/IP, HTTP, WebRTC, SIP, WAP, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

Client device 104 may be capable of sending and receiving data signals to/from other client devices via network 130 as well as, or alternatively, a space-based communications network (e.g., formed of satellites 160). Client device 104 may include one or more processors, memory, communications components, and/or additional components (e.g., display interfaces, input devices, etc.). Client device 104 may include any type of mobile terminal, fixed terminal, or other device. By way of example, client device 104 may include a desktop computer, a notebook computer, a tablet computer, a smartphone, a wearable device, or other client device. Users may, for instance, utilize client device 104 to interact with one another, one or more servers, or other components of system 100.

Computing system 102 may include one or more systems, subsystems, and/or engines. For example, computing system 102 may include an analytics subsystem 110, a model training subsystem 112, a scheduling subsystem 114, or other components. In some embodiments, the analytics subsystem may process data, generate data, run analytics, generate alerts, cause proactive or solutions-based actions, and the like. Computing system 102 may include one or more processors, memory, and communications components for interacting with different aspects of system 100. In some embodiments, computer program instructions may be stored within memory, and upon execution of the computer program instructions by the processors, operations related to some or all of analytics subsystem 110, model training subsystem 112, and/or scheduling subsystem 114 may be effectuated.

In some embodiments, system 100 may include databases 170. Databases 170, for example, may include a training data database 172, a satellite location database 174, a model database 176, a client score database 178, a data lake 180, a historical task database 182, or other storage systems. Training data database 172 may be configured to store training data, testing data, and the like, for use in training, updating, testing, and deploying one or more machine learning models. Satellite location database 174 may be configured to store satellite location information indicating an expected location of a given satellite or satellites at various times. Model database 176 may be configured to store machine learning models that have been trained or that are to be trained, re-trained, updated, and/or reset, and these machine learning models may then be retrieved for use by one or more components of system 100. Client score database 178 may be configured to store quality of service scores, or other performance metrics, related to a given client of system 100 (e.g., an end user may access services provided by satellite ground station 120 and/or computing system 102 via client device 104). In some embodiments, data lake 180 is a data repository configured to store a large amount of data in its native format. Each of databases 170 may be a single database or may be formed of multiple databases (e.g., in a distributed environment). Databases 170 may include cloud-based data repositories, as well as non-cloud-based storage devices (e.g., RAM, ROM, etc.).

Figure 4:
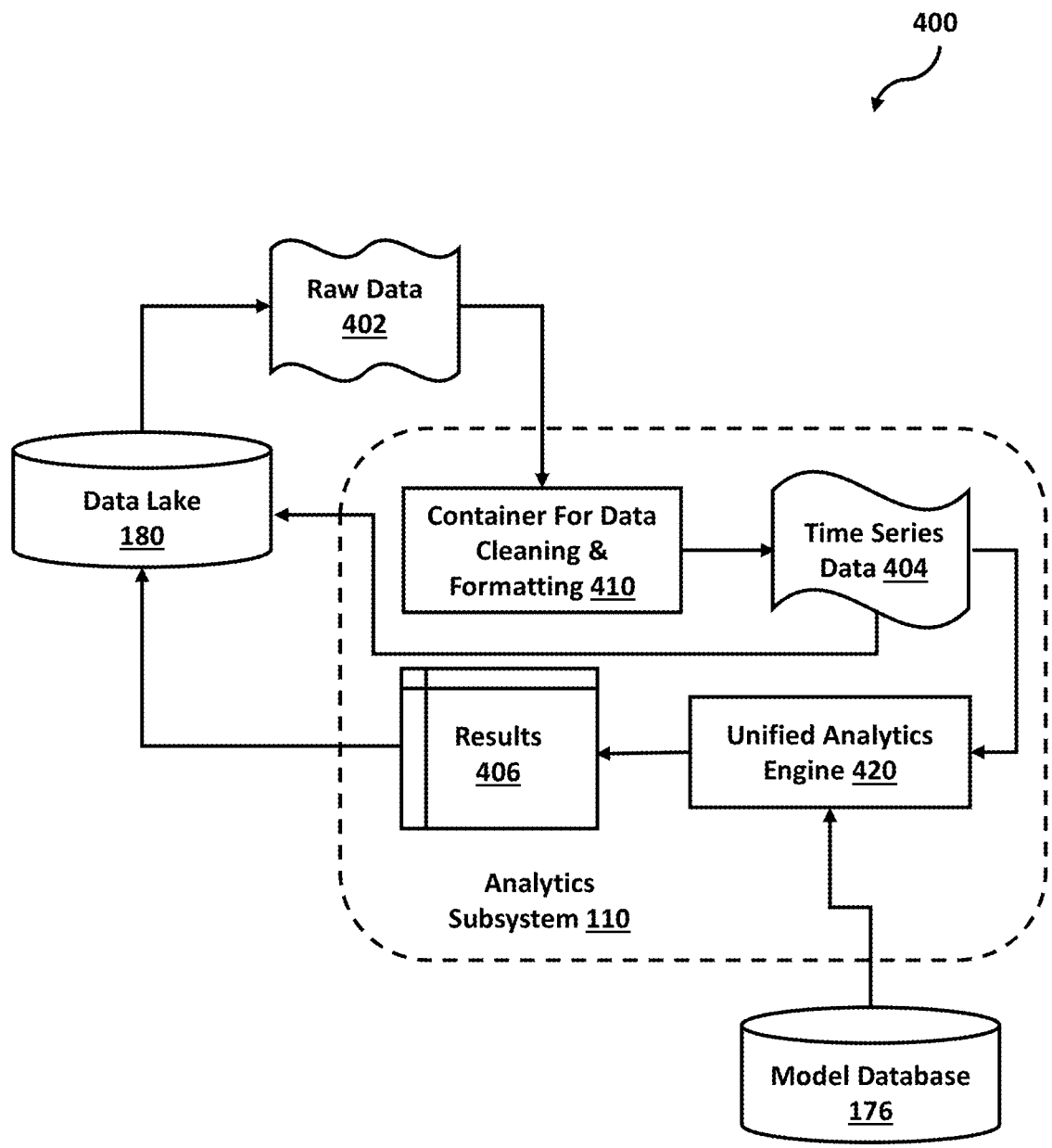
FIG. 4 is an illustrative diagram of an exemplary data pipeline, in accordance with various embodiments.

In some embodiments, a unified analytics engine may be generated that is configured to handle a large amount of data from many data sources and of many different formats with minimal processing to onboard new data metrics. Some embodiments include defining a common standard scheme. The unified analytics engine, as described in greater detail below with respect to FIG. 4, may be implemented via analytics subsystem 110 or may be accessed and used by analytics subsystem 110. To onboard new data metrics, the unified analytics system may perform one or more extract, transform, and load (ETL) processes. The ETL processes may move data from its "native" location to data lake 180. As an example, the data path may be defined as:

dataset/{category}/{subcategory}/{dataset_name}/dt={yyyy-mm-dd}/{filename}.{format}

In the example data path, "category" and "subcategory" may each be user defined labels. Furthermore, "dataset name" may refer to a collection of files each relating to a same data generating process; "dt={yyyy-mm-dd}" may refer to a partitioning format commonly that uses each day as a partitioning delimiter; and "filename" may refer to a unique identifier format (e.g., CSV file, a JSONL file, a Parquet file, etc.).

Example data paths to retrieve a given file or files include:
data set/tasks/dt=2021-02-03/ALL.jsonl
data set/ground-sites/site_1/site_1-config1/metrics/dt=2021-02-03/23485.jsonl In the first example, "ALL" indicates that, for a given day (e.g., 2021-02-03), all tasks may be included, with one json object per line. In the second example, per line, one metric per line is shown with the file identifier being a single task ID that would be found in the first example. In some embodiments, all of the files stored in data lake 180 may be of a same file format (e.g., all files may be JSONL files). However, the files stored in data lake 180 may be of alternative formats, or multiple file formats.

In some embodiments, a composite object may be generated for exporting all relevant task data. The reason for generating the composite object is that task information may be stored in various tables across one or more databases/repositories. A composite object refers to an object created from existing objects without transferring additional object data. The composite object has the same storage class as the source objects used to create it. Additionally, the composite object does not change if the source objects are replaced or deleted. Pseudocode of an example composite object is illustrated below.

```
public static class DatalakeTaskDate {
    Long taskID;
    Long accountID;
    Long siteID;
    String siteName;
    Map<String, String>siteInternalMetaData;
    Long configurationID;
    String configurationName;
    Map<String, String>configurationInternalMetaData;
    Long satelliteID;
    Instant start;
    Instant end;
```

```
SortedSet<TaskStatusChange>status;
Set<BandDetails>bands'
Map<String, String>internalMetaData;
}
```

Using a composite object, such as that described by the pseudocode above, can cause the system to retrieve a data file including tasks extracted from data lake 180 in the appropriate format. As an example, with reference to FIG. 2, data file 200 may include 14 tasks (e.g., labeled 1-14), which are extracted from data lake 180.

As seen in FIG. 2, when exporting metrics, the "collected" field refers to a timestamp of when the value was collected. This is needed to associate the value with performance. Pseudocode of an example script for extracting one metric per line for one task is detailed below. Furthermore, an example JSONL file 300 including one metric per line information is depicted in FIG. 3. In FIG. 3, each metric may specify a single value pulled from a piece of hardware.

```
class MetricBase {
    protected Long id;
    protected String valueType;
    private String type;
    private Instant collected;
    private String hardware;
    private String manufacturer;
    private String model;
    private Task;
```

After all of the data is exported in a unified format, the data pipeline may be formed. As an example, with reference to FIG. 4, data pipeline 400 may include aspects of system 100. For example, data pipeline 400 may include data lake 180, which may be configured to store raw data 402, cleaned/formatted versions of data 402, time series data 404, and/or results 406. In some embodiments, a scheduled docker container may be executed to perform data cleaning and formatting. For example, container 410 be configured to execute programming to extract raw data 402 from data lake 180, clean and format the data, and output cleaned (and formatted) data representing the raw data. In some embodiments, container 410 may be configured to generate structured time series data 404 from the cleaned and formatted version of data 402. In some embodiments, time series data 404 may be stored to a table within data lake 180, as seen, for example, with respect to FIG. 4, however time series data 404 may additionally or alternatively be stored in other storage systems, or combinations of storage systems. After time series data 404 is stored in the table (stored within data lake 180), time series data 404 can be used for analysis by unified analytics engine 420 based on its standardized format. Unified analytics engine 420, for example, may query time series data 404. In some embodiments, unified analytics engine 420 may run automatically (e.g., at a predefined cadence), manually, or both, and results 406 and/or reports representing results 406, may be stored in a results database (e.g., data lake 180).

Figure 5:
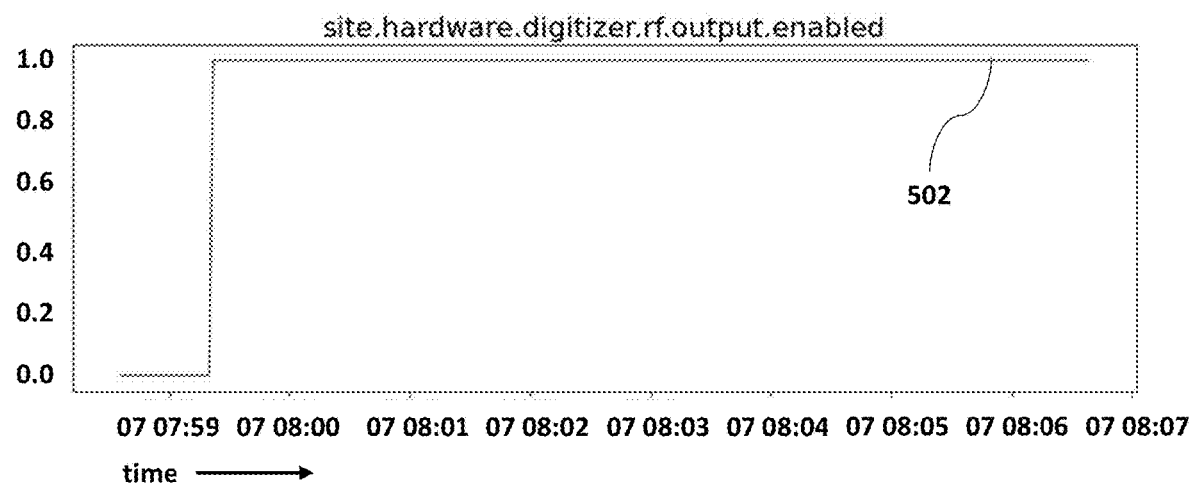
FIGS. 5 and 6 are illustrative plots of data signals for hardware devices located a satellite ground station, in accordance with various embodiments.
Figure 6:
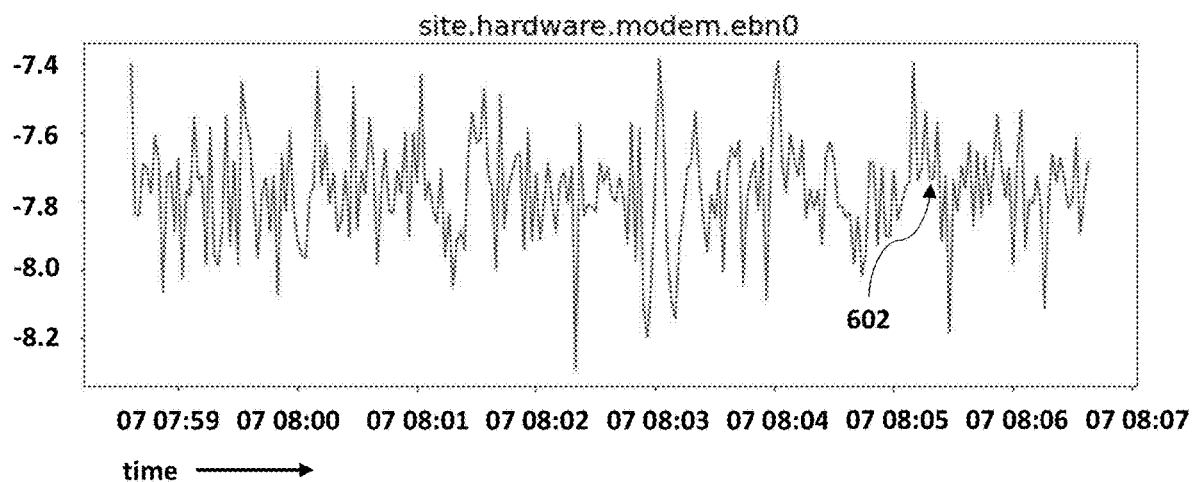

In some embodiments, unified analytics engine 420 may be configured to perform one or more different analyses to time series data 404. For example, a change point analysis, outlier detection, ARiMA, LSTMs, or other analyses, may be performed to time series data 404. These various analyses may be used to determine whether there is a signal or pattern that can algorithmically be extracted. As an example, with reference to FIG. 5, plot 500 depicts an example RF output from a digitizer located at a satellite ground station. At a time 07 07:59, plot 500 depicts that a signal 502 (e.g., the digitizer's RF output) changes from 0.0 to 1.0. In this example, the analysis is quick, as there is a single change-point and the signal is relatively free of noise. However, other cases may include signals that appear noisy but represent useful information. As an example, with reference to FIG. 6, plot 600 depicts a signal 602 of a communications device located at a satellite ground station (e.g., a satellite modem). Visually, signal 602 may appear noisy but may include algorithmically extractable information.

In some embodiments, feature engineering (e.g., a set of procedures used to transform or derive data from the raw data capable of being used as input to a machine learning model) may be performed to raw data 402, time series data 404, data derived from raw data 402 and/or time series data 404, or any other data. Some cases example data metrics may include "Pass Metrics" data and "Task Status Change" telemetry data. As an example, the obtained raw data (e.g., raw data 402) may take the following format:

[{'type': 'site.hardware.fep.overflow',
  'collected': '2021-05-10T00:17:10.015Z',
  'value': 0,
  'hardware': 'SOME-Modem',
  'manufacturer': 'Acme Institute',
  'model': '1.1' },
 {'type': 'site.hardware.fep.frames.packets.errors',
  'collected': '2021-05-10T00:17:10.015Z',
  'value': 0,
  'hardware': 'SOME-Modem',
  'manufacturer': 'Acme Institute',
  'model': '1.1' },
 . . .

Each item in the list (e.g., denoted via the 'type' label) represents an event. These events may first be routed based on their respective type. The time of collection and observed value may be used to define time series data 404 such that data pipeline 400 can transform the events into a sequential time series of data points.

The metrics include many different values. For simplicity, Table 4 describes an example whereby two metrics, "AZ" and "EL," are observed six (6) times. While the values for each metric at each observation can be useful, it may also be beneficial to transform the data into other values to derive additional insight. For example, Table 4 includes values for a maximum "AZ" and "EL," which are denoted by the "AZ Max" and "EL Max" columns, as well as values for a rolling mean average over a window size of two (2), which are denoted by the "AZ Mean 2" and "EL Mean 2" columns. Persons of ordinary skill in the art will recognize that any suitable number of metrics may be collected and/or derived. For example, 5 or more metrics, 10 or more metrics, 20 or more metrics, 50 or more metrics, 100 or more metrics, or other quantities, may be collected. The number of metrics collected may depend on the hardware at the satellite ground station, the satellite, or both. For some or all of the collected metrics, the unified analytics engine may be configured to perform a variety of different data transformations to generate a desired quantity of features. For example, from 15-25 metrics, approximately 200 features may be derived via data transformations of the collected metrics. These features may then be used as inputs to a machine learning model to derive information regarding a performance of satellite ground station 120 and/or satellite 160, facilitating dynamic adjustments to a satellite access schedule when needed.

TABLE 4

| timestamp | az | el | az_max | az_mean 2 | el_max | el_mean_2 |
|---|---|---|---|---|---|---|
| 1000 | 10 | 12 | 10 | 50 | 12 | 12 |
| 1001 | 20 | 11 | 20 | 15 | 12 | 11.5 |
| 1002 | 30 | 10 | 30 | 25 | 12 | 10.5 |
| 1003 | 35 | 9 | 35 | 32.5 | 12 | 9.5 |
| 1004 | 25 | 8 | 35 | 30 | 12 | 8.5 |
| 1005 | 5 | 7 | 35 | 15 | 12 | 7.5 |

In some embodiments, unified analytics engine 420 may include one or more post-processing steps allow for fast and direct queries of the pass data, related passes (e.g., a previous 5 passes from a same satellite or for a same ground station), and derived features. Therefore, the system is capable of performing data transformation and warehousing for fast accesses to idealized network data, metadata, and derived data for ad-hoc analysis and automated machine learning solutions. Features may be derived using various methodologies including statistical transformations (e.g., rolling mean), time series models (e.g., change point detection), modeling techniques (e.g., comparison with historical data to identify deviations), or other transformations, or combinations thereof.

Unified analytics engine may be configured to perform various analyses to metric data to extract knowledge which can be used to improve/optimize satellite network performance and stability. As an example, with respect to FIG. 7, unified analytics engine 420 may include a linear fit check system 700, a changepoint detection system 702, an outlier detection system 704, an azimuth/elevation monitoring system 706, a statistical analysis system 708, or other components. Unified analytics engine 420 may further be in communication with databases 170, such as, for example, model database 176 and data lake 180.

In some embodiments, linear fit check system 700 may be configured to perform a linear fit to metrics. Some metrics may be noisy and stochastic, while other metrics, such as the cumulative number of bytes processed by a hardware device, may be modeled using a linear function. For these features, linear fit check system 700 may be configured to compute a slope and offset for each time series. These features, (e.g., slope, offset), may be used as input to a machine learning model 710 to obtain insight into how well a particular hardware component is operating. For example, the slope and offset features may be used, as input, for machine learning model 710 configured to detect incorrect model configurations. In other cases, the linear kit check system 700 may also be configured to compute model parameters based on data for a linear or non-linear model with the intent of verifying the parameter values remain within a defined statistical expectation.

Figure 7:
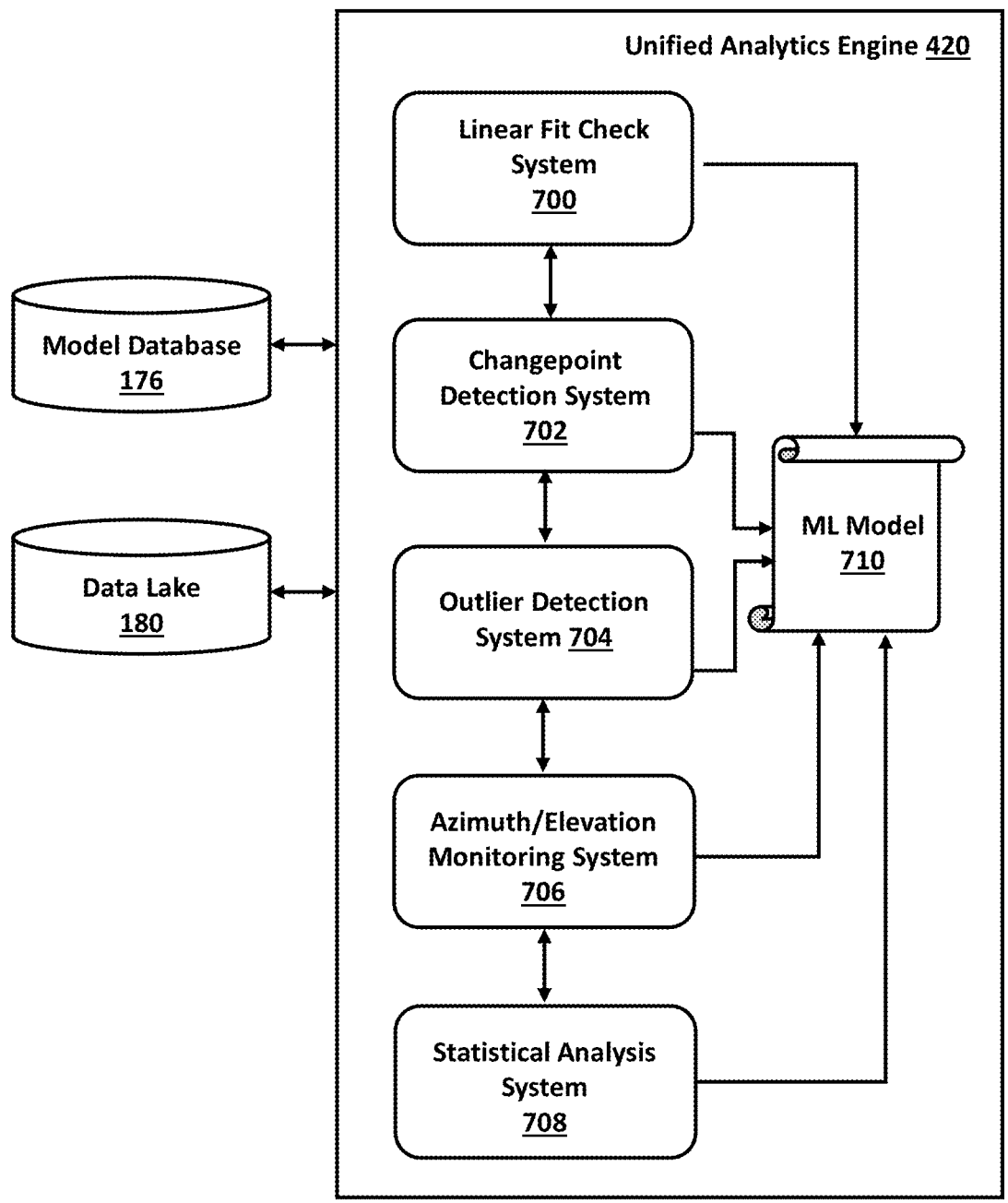
FIG. 7 is an illustrative diagram of a unified analytics engine, in accordance with various embodiments.

To avoid obfuscating aspects of FIG. 7, a single instance of ML model 710 is depicted. Some or all of linear fit check system 700, changepoint detection system 702, outlier detection system 704, and azimuth/elevation monitoring system 706 may use a same machine learning model or may each use a separate machine learning model configured to perform a separate task. For example, as mentioned above, linear fit check system 700 may implement a version of ML model 710, retrieved from model database 176, configured to analyze time series data 404 for certain features (e.g., slope, offset, etc.).

In some embodiments, changepoint detection system 702 may be further configured to analyze metrics for change points via machine learning model 710. Some embodiments include changepoint detection system 702 implementing a change point detection model as machine learning model 710. A changepoint detection model may be trained to estimate a number of changepoints included within time series data. A "change point" refers to an event in the dataset which causes a modal shift in the data generating process. For example, an idle computer which begins executing a computationally expensive task will see a change point in CPU consumption when the task is initialized. A changepoint detection model refers to a statistical model that determines whether time series data changes from an expected distribution. An example changepoint detection model is the Pruned Exact Linear Time (PELT) algorithm. However, additional or alternative changepoint detection models may be used to detect changepoints within time series data, including, but are not limited to, (which is not to imply that other lists are limiting), quadratic modeling, ARIMA modeling, SARIMA modeling, Holt-Winters modeling, Prophet modeling, AR-Net, LSTM, Theta modeling, or VAR modeling.

Figure 8:
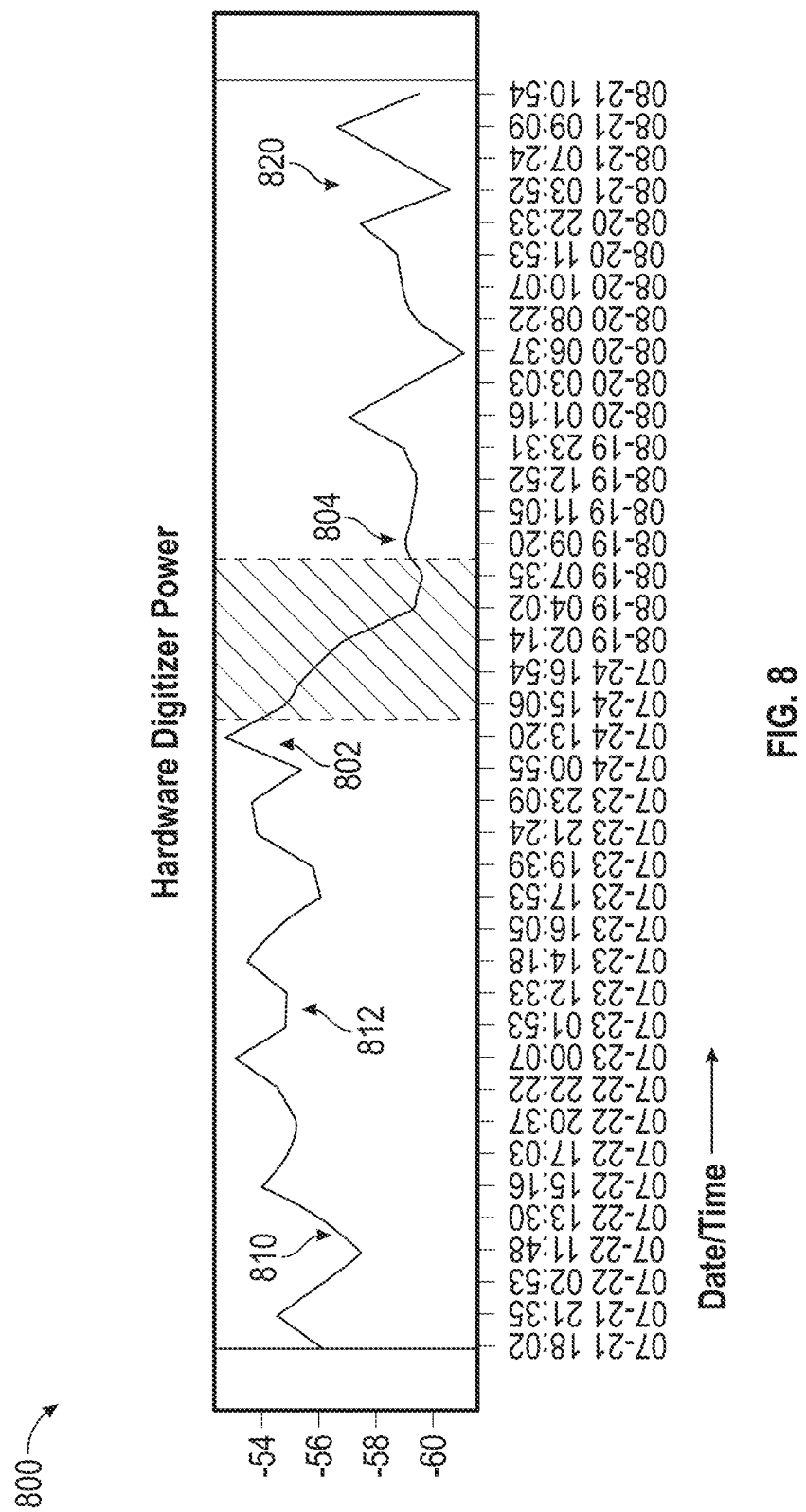
FIGS. 8-13 are illustrative plots of various data signals associated with a satellite pass, in accordance with various embodiments.

Using machine learning model 710 (e.g., a changepoint detection model), changepoint detection system 702 may be configured to identify a point (e.g., a time) at which a change was made to a satellite radio which caused the system, e.g., the satellite, the satellite ground station's hardware, or another system, to change power profiles in an otherwise unexpected way. For example, the power profile of data received at the satellite ground station, such as the amount of power detected by the satellite dish and corresponding hardware, may be caused to change. Additionally, the process can identify a point at which the "unexpected" power profile changes again back to an "expected" power profile. As an example, with reference to FIG. 8, changepoint detection system 702 may execute ML model 710, which may detect first changepoint 802 and second changepoint 804. For example, at first changepoint 802, a distribution of a power spectrum of the hardware device (e.g., a digitizer), which is described by signal 810, may change. ML model 710 (e.g., a changepoint detection model) may also detect second changepoint 804 occurring after first changepoint 802. After second changepoint 804, signal 810 may stabilize.

The PELT changepoint detection model, for example, detects change points by minimizing costs. The PELT changepoint detection model may be applied to an entire data set, and iteratively and independently into each partition until no more change points are identified. The PELT changepoint detection algorithm assumes that the number of change points increases linearly with the increase of data set. An advantage of the PELT changepoint detection model is that it is exact and is computationally linearly proportional to the number of data points.

In some cases, the PELT changepoint detection model operates by seeking to minimize Equation 1:

$$\sum_{i=1}^{m+1} [C(y_{\tau_{i-1}+1}, \ldots, y_{\tau_i}) + \beta], \qquad \text{Equation 1}$$

where C represents a cost function for the i-th segment, and $\beta$ is a penalty against overfitting. The optimal segmentation is represented via Equation 2:

$$F(n) = \left\{ \sum_{i=1}^{m+1} [C(y_{\tau_{i-1}+1}, \ldots, y_{\tau_i}) + \beta] \right\}. \qquad \text{Equation 2}$$

Equation 2 can be re-written as Equation 3:

$$F(n) = \{F(\tau_m) + C(y_{\tau_{i-1}+1}, \ldots, y_{\tau_i})\} \quad \text{Equation 3.}$$

Using Equation 3, values for F(1), F(2), ..., F(n) may be computed recursively. At each step, the optimal segmentation up to $\tau_{m+1}$ may be stored. After computing F(n), the optimal segmentation of the entire data set has been identified and the number and location in the dataset of the change points will be stored.

Figure 9:
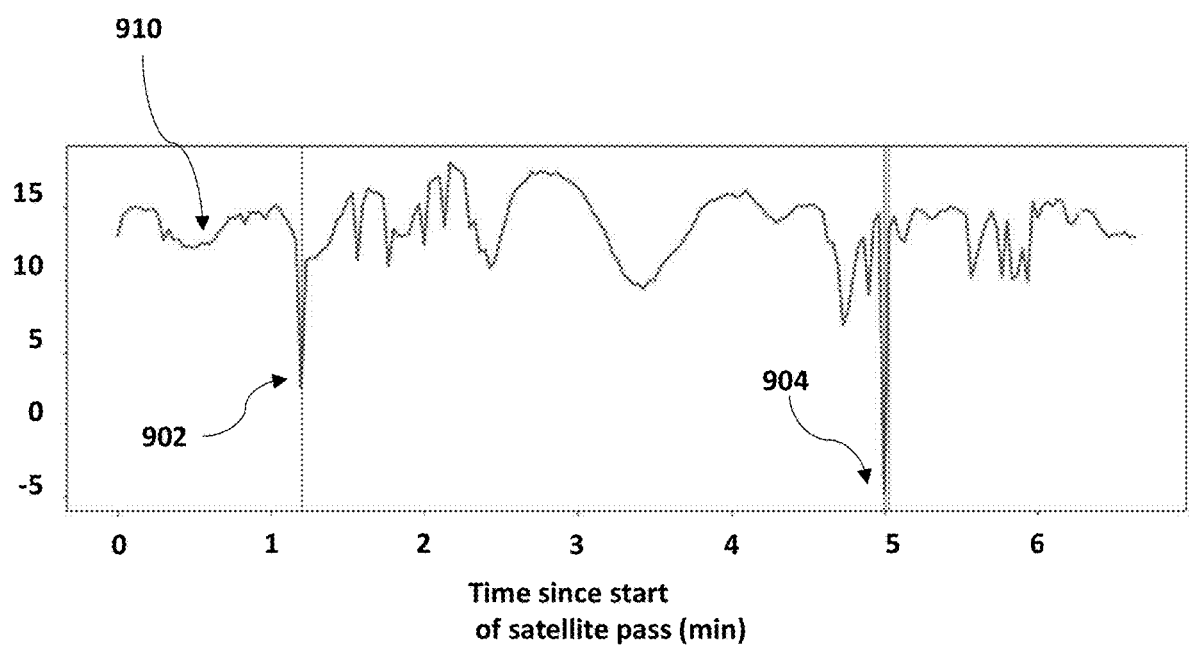

In some embodiments, outlier detection system 704 may be configured to analyze metrics for outliers. An outlier refers to a data point which, based on the other data points in the data set, does not fit. The outlier definition is defined mathematically for the given data set. Outlier detection system 704 may access machine learning model 710, which in some cases may be an outlier detection model. One example outlier detection model is the Copula-Based Outlier Detection (COPOD) model. The COPOD model describes the dependence structure between random variables. The COPOD model performs a plurality of mathematical processes to compute an outlier score for each row of data in a data set. First, the COPOD model includes, for each dimension in the data set, fitting a right and left tail empirical cumulative distribution function and computing a skewness coefficient. Next, using the fitted functions, a left tail empirical copula and a right tail empirical copula may be computed, followed by the skewness-corrected empirical copula values being computed for each row. Finally, an anomaly score for each row in the data set may be computed based on the computed values in the previous step. The anomaly score may be computed by summing, for each row, the negative log of the left tail empirical copula, the negative log of the right tail empirical copula, and the negative log of the skewness corrected empirical copula. As an example, with reference to FIG. 9, outlier detection system 704 may implement ML model 710 (e.g., such as the COPOD model) to detect a number of outliers included within signal 910. For instance, plot 900 depicts signal 910 including outliers 902 and 904, which are determined via ML model 710. In plot 900, first outlier 902 occurs just after 1 minute after the start of the satellite pass, while second outlier 904 occurs at approximately 5 minutes after the satellite pass began.

Outliers can be the result of measurement error, system failure, unexpected/problematic event, or for other reasons, or combinations of reasons. In some cases, the COPOD model may generate a large number of outliers. Therefore, additional outlier detection methods may be used to cross-check the results or be used instead of the COPOD model. Furthermore, outlier detection system 704 may produce improved results by tuning hyper-parameters and/or implementing custom normalization approaches. Despite the large number of false positives generated when calculating outliers from the available metrics, the count of outliers (i.e., the quantity of outliers detected) may be a novel feature that can be used as input for a machine learning model. For instance, outlier detection system 704 may be configured to compute a number of outliers detected by machine learning model 710 (e.g., a changepoint detection model). By providing a count of the number of outliers detected in a given metric, machine learning model 710, implemented by outlier detection system 704, may be configured to find a separation point between the background noise of false positives in comparison to the increased frequency that often occurs in cases of actual problems.

In some embodiments, azimuth/elevation monitoring system 706 may be configured to perform azimuthal and/or elevation checks. Azimuth and elevation are two measures that can identify a position of a satellite while in orbit. The azimuthal angle indicates a direction of a given satellite with respect to a reference point (e.g., the satellite ground station), while the elevation indications a "height" of the satellite in the sky.

Figure 10:
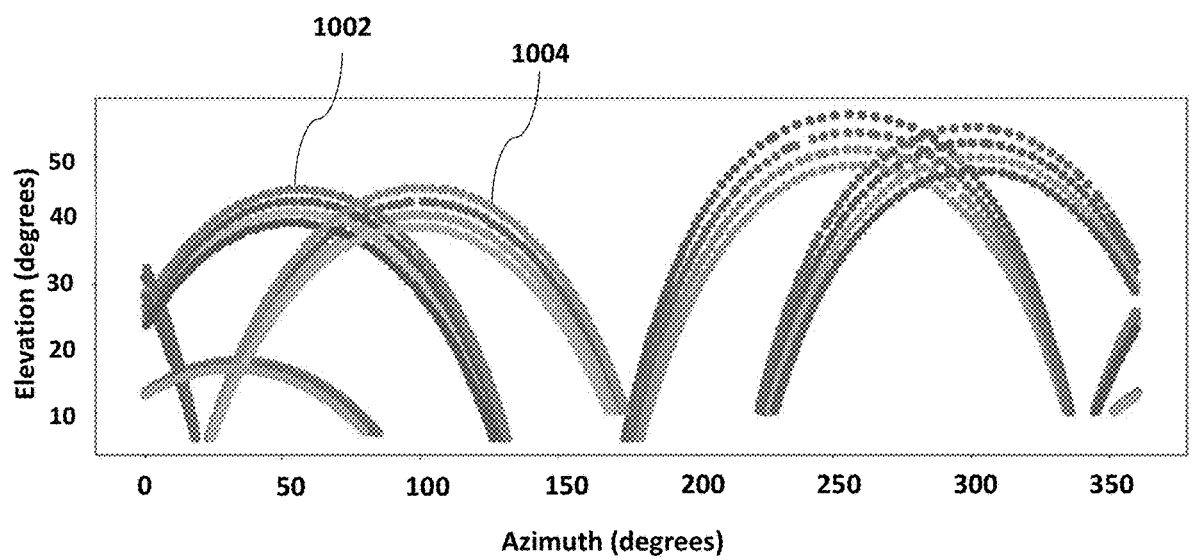

As an example, with reference to FIG. 10, plot 1000 depicts sets of data points. Each set represents a distinct satellite pass. For example, the data points forming curve 1002 represent a different satellite pass (which may be from the same satellite or a different satellite) than the data points forming curve 1004. Each data point represents an angle (measured in degrees) in azimuth and elevation. A satellite pass, as defined herein, describes a time period during which a satellite (or other spacecraft) is above a local horizon and available for radio communication with a particular satellite ground station (or hardware components at the satellite ground station). This time period is also referred to as when the satellite is in "communication range" of the satellite ground station. Each set of data points include discrete measurements, which implies that curves 1002 and 1004, and other curves represented within plot 1000, are continuous curves. From this insight, azimuth/elevation monitoring system 706 may determine whether the curves depicted within plot 1000 fit a standard parabola description, as represented by Equation 4:

$$EL = c_1(AZ)^2 + c_2 AZ + c_3 \quad \text{Equation 4.}$$

In Equation 4, EL represents the elevation, AZ represents the azimuthal angle, and $c_1$, $c_2$, and $c_3$ are coefficients that are computed by using machine learning model 710. For instance, machine learning model 710 may be configured to perform curve fitting using Equation 4 and the data points from each pass (e.g., the curves described within plot 1000). In some embodiments, azimuth/elevation monitoring system 706 may implement machine learning model 710 to detect errors associated with azimuth/elevations. For example, azimuth/elevation monitoring system 706 may implement an instance of machine learning model 710 that is configured to determine a best fit for a given curve and may compare each data point to the best fit to compute a root mean square error (RMS). The RMS for a given data point can indicate how significant the deviation of that data point is from the fitted model.

In some embodiments, unified analytics engine 420 may include statistical analysis system 708, which may be configured to answer ad-hoc queries as well as performing formal data analysis. Furthermore, unified analytics engine 420 may be configured to recognize issues in metric data without extensive training or an expert system. This can be done by noting that, when operating correctly, satellite ground stations 120 and satellites 160 that communicate therewith have consistent, reliable, and predictable behavior. Therefore, historical performance can be leveraged to measure mathematical deviations.

Figure 11:
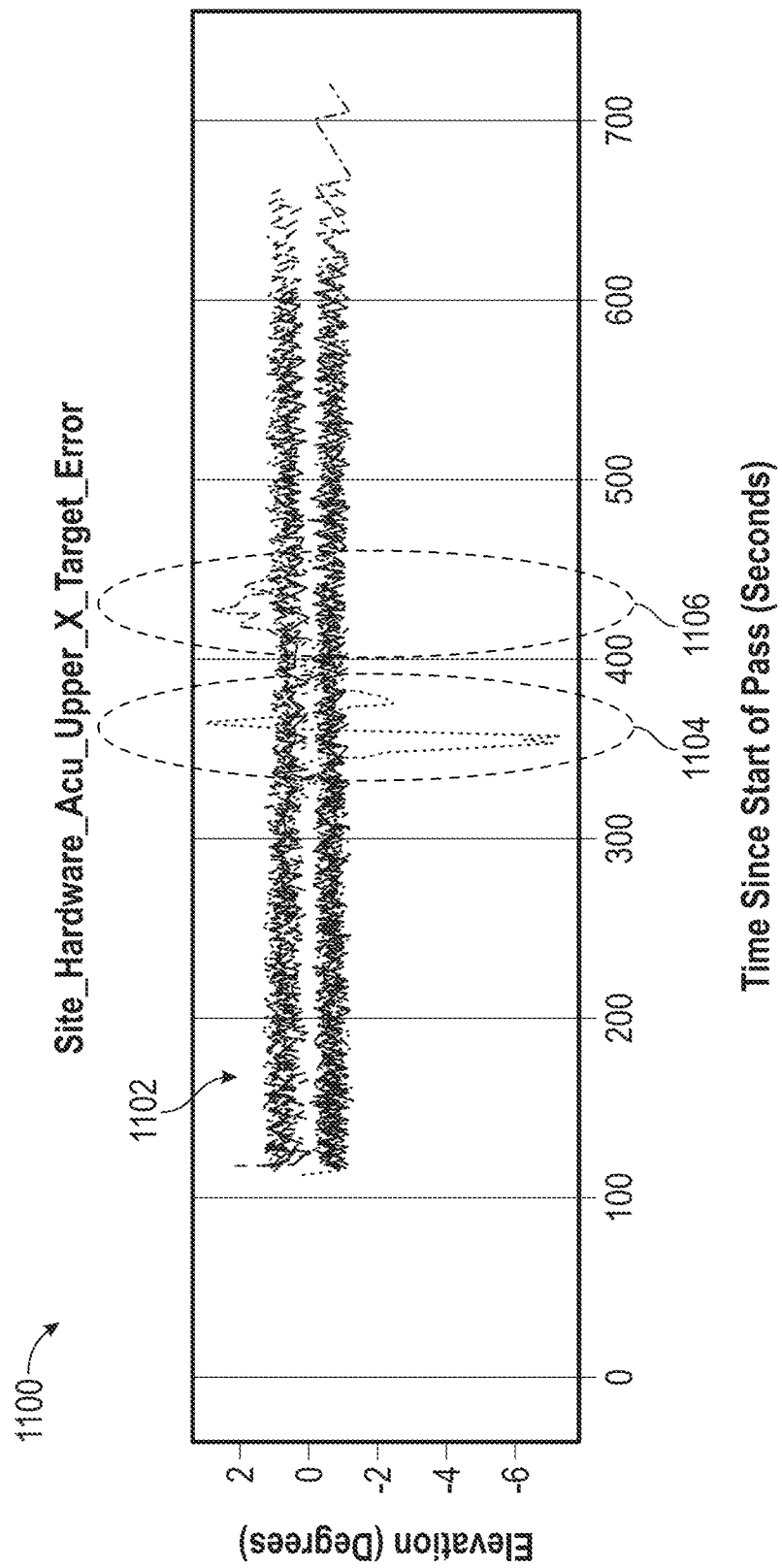

As an example, with reference to FIG. 11, plot 1100 depicts an example of an upper X target error for a satellite ground station's hardware device (e.g., an array control unit (ACU)) across ten (10) independent satellite passes from the same satellite over the same satellite ground station. Each series 1102 depicted within plot 1100 is relatively consistent for each satellite pass, outputting a relatively flat, low variance, data around one of two values (e.g., +1, −1). As seen by FIG. 11, statistical analysis system 708 may determine, using machine learning model 710, that series 1102 includes two deviations from the "normal behavior." For example, first deviation 1104 is detected to have occurred between 300-400 seconds. Second deviation 1106 may be detected as having occurred occurring slightly after 400 seconds. Plot 1100 indicates that an accuracy of the satellite ground station in pointing at the satellite was not accurate. This can be determined based on the difference between the pointing angle of where the satellite is predicted to be and where the antenna was actually pointed. An inaccurate directionality of the pointing angle of the satellite ground station may indicate that this particular satellite pass had anomalies. In some embodiments, if the same patterns are detected frequently, then there may be an issue related to the antenna's steering. Statistical analysis system 708 may be configured to detect the occurrence of the two deviations (e.g., deviations 1104, 1106) and/or other deviations, and generate/output an alert indicating that deviations 1104, 1106 have been detected. Furthermore, statistical analysis system 708 may, in response to generating/outputting the alert, may cause unified analytics engine 420 to cause a preventative action to be performed to avoid data loss or subsequent satellite communication errors from occurring.

Figure 12:
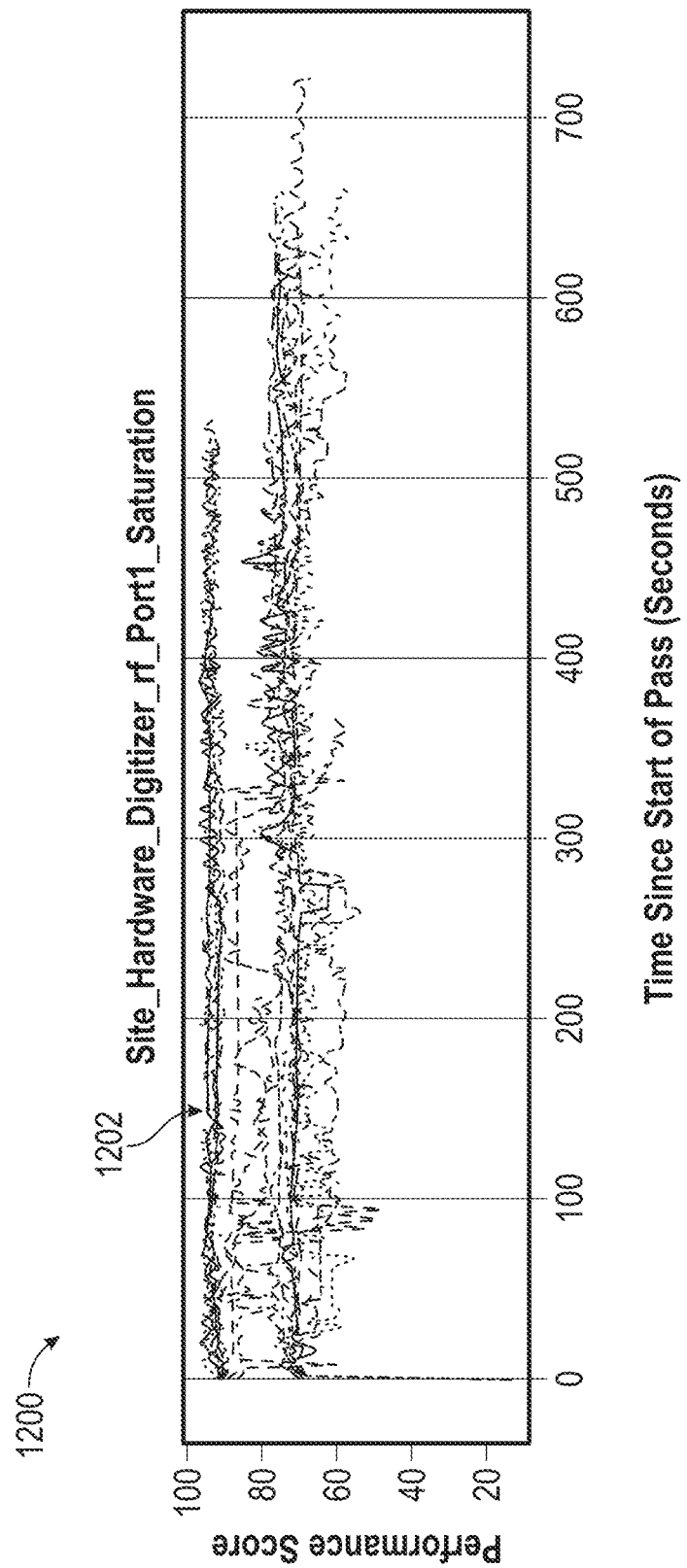

In FIG. 12, plot 1200 describes a summarization of a single metric for all satellite passes at a particular satellite ground station on a particular day. As can be seen by plot 1200, data 1202 is difficult to decipher in its raw form. Thus, statistical analysis system 708 may further be configured to a transform data 1202 into time series data (e.g., time series data 404), and/or leverage other insight/knowledge (e.g., comparisons to historical data) to determine whether the equipment is performing as it should. Through inspecting data 1202, it can be ascertained that there is no universal performance metric that indicates whether a given satellite pass is successful. It depends heavily on the client, spacecraft, and ground site combination. Thus, unified analytics engine 420 may focus on grouping "like with like" when looking at independent passes of the same spacecraft on the same ground site.

Figure 13:
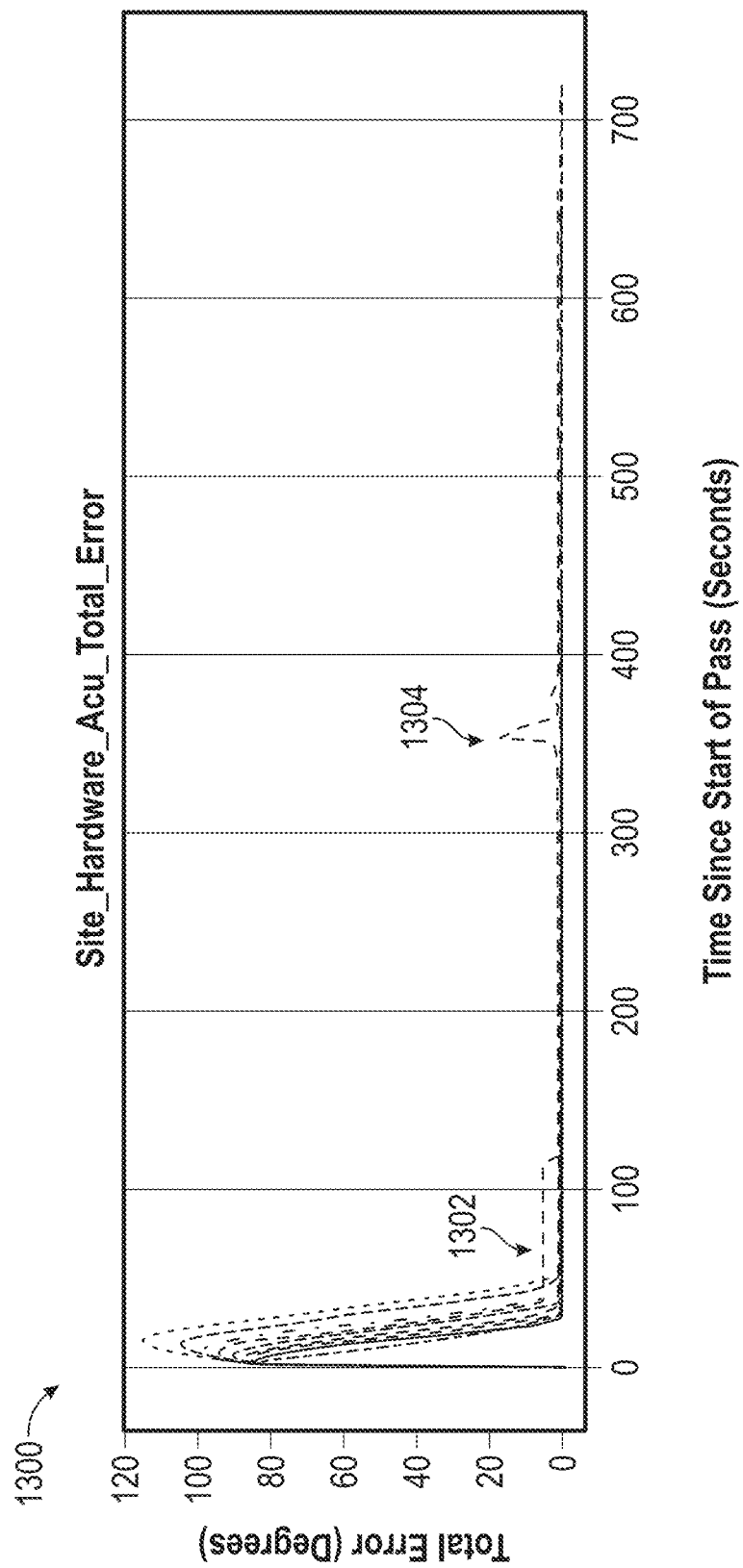

As an example, with reference to FIG. 13, plot 1300 depicts a total error detected for a hardware device (e.g., an array control unit) of a satellite ground station. Plot 1300 depicts several satellite passes, showing a fairly consistent behavior. However, at approximately 350 ms, statistical analysis system 708 may detect a natural variance in the data. Some embodiments include plot 1300 describing a total error in both azimuth and elevation of an antenna control unit (ACU) used to control a direction that the satellite dish, e.g., antenna, is steered. The error may indicate an extent with which the total error differs from the predicted angle of the satellite dish. In some embodiments, statistical analysis system 708 may implement machine learning model 710, which may be trained to detect (and possibly ignore) such natural variances and identify true deviations from the natural process. For example, statistical analysis system 708 may train an instance of machine learning model 710 to differentiate between variances in hardware device error totals. For instance, model 710 may use pulse shape discrimination techniques to characterize an "acceptable" shape of the total error for the hardware device during a satellite pass and may determine whether any portions of the pulse shape deviate from the expected shape.

In some embodiments, to determine whether a variance is natural or an anomaly associated with system and/or satellite error, statistical analysis system 708 may be configured to implement machine learning model 710, which may perform one or more metrics to compute how different the data (or a portion of the data) is to a historical reference. For example, statistical analysis system 708 may cause an instance of machine learning model 710 to execute operations to perform a Kolmogorov-Smirnov (K/S) test to the data. The K/S test is a metric used to determine whether two empirical distributions are sampled from the same data generation process. The K/S test compares the cumulative data and conducts a hypothesis test to determine if the distributions are likely to be from the same or different source. In some embodiments, statistical analysis system 708 may determine that, for the multiple satellite passes, machine learning model 710 identified two passes as being different from a historical reference distribution. For example, deviation 1304, detected by statistical analysis system 708, occurs around 350 seconds. Deviation 1302, however, is detected by statistical analysis system 708 based on its total error value staying non-zero for longer than the other passes (e.g., stays non-zero until approximately 120 seconds).

In some embodiments, unified analytics engine 420 may be configured to generate baseline data used to detect statistical anomalies within metric data. Unified analytics engine 420 may generate baseline data describing how a particular data metric behaves based on historical data. For example, one metric captured via an antenna located at a satellite ground station is a "frame length." When data is received from the Forward Error Processor (FEP), that data is generally frame synched. The frames are typically of one length; however, some embodiments include varying frame lengths. If a particular satellite is known to consistently have a particular frame length, such as based on prior satellite passes measuring frame length, then a satellite pass having a frame length differing from the normal frame length may indicate that an issue is present with the satellite, the satellite ground station hardware, software, or other component. Frame length typically remains relatively constant from satellite pass to satellite pass. Using this information, unified analytics engine 420 may implement a feature extraction and engineering process that leverages percentile analysis. This includes, for a given metric (e.g., frame length), unified analytics engine 420: obtaining all observed values during a given pass; for each pass, defining an "offset time," which begins at t=0 (e.g., a start of a satellite pass), so as to align all passes to a common time scale; eliminate a first amount of time (e.g., 30 seconds, 40 seconds, 60 seconds, or other values), as this time typically represents non-applicable set-up time; selecting an offset time at which most, if not all, passes (e.g., 80% of passes) have completed to trim the passes to be of uniform length; iterate through the oldest to newest normalized sets of time series data; for each iteration, compare "new" data to its "peer" data at the same offset time; and at common intervals (e.g., $25^{th}$, $50^{th}$, $75^{th}$ percentiles), measure and store the ordered rank of new data. The amount of time that is eliminated may correspond to time from a beginning of a satellite pass (e.g., a first 30 seconds), an end of a satellite pass (e.g., a last 30 seconds), or another time interval (e.g., times 1:30-2:00), or combinations thereof. In some embodiments, metric data (which may be used compute a particular performance metric) may begin to be recorded just prior to a satellite pass beginning. For example, if a satellite pass is expected to begin at time T, then at some time (T-t), computing system 102 may begin recording data. As an example, antenna positioning information, indicating a position of a satellite dish (such as a location in the sky that the satellite dish is to be pointed to receive data from the satellite) may begin to record just prior to the satellite pass beginning.

Some embodiments include determining whether a particular satellite pass is "similar" to another satellite pass of a same or different satellite. Some embodiments include measuring how similar two satellite passes are. Unified analytics engine 420 may be configured to classify two satellite passes as being "similar" if a measure of similarity, which can be computed by comparing a performance metric of the satellite passes, is less than a threshold similarity score. For example, comparing pass 1 and pass 2, the measure of similarity may be computed by comparing a performance metric of pass 1 with the performance metric for pass 2, and determining if the difference between the computed performance metrics is less than a threshold value. Unified analytics engine 420 may therefore be configured to proactively detect anomalies within data that is infeasible, if not impossible, for a human operator to review for all possible anomalies.

Figure 14:
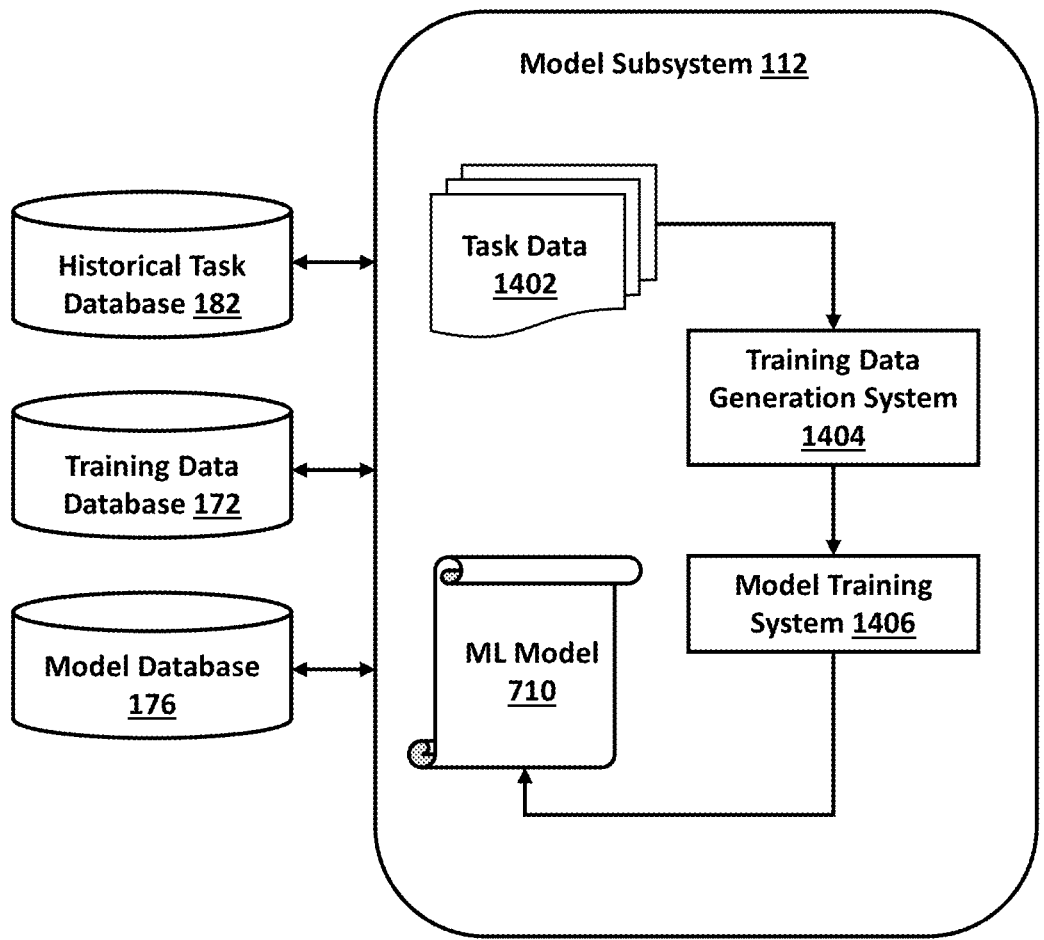
FIG. 14 is an illustrative diagram of an example model subsystem, in accordance with various embodiments.

In some embodiments, model subsystem 112 may be configured to generate training data for training a machine learning model, train a machine learning model based on the training data, or perform other actions. As an example, with reference to FIG. 14, model subsystem 112 may include a training data generation system 1404 and a model training system 1406. Training data generation system 1404 may be configured to obtain historical data related to all scheduled tasks. For example, model subsystem 112 may extract task data 1402 from historical task database 182. A task can have a binary "success" or "failure" state. In some embodiments, task data 1402 represents tasks which may be stored with a bit value of 0 or 1 to indicate whether the given task was classified as successful or unsuccessful. Model training system 1406 may be configured to train a machine learning model, such as machine learning model 710, based on the generated training data. Furthermore, because the tasks each include an indicator of whether the task was successful or unsuccessful, the tasks can be used as an objective variable for a machine learning classification problem.

Figure 15:
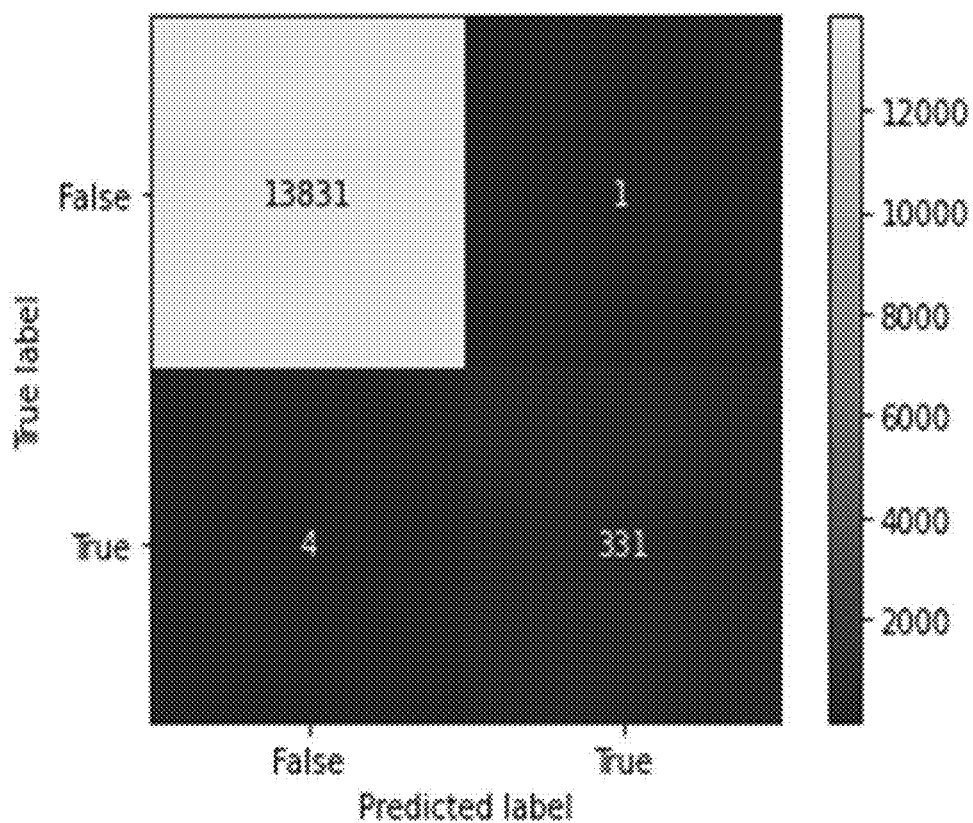
FIG. 15 is an example confusion matrix describing an accuracy of a machine learning model, in accordance with various embodiments.

In some embodiments, training data generation system 1404 may further be configured to perform the data transformation and feature engineering approaches described to produce a set of data points stored as a feature vector. In some embodiments, the feature vectors may be stored in training data database 172 for training of machine learning model 710. Each feature vector may be for a given satellite pass. In some embodiments, the training data used to train machine learning model 710 may include datasets of some or all of the feature vectors obtained and stored in historical task database 182. The machine learning model may use an optimization function (e.g., a gradient boosted trees algorithm) to train the machine learning model to predict whether a given satellite pass will be successful. As an example, with reference to FIG. 15, confusion matrix 1500 provides a visualization of the comparison between machine learning model's prediction and the true result. In the example, the label indicating whether a given pass was successful or unsuccessful may be withheld during the training process. In other words, model training system 1406 may train machine learning model 710 using training data that masks the result of a given satellite pass (for example, a flag indicating whether a satellite pass was successful or unsuccessful may be masked). The machine learning model then may predict a value "Is_Error," which is true only when an error occurred. For instance, Is_Error=True indicates that the machine learning model predicts that the satellite pass has an error, while Is_Error=False indicates that the machine learning model predicts that the satellite pass does not have an error (which is preferred from an operations standpoint). In some embodiments, model training system 1406 may use a gradient boosted trees model, such as XGBoost, to train a machine learning model to predict whether the given satellite pass will be successful. As an example, as seen by FIG. 15, the upper left quadrant of confusion matrix 1500 represents satellite passes that machine learning model 710 correctly predicted as being free of error, and the lower right quadrant of confusion matrix 1500 represents satellite passes that machine learning model 710 correctly predicted as having an error. The off-diagonal quadrants of confusion matrix 1500 represent false positives (upper right quadrant) and false negatives (lower left quadrant). False positives refer to instances where machine learning model 710 believes an error has occurred and raises an alert, whereas false negatives refer to instances where machine learning model 710 believes that no error occurred when, in actuality, an error had occurred. As evident from confusion matrix 1500, the number of false positives and false negatives are negligible when compared to the number of correctly predicted satellite passes (e.g., almost a 100% accuracy rating).

Figure 16:
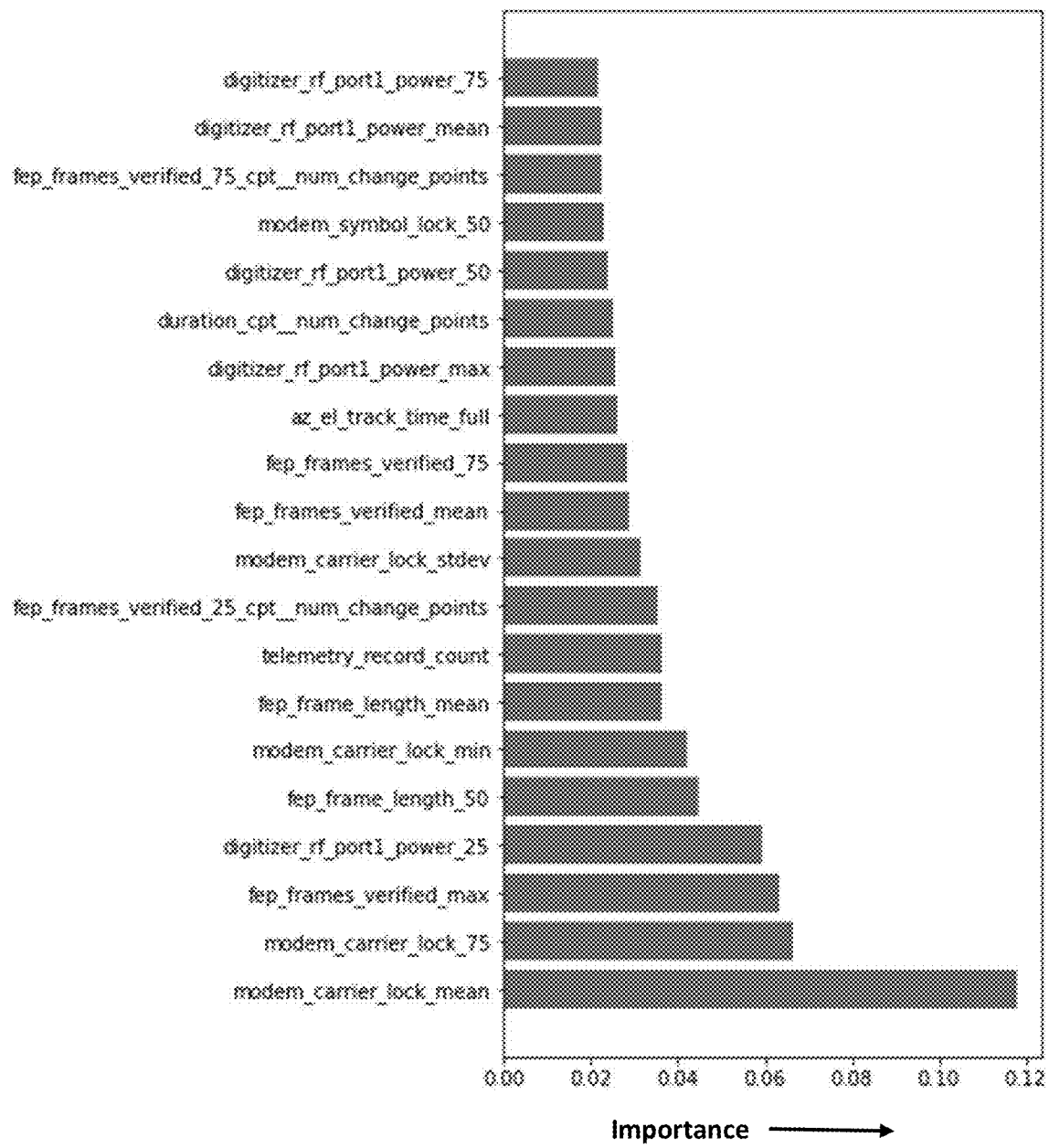
FIG. 16 is an example chart of various features that may be used/engineered for use by a machine learning model, in accordance with various embodiments.

FIG. 16 illustrates a plot 1600 of various features that can be used as input to a machine learning model and an importance of each feature. Using plot 1600, model training subsystem 112 can determine which features impact the model's output more than others and, in particular, whether the machine learning model is overfitting to a small subset of the features. In some embodiments, modeling subsystem 112 may implement a relevancy model to compute the importance/impact of a given feature. For example, modeling subsystem 112 may use a principle component analysis (PCA) model to determine a relevancy of a feature. In some cases, modeling subsystem 112 may determine whether the relevancy (e.g., determined via the relevancy model) is greater than a threshold relevancy score. The threshold relevancy score may indicate a feature is too impactful on the machine learning model's output. Using this information, modeling subsystem 112 may determine different features to be selected, weights to be applied to a feature, or other techniques to be used to reduce an impact of the given feature on the machine learning model's output. However, in some cases, no modifications may be made to the features impact on the model's output.

The trained machine learning model produced by modeling subsystem 112, which may also be referred to interchangeably herein as a "pass error classifier" or "satellite pass error classifier," may be stored in model database 176, and may be accessed when needed by unified analytics engine 420 to analyze data. In some cases, modeling subsystem 112 may further be configured to determine an accuracy of the machine learning model as well as an F1 score to determine how well the model performs. As an example, modeling subsystem 112 may determine that machine learning model 710, which is trained to determine whether a satellite pass error occurred, has an F1 score of 0.9925 and an accuracy score of 0.9996. These values indicate that machine learning model 710 works well to detect and identify most errors that occur in association with satellite passes.

Example Use Cases

Unified analytics engine 420 may use trained machine learning model 710 to analyze a set of real-world use cases. The example use cases are illustrative, and the trained machine learning model may be used for other situations and scenarios.

Use Case 1—Antenna does not Steer

Figure 17A:
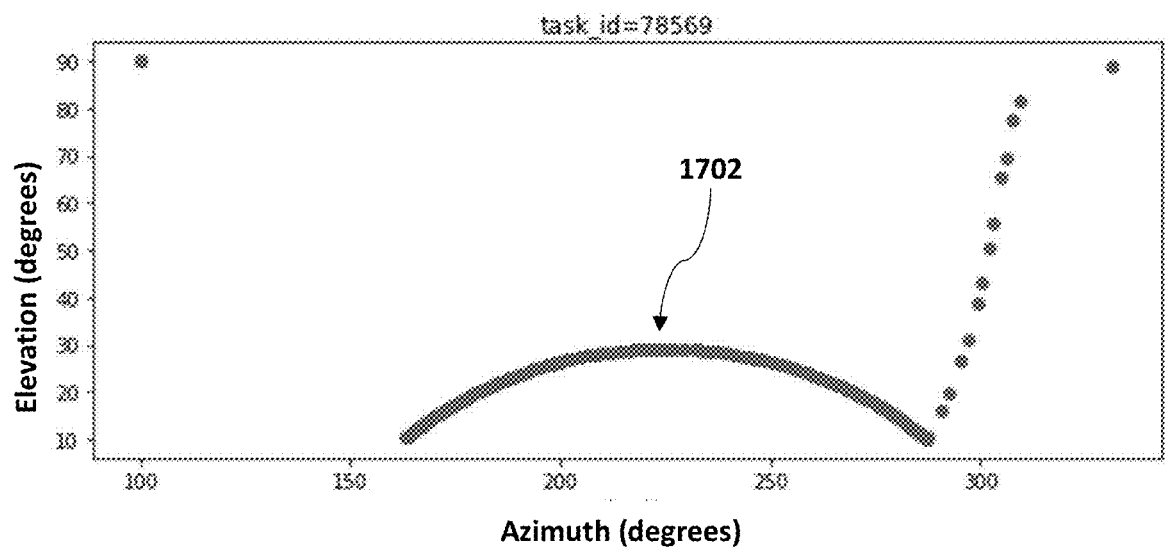
FIGS. 17A, 17B, 18, 19A, and 19B are illustrative plots of various satellite ground station antennae movements during a satellite pass, in accordance with various embodiments.

The movement of a satellite ground station antenna is, typically, precise and predictable. In particular, a satellite ground station antenna's movements are usually classified into a small subset of actions. For example, the satellite ground station antennas should move to (i) track a satellite, (ii) get into position to track a satellite, (iii) to be stowed, or (iv) for maintenance reasons. As an example, with reference to FIG. 17A, plot 1700 describes the azimuth and elevation throughout a single satellite pass. Of note, in plot 1700, there is no indicator of time, aside from the implied path of the antenna. This scatter plot describes the AZ/EL (azimuth/elevation) pair measured at capture time of each metric.

Figure 17B:
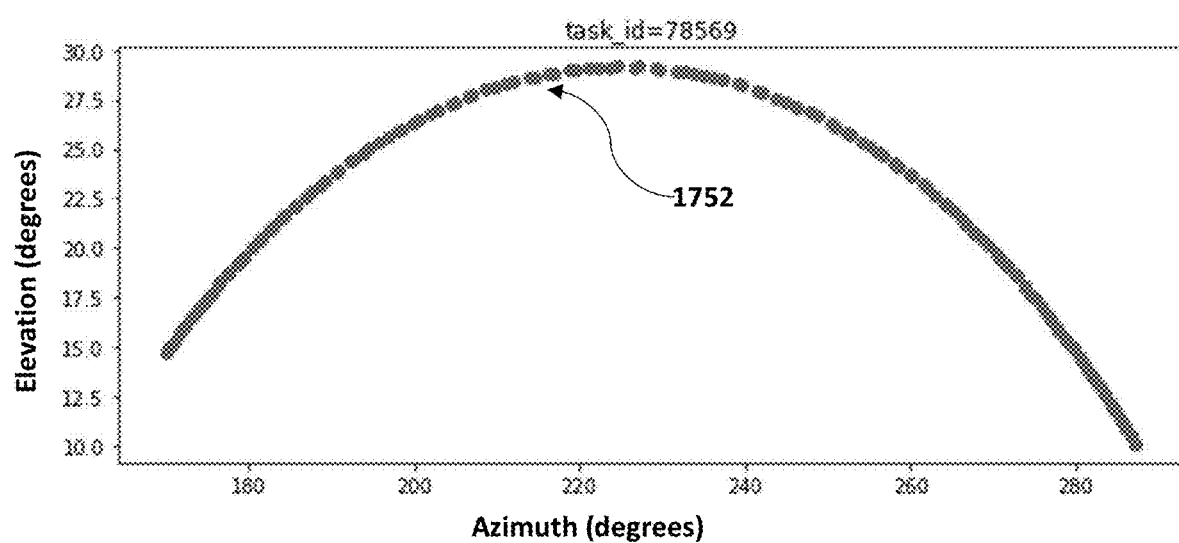

In plot 1700, data points 1702 may represent a measurement of an azimuthal angle and elevation of a satellite ground station antenna (e.g., where the antenna is directed to within the sky) captured during a single satellite pass. Data points 1702 form a visibly continuous set that describe a key period of time during which a satellite may be tracked using a satellite ground station antenna. In some cases, data points 1702 that do not conform to a smooth curve may describe a particular motion of the satellite ground station antenna (e.g., the satellite ground station antenna being stowed at the end of a satellite pass). In some embodiments, unified analytics engine 420 may be configured to select primary observations and/or filter non-primary observations. For instance, the selection/filtration techniques may cause unified analytics engine 420 to process satellite pass data (e.g., the AZ/EL pairs), find a tail in the data, and trim the observations down to a key arc corresponding to the actual satellite pass (such as when data is transmitted from/to the satellite). An example of the filtered data points may be seen from FIG. 17B. In FIG. 17B, plot 1750 may include data points 1752, which are a subset of data points 1702 of FIG. 17A. Data points 1702, however, may have data points that correspond to the stowing of the satellite ground station antenna trimmed such that the remaining data points, data points 1752, detail the movement of the satellite ground station antenna during operation (e.g., excluding setup and stowing). Thus, positional changes (e.g., azimuthal and elevation changes) of the satellite may be represented by plot 1750.

Unified analytics engine 420 may fit data points 1752, shown in the plot of FIG. 17B, using Equation 4 to obtain constants c1, c2, and c3. In some embodiments, these parameters (e.g., constants c1, c2, c3) may be used as features to be input to machine learning model 710. For example, unified analytics engine 420 may be configured to determine, based on the input parameters, whether the shape of data points 1752 of the satellite pass is indicative of a successful satellite pass. For example, a satellite pass at the very edge of the horizon has a distinctly different curve fit than an ideal pass which travels directly above satellite ground station 120.

Figure 18:
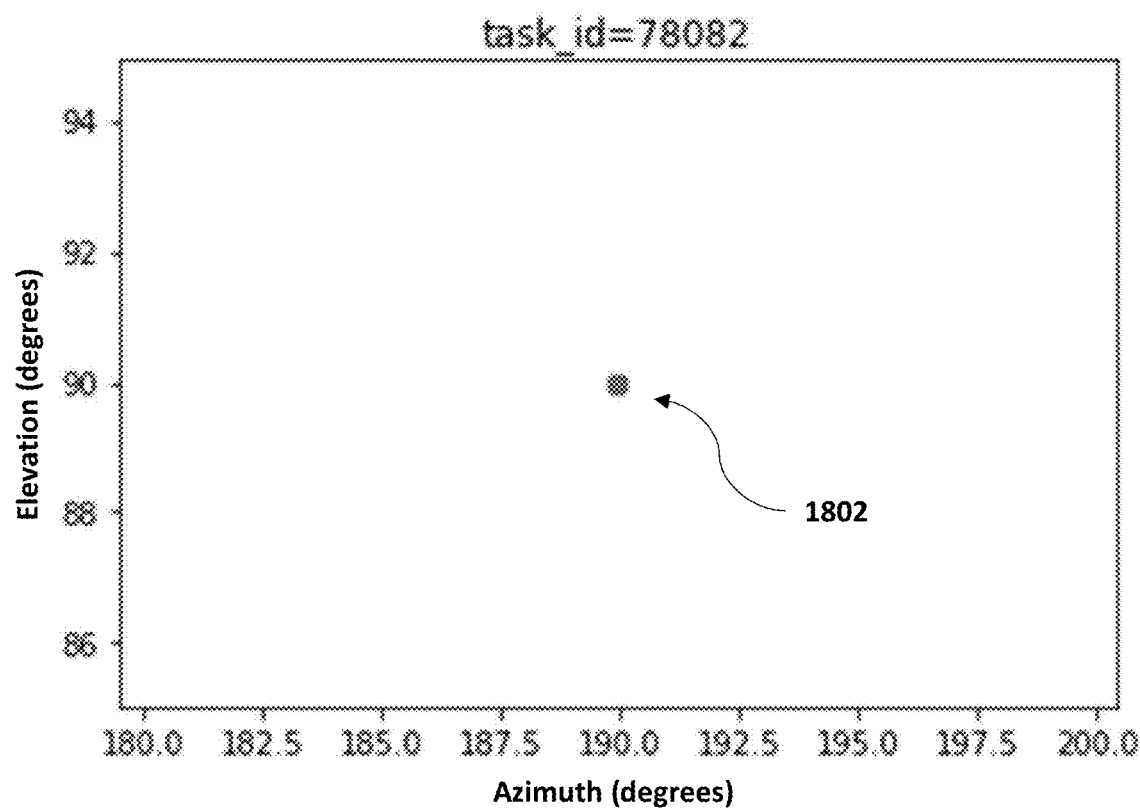
Figure 19A:
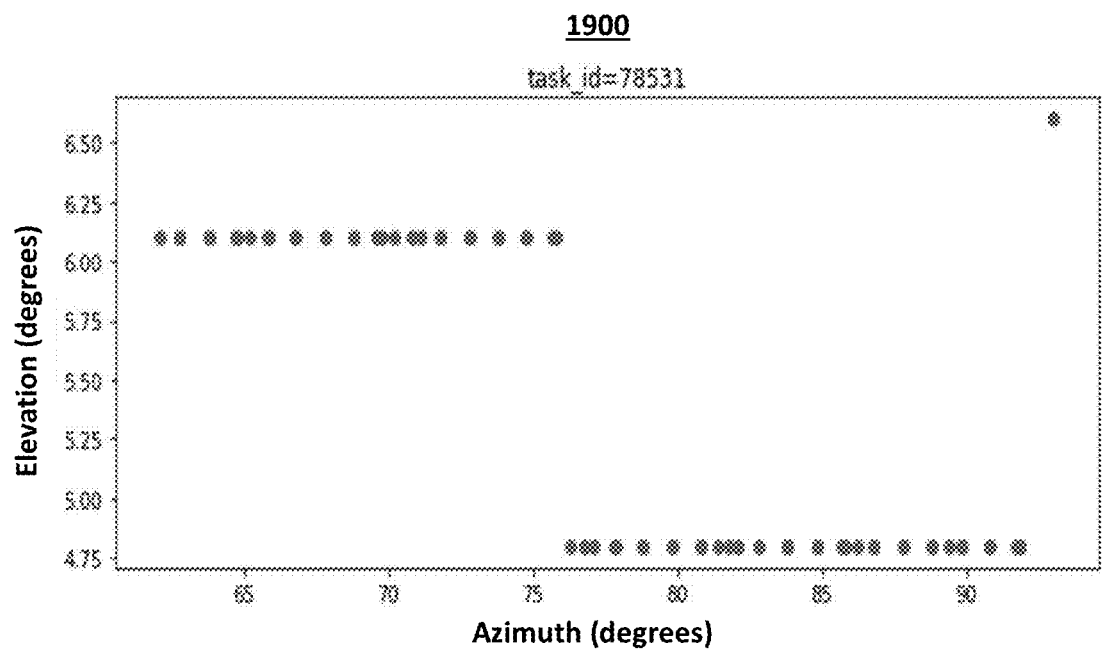
Figure 19B:
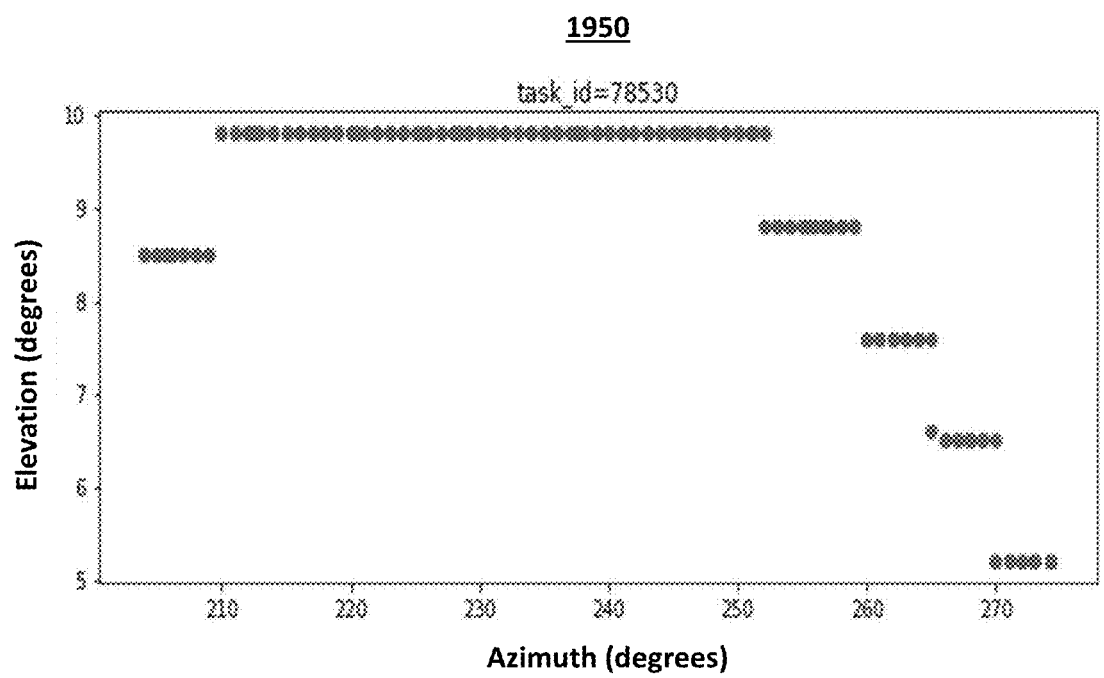

With reference to FIG. 18, plot 1800 depicts a satellite ground station antenna that does not behave correctly. In particular, plot 1800 depicts an example where the satellite ground station antenna does not move. Unified analytics engine 420 may be configured to identify simplistic error states, such as a non-moving satellite ground station antenna, by analyzing the fit parameters. For instance, plot 1800 only depicts a single data point 1802. Thus, when fitting data point 1802 to Equation 4, machine learning model 710 may determine that the higher-order coefficients (e.g., c1, c2) may be zero, indicating that the satellite ground station antenna did not move in a parabolic manner (e.g., with respect to azimuth and elevation) during the satellite pass. The example of plot 1800, for instance, may reflect a scenario whereby the satellite ground station antenna did not move during the satellite pass. As other examples, plots 1900 and 1950 of FIGS. 19A and 19B, respectively, illustrate two example of unusual satellite passes. Both of plots 1900 and 1950 illustrate low elevation (such as, for example, less than 30,000 feet, less than 20,000 feet, less than 10,000 feet) satellite passes in a wider band beam width (such as UHF). For wider beam widths the antenna may not have to steer as accurately. Additionally, in both plots 1900 and 1950, the antenna may not have to move as fast to keep up with the satellites that come within communication of the satellite ground station due to the low elevation of the satellite passes. For example, for such low elevations, the rate of change relative to the ground antenna may not be very fast. In some embodiments, feedback from experts may be used to provide clarifications to unified analytics engine 420 indicating why a particular satellite pass, such as those described by plots 1900, 1950, are not anomalies, and how to learn from them. Eventually unified analytics engine may be trained/learn that low elevation and wide beam width can result in a lack of a parabola shaped plots.]

Use Case 2—Unexpected Missing Downlink

Users can communicate with a satellite (e.g., satellite 160) via a satellite ground station antenna located at satellite ground station 120. These communications may include a downlink process where data is transmitted from satellite 160 to the satellite ground station antenna (and then ultimately to client device 104) or an uplink process whereby data is transmitted to satellite 160 from satellite ground station 120 via a satellite ground station antenna. If data is not retrieved from a satellite or is unable to be transmitted from the satellite to the satellite ground station antenna, this is referred to as a missed or missing downlink. Unfortunately, missing downlinks are often not detected until after the satellite pass has completed. Typically, missing downlinks require manual investigation, which is time consuming, labor intensive, and difficult to diagnose. In some embodiments, unified analytics engine 420 is capable of automatically detecting missed downlinks and/or indications that a given satellite pass will result in a missed downlink. Furthermore, some embodiments include unified analytics engine 420 proactively alerting users, satellite operators, or other entities that a satellite pass resulted in, or will likely result in, a missed downlink. In some embodiments, unified analytics engine 420 may be further configured to identify a root cause of the missed downlink. This may include identifying possible causes of the missed downlink, selecting a mostly likely or most likely set of causes of the missed downlink, and/or notifying an end user, via client device 104, of the possible/most likely causes of the missed downlink.

Figure 20:
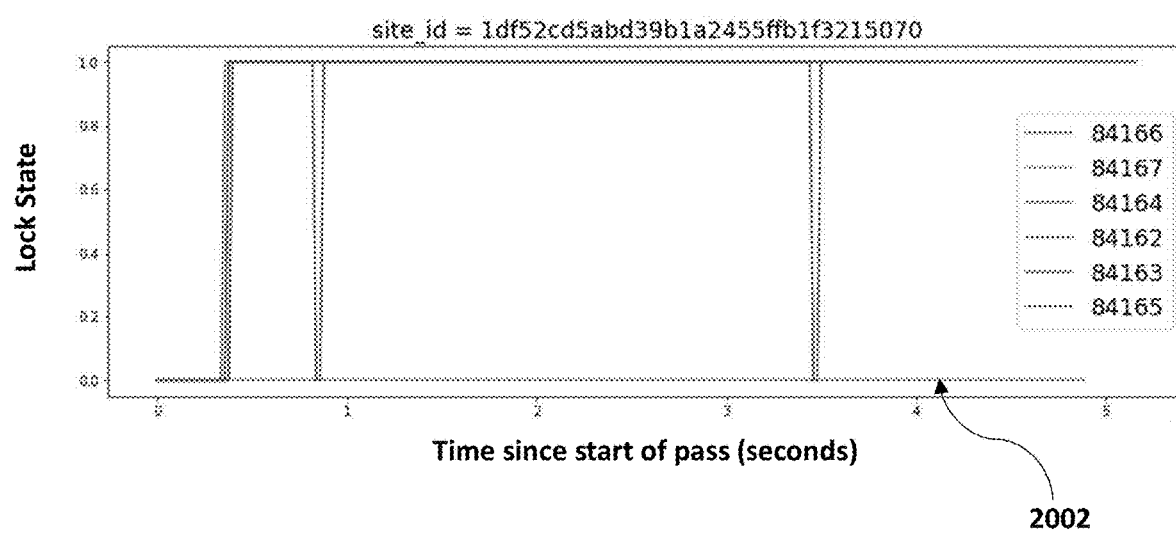
FIG. 20 is an illustrative plot describing an amount of time from a beginning of a satellite pass until carrier lock is achieved, in accordance with various embodiments.

In some embodiments, unified analytics engine 420 may generate/derive an ensemble of features may be used by machine learning model 710 to detect a missed downlink. The ensemble of features may be related to different metrics captured by the satellite ground station's hardware (e.g., a satellite modem located at satellite ground station 120). Some of the features used by machine learning model 710 to detect a missed downlink include, but is not limited to (which is not to imply that other lists are limiting), include a carrier lock, a symbol lock, and/or a Viterbi lock. Each of these locks may be tracked by the system. Viterbi lock refers to the Viterbi algorithm, which can be used to estimate a most likely sequence of hidden states. Carrier lock refers to the carrier wave (frequency that contains information) and whether or not it has been found consistently. Symbol lock refers a consistent temporal pattern of phase-changes om groups of bits. As an example, with reference to FIG. 20, plot 2000 depicts a carrier lock for six different tasks occurring at a same satellite ground station 120. Plot 2000 includes both normal satellite passes and satellite passes with errors (e.g., missed downlink).

The various lock metrics (e.g., carrier lock, symbol lock, Viterbi lock) may initialize at a value of 0—representing a non-locked state—and reach a value of 1.0 when a lock is achieved. The amount of time that elapses between the beginning of the satellite pass and when the lock is achieved may be measured via unified analytics engine 420. A delay in achieving a lock may indicate an issue has/or will happen with respect to the downlink to occur during the satellite pass. This historical data defines a statistical expectation for the amount of time to achieve the lock. Thus, classifying any pass as being delayed involves a comparison of the new value to the calculated expectation. In this way, the amount of time is dynamic. It may also be useful to detect instances whereby the lock is lost and subsequently reacquired. This scenario is not explicitly indicative of a bad satellite pass (e.g., where there is a missed downlink), however it is not optimal.

In some embodiments, unified analytics engine 420 may be configured to track (i) an amount of time that has elapsed from a start of the satellite pass until a communications device, such as a satellite modem, located at the satellite ground station, enters into a locked state, (ii) a number of times that the lock was lost (and/or regained) during the satellite pass, and/or (iii) a percentage of time that satellite 160 was in a locked state during the satellite pass. Using the tracked quantity/quantities, unified analytics engine 420 may be configured to auto-detect problems which are measurable via locking issues. For example, if unified analytics engine 420 determined that the satellite modem had zero locks during a satellite pass, this may indicate that the satellite pass was unsuccessful. Unified analytics engine 420 may store data indicating that that particular satellite pass was classified as being a failed pass (for instance, Pass 1=FALSE). A failed satellite pass refers to a scenario where no signal transmission has been detected from the spacecraft that closes the link from the satellite (the one passing by the satellite ground station, e.g., within communication range) to satellite ground station's antenna. As another example, unified analytics engine 420 may determine the amount of time that the lock state was achieved and whether that amount of time is less than a threshold amount of time. If so, then unified analytics engine 420 may classify the satellite pass as being a failed pass, whereas if not, the satellite pass may be classified as being a successful pass (for instance, Pass 1=TRUE). For instance, if the average time to achieve carrier lock is 30 seconds out of a 4-minute satellite pass, then a satellite pass that achieves carrier lock at 2 minutes could have potentially lost too much of the transmitted data to be classified as being a successful pass or the spacecraft transmitted data later than normal. Unified analytics engine 420, in some cases, may further investigate detected issues to determine why the satellite pass deviated from an expected satellite pass's lock characteristics based on a profile of the satellite. As another example, if the lock is toggling back and forth (in other words, going from a state of locked to a state of unlocked, or vice versa, frequently or more than expected), then unified analytics engine may classify the satellite pass as being a failed satellite pass. When the lock toggles between locked state and unlocked state, this may indicate that a data signal transmitted from the spacecraft is weak or that a steering issue with the satellite ground station antenna (such as being pointed in the wrong direction.

As an example, of the 6 tasks occurring at satellite ground station 120 depicted by plot 2000, most achieve carrier lock in less than one minute from the start of the satellite pass. However, task 84164, represented by trace 2002, does not achieve carrier lock within the first five minutes of the satellite pass. This may indicate a missed downlink occurred when the satellite ground station antenna attempted to achieve carrier lock with satellite 160 during the satellite pass. In some embodiments, if carrier lock is not achieved within a predefined amount of time, which may be configurable, unified analytics engine 420 may be configured to generate an alert that a particular task has a missed downlink, thereby notifying the end user and/or satellite operator (e.g., via client device 104) of a possible issue prior to the satellite pass's completion. Thus, scheduling subsystem 114 may be configured to adjust and/or reconfigure a given satellite access program (e.g., a schedule) to allow the task's corresponding end user to obtain another opportunity of executing the task via another satellite ground station access. This may include scheduling subsystem 114 identifying another satellite ground station 120 that the particular satellite will be within communication range of next and augmenting the satellite constellation access program for that satellite ground station 120 to accommodate an access from a corresponding user that had the missed downlink. In the example of FIG. 20, unified analytics engine 420 may be configured to determine that task 84164 did not achieve carrier lock within the first three minutes of the satellite pass, and therefore it is likely that this task was unable to be executed. Some embodiments include scheduling subsystem 114 (e.g., a cognitive satellite access scheduler) receiving notification of the missed downlink from analytics subsystem 110 and provide the end user, via client device 104, associated with task 84164 with another opportunity to communicate with that satellite 160.

In some embodiments, unified analytics engine 420 may be configured to determine a threshold amount of time indicative of a missed downlink. Unified analytics engine 420 may use the amounts of time that have elapsed between a start of a satellite pass and a respective locked state being achieved. Based on those amounts of time, unified analytics engine 420 may determine the threshold amount of time. For example, the threshold amount of time may be computed by averaging the amounts of time of some or all previous tasks that have achieved carrier lock. As another example, a maximum amount of time until a carrier lock has been achieved may be used as the threshold amount of time. As still yet another example, an amount of time may be selected based on the amounts of time of previous tasks that have achieved carrier lock (e.g., a maximum, a mean, a prior threshold, etc.), and the selected amount of time may be weighted. For example, a weighting factor of 0.9, 1.1, 1.2, etc., may be applied to the selected amount of time to obtain the threshold amount of time. Some embodiments include unified analytics engine 420 using the aforementioned determination to classify a given satellite pass as being successful or unsuccessful.

Use Case 3—Incorrect Modem Configuration

In some embodiments, a communication device, such as a satellite modem, located at satellite ground station 120 may be incorrectly configured. This can result in errors when end users perform certain tasks via the communication device. In some cases, the errors may go undetected, which is additionally problematic. For example, when a user attempts to update, or cause an update to be performed to, a communication device's configurations, an error may occur which goes undetected. This can result in a bad satellite pass (e.g., where some or all of the data is not transmitted, no downlink is established, etc.).

Figure 21:
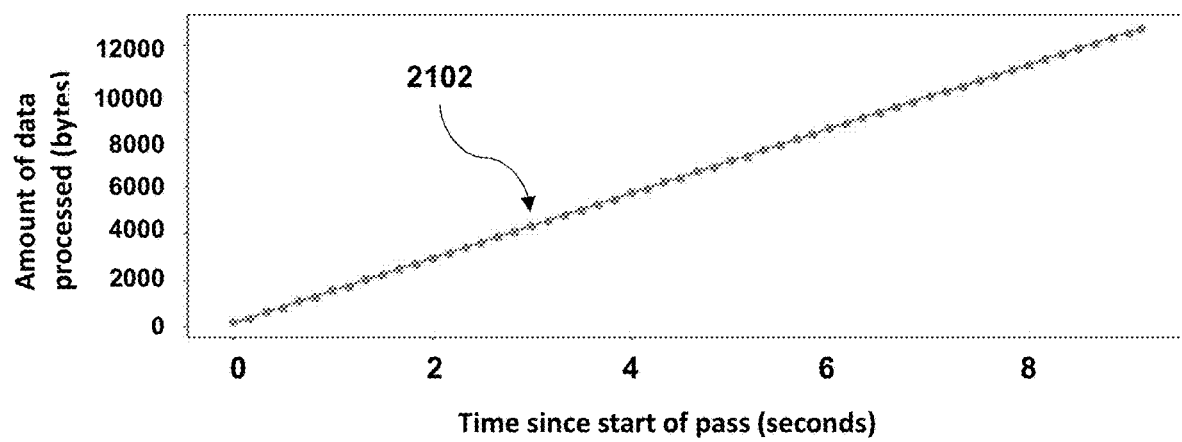
FIGS. 21-22 are illustrative plots describing a cumulative amount of bytes processed by a hardware device at a satellite ground station during a satellite pass, in accordance with various embodiments.
Figure 22:
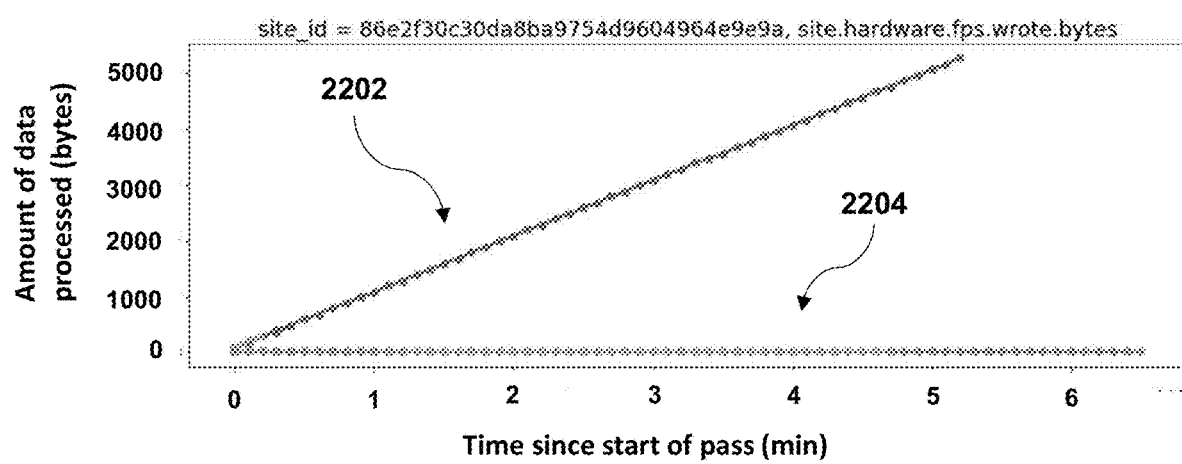

In some embodiments, unified analytics engine 420 may be configured to detect bad passes caused by communication device configuration errors based on a cumulative amount of bytes a hardware device has processed since a start of a satellite pass. As an example, with reference to FIG. 21, plot 2100 depicts an amount of bytes processed by a hardware device (e.g., a processor) with respect to an amount of time that has elapsed since a satellite pass has begun. In some embodiments, this process may be repeated a number of times (e.g., 10 or more times, 100 or more times, 1,000 or more times, etc.). For instance, multiple plots of a cumulative amount of bytes that a hardware device has processed since a start of a satellite pass may be created for a same satellite 160, a same satellite ground station 120, or for other entities, across multiple satellite passes. This can lead to a large amount of overlap. As an example, with reference to FIG. 22, plot 2200 depicts a particular time period encompassing a time prior to and during the satellite pass. In plot 2200, there are two groups of passes, group 2202 and group 2204. Group 2202 represents a collections of plots, similar to those of plot 2100, overlapping and having a linear shape. On the other hand, group 2204 represents a collection of plots where no bytes were processed by the hardware device throughout a duration of the satellite pass.

In some embodiments, unified analytics engine 420 may be configured to analyze the amount of bytes processed by a hardware device since a start of a satellite pass to determine whether a communications device has been configured correctly. Unified analytics engine 420 may determine whether a shape of a fit of the cumulative amount of bytes processed by a hardware device is the same or similar to a shape of fit of the cumulative amount of bytes processed by the hardware device during prior satellite passes. For example, unified analytics engine 420 may determine whether the shape of the fit of the cumulative amount of bytes is linear. In some cases, unified analytics engine 420 may further determine whether characteristics of the fit for a given satellite pass are the same or similar to that of the previous satellite passes. For example, in addition to determining that the shape of the fit of a given satellite pass is the same or similar to a shape of the fit of plot 2100, unified analytics engine 420 may be configured to determine whether a slope and/or offset of the fit of the given satellite pass is the same or similar to the slope and/or offset of the fit of plot 2100 (or another reference plot). If the slope and/or offset of the given satellite pass's fit differs from the slope and/or offset of the fit of plot 2100 by more than a threshold amount (e.g., slope difference is greater than a threshold slope difference, offset difference is great than a threshold offset difference), then this may also indicate that the communications device's configurations were not updated successfully.

In some embodiments, the amount of bytes processed may be analyzed in real-time. For example, as a satellite pass begins, unified analytics engine 420 may be configured to capture, at a sampling frequency (e.g., every second, every 5 seconds, every 10 seconds, every minute, etc.), an amount of data processed thus far via a particular hardware device (e.g., a processor). As unified analytics engine 420 consumes the data, at each sampling instance, unified analytics engine 420 may be configured to determine whether the residuals between the captured data and the expected trend line start to differ by more than a threshold amount. As an example, consider two data points, P1=(T1, B1*) and P2=(T2, B2*), where T1 and T2 represent elapsed time (T) since the start of a satellite pass and B1* and B2* represent a cumulative amount of bytes (B) processed by a hardware device at a satellite ground station that the satellite pass is occurring across, and an expected trend line B=MT+Const (e.g., trend line 2102). Data points P1 and P2 may be compared to trend line B to determine how close those points are to the expected trend. For example, for elapsed time T1, the predicted amount of bytes processed by the hardware device is computed to be B1, and for elapsed time T2, the predicted amount of bytes processed by the hardware device is computed to be B2. The residuals may be determined by computing the difference between the predicted amount and the measured amount, e.g., $\Delta B1$, $\Delta B2$. If the residuals are greater than a threshold difference (e.g., $\Delta B\_Thresh$), this may indicate that the amount of bytes processed by a hardware device deviates from the expected pattern, and therefore there may be an issue with the communication device's configuration. Thus, in real-time, adjustments can be made to the communication device, the satellite access schedule, or other aspects of the system, to prevent the end user from losing data via a failed satellite pass, thereby ensuring that the satellite access network is optimally utilized.

Use Case 4—Power Change Causes Errors

Figure 23:
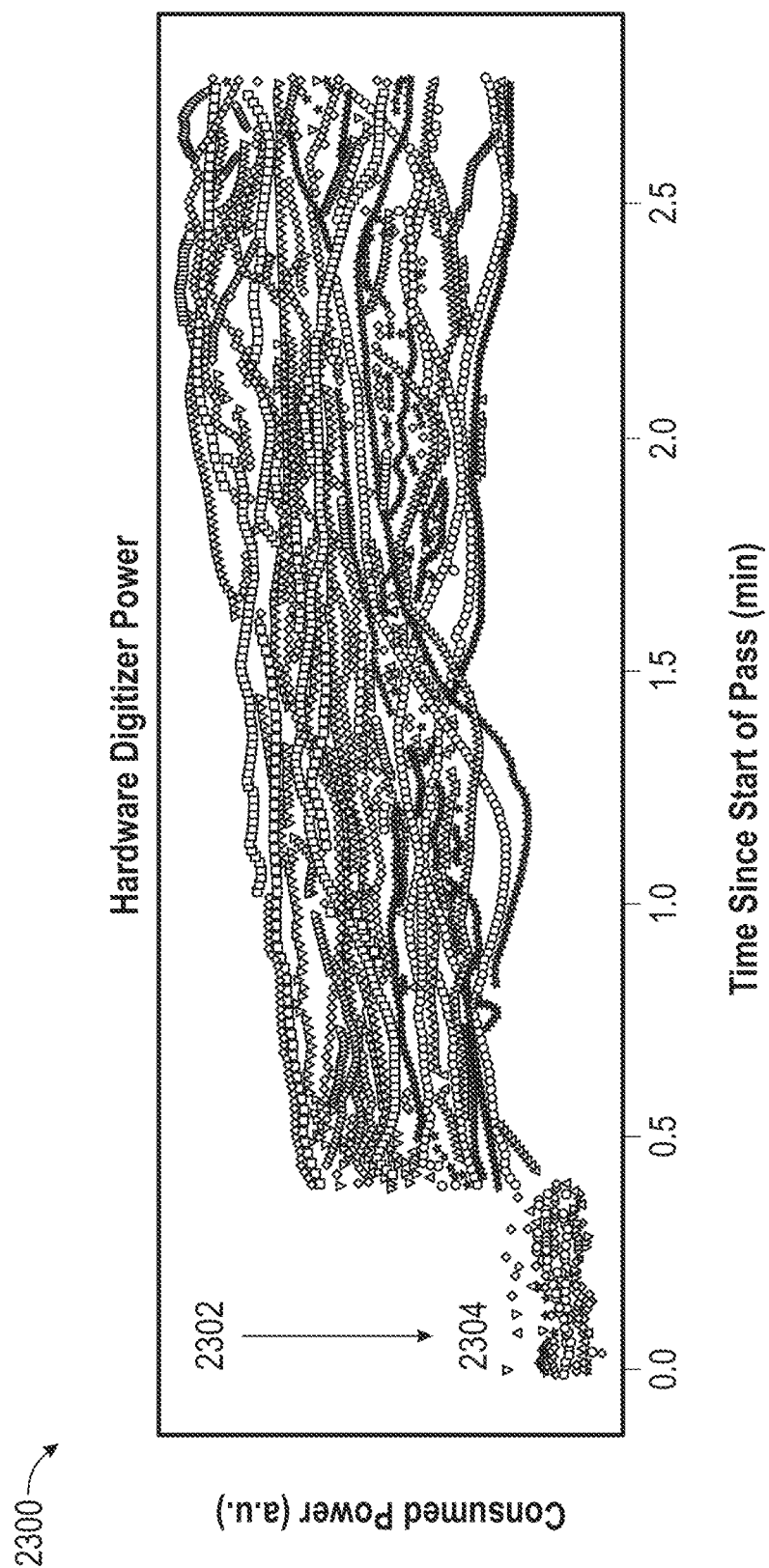
FIG. 23 is an illustrative plot of an output signal from a digitizer located at a satellite ground station during a satellite pass, in accordance with various embodiments.

In some cases, an amount of power consumed by a piece of equipment—onboard the satellite and/or at the satellite ground station—may vary depending on the tasks being performed. As an example, an undetected equipment failure can cause reduced downlink performance, which may go undetected for long periods of time. As an example, with reference to FIG. 23, plot 2300 depicts data recorded for a particular satellite ground station over a period of time (e.g., one month). Each satellite pass is represented by a different collection of data points. Earlier passes are represented by data points located towards a beginning 2302 of the arrow, while satellite passes associated with the end of the period of time are represented by data points located towards an end 2304 of the arrow. In plot 2300, the initial 40 seconds may represent startup time, and these data points may be removed prior to data analysis being performed. Alternative amounts of time from the beginning of the satellite pass and/or the end of the satellite pass may also be trimmed for improving the analysis across different satellite passes. As the gradient of the data points changes from beginning 2302 of the arrow to end 2304 of the arrow, it is apparent that a change has occurred to the measured power consumption metric. This is particular clear if, for example, a comparison is made from the data points depicted in plot 2300 to historical data points representing power consumption measured for various prior satellite passes (with a same or similar piece of hardware).

In some embodiments, unified analytics engine 420 may execute one or more change point detection algorithms against the measured power consumption metric data detailed above with respect to FIG. 23. As an example, with reference again to FIG. 8, the data points in plot 800 have been transformed such that one data point per satellite pass is depicted. In plot 800, a time of a start of the satellite pass is represented on the X-axis, while the measured amount of power consumed by a hardware component (e.g., a digitizer) as the data is pre-processed for the model may be represented along the Y-axis. Each satellite pass may be summarized as the mean average power reported for the entire satellite pass. In other words, plot 800 depicts one data point per satellite pass.

In some embodiments, unified analytics engine 420 may be configured to provide the data represented by plot 800 to a change point detection model (e.g., machine learning model 710), as detailed above, to determine whether any change points are detected within the data. As seen from plot 800, the change point detection model may identify first change point 802 and second change point 804 within the data. Change point 802 may refer to a time just after the timestamp 7/24—13:20 (i.e., July 24$^{th}$, 1:20 PM), while change point 804 may refer to another time 8/19—07:35 (i.e., August 19$^{th}$, 7:35 AM). These two data points may denote a period of time whereby a hardware problem occurred that otherwise went unnoticed.

In some embodiments, unified analytics engine 420 may be configured to determine, based on the change point detection model's results, a number of change points detected within the data. Power metrics, such as an amount of power consumed by a hardware device (e.g., a digitizer) at a satellite ground station, typically remain consistent from satellite pass to satellite pass. Prior to change point 802, in region 812, the distribution of the data is fairly consistent. Any test performed by unified analytics engine 420 to data within region 812 may result in a detection of no change points. However, after change points 802 and 804, in region 820, unified analytics engine 420 may classify the data from plot 800 as including two change points. Alternatively, unified analytics engine 420 may classify the data from plot 800 as including 1 set of change points, so the number of change points may extract, as a value for that feature, the value 1 or 2.

The technical solutions described herein can improve the reliability and resiliency of the satellite communications infrastructure by enabling end users to smartly leverage their networks and the future global hybrid network of satellite communications ground stations. Applying data science and machine learning, a cognitive scheduler and predictive system analysis may support and improve decision making processes to facilitate mission communications. Using the technical solutions described herein, an automated early warning may be generated and provided to end users/systems administrators to notify those entities of the possible errors that occurred, and furthermore, could facilitate early detection and predictions of future errors.

In some embodiments, the unified analytical engine works by continually monitoring the ground system (e.g., satellite ground station network) and creating detailed performance metrics per satellite ground station, per customer, per satellite, and even per hardware unit, per software patch, and per configuration. The data may then be used for proactive network monitoring, traceability, and schedule optimization. Using the baseline metrics streaming from each satellite ground station, unified analytics engine 420 may transform and enrich the data in real time and publish additional metrics that can be used to further analyze performance. For each satellite pass, a set of metrics (e.g., the mean, standard deviation, skewness, kurtosis, and similar statistical methods) across a variety of rolling windows for each metric can be created. These metrics per pass enable better post pass analysis (success-failure) and prediction of future performance. More advanced techniques such as ARiMA and neural network transformer architectures can also contribute additional features with noteworthy predictive power. Some embodiments include building software integrations between a data layer for monitoring satellite passes and modern software libraries, such as Tensorflow.

The technical solutions described herein provide a technical effect of enhancing network technologies for optimal scheduling techniques for satellite constellation access scheduling in distributed and real-time environments. A global hybrid network of government-based and non-government-based satellite antennas may be leveraged to facilitate these solutions. Unified analytics engine 420 described by the aforementioned technical solutions may transform raw data from billions (or more) of data points to increase network performance measured by the results of the taskings, enhancing reliability and resiliency. Thus, unified analytics engine 420 can reduce both mission and network operations burden. In other words, the present application described technical solutions that enable adoption and integration of AI and ML algorithms to optimize space communication links, networks, and/or systems.

All communication networks must operate with a presumption that failures can and do occur. Successful operations of a communications network first requires adequate tracking of metrics and telemetry in order to have data for analysis. In some embodiments, years of historical, real-world system metrics can be used as the basis for this project. These billion plus metrics values fill a gigabyte of full grain, time-series data originating from over tens of thousands (e.g., 40,000) satellite passes. As an example, some ground station antennas report the elevation at 2 second intervals during a pass.

As is common in a streaming data problem (where new metrics and observations are constantly arriving), a data transformation layer may be needed to facilitate analytical queries against this dataset. Through the data transformations, useful representation of the metrics data may be generated that enable machine learning algorithms to detect problems observable with the metrics. Because of the volume and velocity with which metrics data arrives, it is infeasible at current scale for a human operator to continuously monitor the volume of data. The data pipeline and the machine learning model described herein demonstrate a means of providing automated, proactive monitoring as a service to a system operator.

Unified analytics engine 420 can therefore be configured for detecting problems associated with a satellite, hardware at a satellite ground station, software loaded on the hardware, or other issues related to satellite-based communications, which in turn can generate useful alerts for investigation and possibly an intervention. Additionally, these techniques can be harnessed as an input source for a data-centric scheduling approach that is responsive to quality of service metrics. For example, a scheduler, such as that described in U.S. application Ser. No. 17/327,068, the disclosure of which is hereby incorporated by reference in its entirety, may be used, in connection with the results of unified analytics engine 420, for generating a schedule and self-adapting when problems occur. Scheduling subsystem 114, as described below, may implement some or all of the aspects described within U.S. application Ser. No. 17/327,068 for generating and updating satellite constellation access programs (e.g., schedules) for a given client.

In some embodiments, unified analytics engine 420 includes a configurable software system which ingests raw data and automatically processes and transforms that data for analytical purposes. This software system may be "universal" in that it is configured to process time series data in a context-free way. New data sources can be connected in the future and instantly gain the benefits of the existing platform out-of-box. Therefore, unified analytics engine 420 can power many objectives which require data for decision making (e.g., using a scheduler). The technical solutions provided by unified analytics engine 420 can optimize space communication networks by highlighting actual historical cases in which unified analytics engine 420 would have been useful for increasing utilization of the network through pro-actively discovering issues that were discovered with some delay via ad-hoc processes.

Unified analytics engine 420 is capable of processing petabyte (or greater) scale data from active space communication network's metrics. These metrics can be transformed, processed, indexed, and/or enhanced to produce a rich dataset of features and derived metrics which can describe many aspects of a particular satellite pass, including indicators that can be used to update a quality of service metric. From the processed metrics data, a machine learning model can be trained to predict error conditions for individual satellite passes. Using the machine learning model, real-world incidences can be analyzed and processed, as well as identify a plurality (e.g., over 13,000 or more) successful satellite passes and numerous (e.g., 300 or more) failures (against ground truth production data sets). Unified analytics engine 420 may be configured to provide the technical capabilities for intelligently processing raw metrics into useful analytical datasets which in turn can be used for statistical detection or machine learning.

In some cases, such as when an atypical amount of data is downlinked, unified analytics engine 420 can recognize the deviation from historical norms (e.g., a historical amount of data downlinked). These observations could be used to generate alerts. In some cases, such as when degraded performance is detected, the outcome of unified analytics engine 420 may automatically be used to inform changes to quality of service (QoS) metrics, which in turn can inform other services, and so on. For example, analytics subsystem 110 may provide a notification of the changes to the QoS metrics for a given client to scheduling subsystem 114 for updating the client's satellite constellation access program. The transformed metrics, when compared to their historical expectations, can provide a qualitative measure for assessing a quality of each pass. This quality score can be useful for guiding many decisions, such as, for example, informing scheduling subsystem 114. If a satellite pass has completely failed, this information can be provided to scheduling subsystem 114, which can triage appropriately in an automated fashion. In the case of a complete failure, scheduling subsystem 114 can be configured to auto-reschedule, preventing data loss or reduction in data timeliness.

Scheduling subsystem 114 can further be extended in other ways. As an example, when quality of service metrics change for users, scheduling subsystem 114 can be reactive/adaptive to the change. Scheduling subsystem 114 can make future schedule adjustments with an effort to maximize the overall QoS or average QoS per user. As another example, scheduling subsystem 114 may be able to leverage machine learning approaches to recognize which satellite passes are likely to result in an increase/decrease in QoS. Therefore, scheduling subsystem 114 can schedule with direct consideration of the impact of the assigned task.

Unified analytics engine 420 can further be integrated into a production network operations systems to provide automated monitoring services and observability into the operations of the network. A successful deployment would be able to provide early alerts to system failures similar to issues experienced in the past, and as well as providing the potential to uncover novel failure types rarely or never observed previously. Similarly, the availability of these metrics has proven valuable to end user goals and can reduce network operations response time. Further, system failure data and other metrics related to operations can be computed by unified analytics engine 420 in a generic way, making them useful for many decision problems. In some cases, the derived data from the performance metrics can be integrated directly to a scheduling system to allow for automate adjustment in the event of system failures, operational parameters, or other intelligence.

In some embodiments, unified analytics engine 420 may further be configured to predict maintenance needs of equipment based on system telemetry in order to prioritize where maintenance resources are allocated. Such solutions increase the system's overall reliability. Therefore, the need for manual network operations and scheduling will decrease.

As the amount of data handled by unified analytics engine 420 increases, a large training data set of real-world metrics may be obtained. Third party datasets, such as space and terrestrial weather data, could also be integrated into unified analytics engine 420's data pipeline. A unified path for metrics and the processing of metrics enables the use of algorithms, statistical models, machine learning, and rule systems at all levels of the network operations stack, including scheduling. Furthermore, unified analytics engine 420 may facilitate the training of a model to solve non-trivial decision problems broadly beneficial to other network operators. That model could be offered as a service or offered as an embedded solution to another network operator.

Currently, scheduling is done manually because no singular data source exists containing all the parameters necessary for making scheduling decisions. Unified analytics engine 420, however, removes this constraint by providing a unified, singular, data source. By offering an idealized set of features to scheduling subsystem 114, unified analytics engine 420 can offer automation solutions which are capable of making real-time adaptations to unexpected mission changes or astronomical events.

The technical solutions described herein may analyze satellite ground station antenna link performance data and, based on this analysis, identify patterns across satellites, satellite ground stations, hardware components (e.g., digitizers, communications devices, processors, etc.), or other components of system 100. As an example, there may be a consistent issue with a satellite ground station's antenna when that antenna is directed at a specific location (e.g., an azimuthal and elevation coordinate). If all satellite passes perform sub-optimally in that area (e.g., proximate that specific location), the satellite, satellite ground station antenna, the satellite ground station, and the downlinked data, can be flagged, investigated, and, if needed, cause modifications to be made to mitigate these issues (e.g., causing a parameter associated with a hardware device associated with the satellite ground station antenna to be adjusted from one value to another). In some cases, patterns between spacecraft radios and hardware vendors may be detected, which can then be harnessed to shape and improve network and satellite design end users.

Unified analytics engine 420 may be configured to ingest new data sources to continue to analyze broader network performance. An example data source may include the historical records of the underlying Internet traffic/protocol performance. In such cases, unified analytics engine 420 may be configured to generate satellite ground station network performance metrics, look for correlations between failed/flagged satellite passes, and provide other subsystems with actionable information. For example, on a shared network (e.g., one in which an Internet Service Provider line is shared) there may be dips in network latency at specific times of the day. Using unified analytics engine 420, data representing the dips in network latency across various times of the day can be processed by a change point detection model to detect change points and inform a scheduler, network operator, or satellite operator of such connectivity issues. Such notification can enable an entity, such as a network operator, to determine whether to upgrade to a direct network connection or take another course of action to mitigate the connectivity disruptions.

Figure 24:
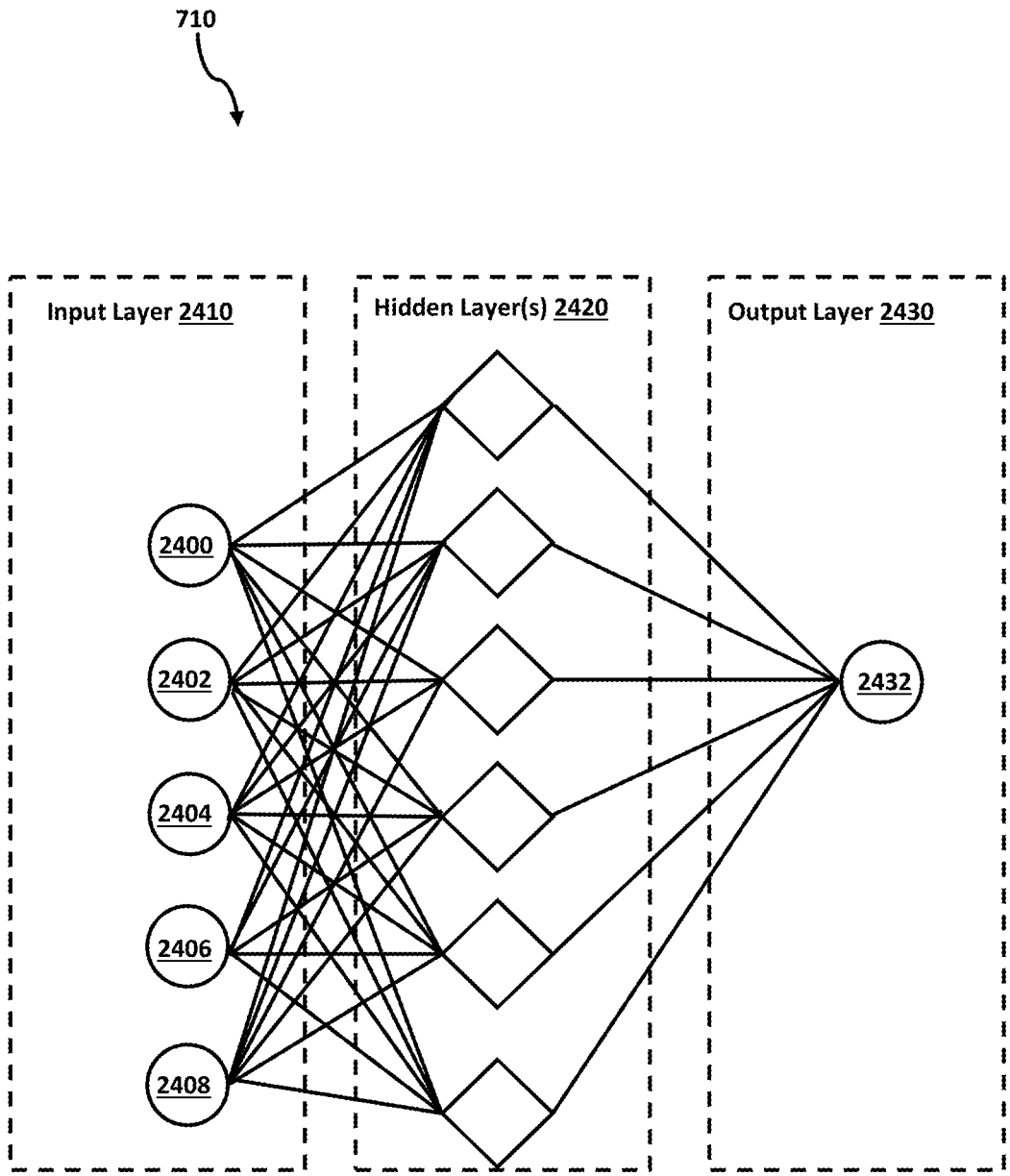
FIG. 24 depicts an example of machine learning model, in accordance with various embodiments.

FIG. 24 depicts an example of machine learning model 710, in accordance with various embodiments. In some embodiments, machine learning model 710 may be trained to determine whether a given satellite pass will be successful (such as if data transmitted from a satellite to a satellite ground station occurs as expected) or unsuccessful (such as if data is transmitted from the satellite to the ground station occurs differently than expected) prior to the satellite pass ending. Some embodiments further include machine learning model 710 being trained to determine whether a previously occurring satellite pass was unsuccessful.

Machine learning model 710 may include an input layer 2410, one or more hidden layers 2420, and an output layer 2430. In some embodiments, input layer 2410 includes five nodes 2400, 2402, 2404, 2406, 2408, however additional or fewer nodes may be included. Each input node may receive a specific type of input data. For example, input node 2400 may be configured to receive fit parameters c1, c2, c3, which can be used to describe the parabolic shape of a satellite pass in azimuth and elevation, as seen with respect to FIG. 10. Equation 4 can be used to model the shape of the satellite pass in azimuth and elevation based on fit parameters c1, c2, c3. If machine learning model 710 determines that the curve describing the satellite pass's shape differs from what is expected based on historical satellite pass shapes, then this may indicate that the satellite pass was, or will be, unsuccessful. Therefore, output node 2432 of output layer 2420 may output a notification indicating that, based on the input data, the satellite pass being analyzed will likely output an indication of an unsuccessful satellite pass. Some embodiments include the output being a binary value indicating successful or unsuccessful satellite pass. For example, if machine learning model 710 determines that the satellite pass was, or will be, unsuccessful, then output node 2432 may output a logical 1, whereas if the satellite pass was, or expected to be, successful, then a logical 0 may be output by output node 2432. In some embodiments, the data provided to machine learning model 710 at input layer 2410 may be partial in the sense that the data represents only a portion of the satellite pass. For example, data representing azimuth and elevation of a satellite during a first half of the satellite pass may be provided to machine learning model 710. Based on the data, machine learning model 710 may determine whether the ongoing satellite pass will result in an unsuccessful pass. In this way, machine learning model 710, and unified analytics engine 420, may detect satellite passes that will result in failed downlinks prior to the satellite pass even finishing and may additionally cause remediating actions to be performed (for example, providing a client with a new time period with which downlinks may occur).

In some embodiments, at input node 2402, data representing an amount of time that has elapsed from a start of a satellite pass until a lock (for example, a carrier lock) was achieved may be provided. The amount of time that has elapsed may include times until lock state was reached or an amount of time that has elapsed so far without the lock state being reached. For example, for a particular task, an amount of time that has elapsed thus far (without achieving a lock state) may be provided to machine learning model 710, while may output, via output node 2432, whether the satellite pass will be successful or unsuccessful. If the latter is determined, then unified analytics engine 420 may cause one or more actions to be performed to help achieve the lock state, cause the satellite access to be modified (such as rescheduled) to attempt reaching the lock state during a subsequent pass, or other remediating actions.

In some embodiments, at input node 2404, data representing an amount of bytes processed by a hardware device, such as a satellite modem located at a satellite ground station, may be provided to machine learning model 710. For example, the amount of bytes processed by a digitizer located at a satellite ground station should increase linearly during the satellite pass. In some embodiments, the amount of bytes processed as a function of time since the start of the satellite pass may be used to determine whether the amount of bytes is increasing linearly (as expected). The function may be used to estimate a slope and offset of the curve, as seen above with respect to FIG. 21, and the slope and offset may be provided to machine learning model 710 at input node 2404 to determine whether the satellite pass is/will be successful. In some embodiments, the slope, offset, and time that has elapsed since the start of the satellite pass may be provided to machine learning model 710 at input node 2404. Based on the slope, offset, time, or other information, machine learning model 710 may predict whether the satellite pass will be successful. If machine learning model 710 predicts that the satellite pass will be unsuccessful, modifications to a satellite access schedule may be made to allow an end user additional chances to obtain the data that was not able to be downlinked during the failed satellite pass.

In some embodiments, at input node 2406, an amount of power consumed by a piece of equipment—onboard the satellite and/or at the satellite ground station—may be provided to machine learning model 710. An undetected equipment failure can cause reduced downlink performance, which may go undetected for long periods of time. Monitoring power consumption is one technique that can be used to detect equipment failures. For example, by providing the amount of power consumed thus far, by equipment of the satellite or the satellite ground station, to machine learning model 710, machine learning model 710 may predict whether the satellite pass will be successful. In some embodiments, machine learning model 710 may be trained using training data including amount of power consumed by certain hardware components of the satellite and/or satellite ground station during previous satellite passes. The amount of power may refer to the amount of power consumed by hardware equipment that is the same or similar to the hardware equipment with which the machine learning model will consider during subsequent satellite passes. As an example, the amount of power consumed by a piece of hardware, such as a satellite modem, may historically have a shape, as a function of time since a start of the satellite pass, that can be represented by plot 2300 of FIG. 23. Machine learning model 710, therefore, may be trained based on training data, such as that represented by the data of plot 2300, to determine whether a satellite pass will be successful based on the amount of power that has been consumed since the start of the satellite pass.

In some embodiments, at input node 2408, a number of changepoints detected during a satellite pass for a given metric may be provided to machine learning model 710 to determine whether the satellite pass will be successful. In some embodiments, machine learning model 710 may include a changepoint detection model, such as the PELT algorithm, and may determine, based on the number of changepoints detected thus far (during the satellite pass), whether the satellite pass will be successful.

In some embodiments, machine learning model 710 may be configured to receive data in a variety of different formats and determine, based on some or all of the data, whether the satellite pass will be successful. For example, machine learning model 710 may be configured to predict whether a satellite pass will be successful based on a total amount of bytes processed and a number of changepoints detected during a satellite pass. As another example, machine learning model 710 may be configured to predict whether a satellite pass will be successful based on fit parameters c1, c2, c3, an amount of time until lock state is achieved, and an amount of power consumed. Some embodiments include weighting some or all of the inputs, however this may be rolled into the adjustments to the hyperparameters of the nodes included in hidden layer 2420.

Persons of ordinary skill in the art will recognize that input layer 2410 may include more or fewer input nodes, and the use of input nodes 2400-2408 is merely exemplary. For example, input layer 2410 may include a single node configured to take data of a single type (such as a number of changepoints detected) or of multiple types (such as fit parameters c1, c2, c3, amount of time until the lock state is achieved, and/or others).

In some embodiments, the weights and biases of each node of machine learning model 710 may be learned by analyzing prior satellite passes of a satellite that is the same or similar to the satellite that will be analyzed during an upcoming satellite pass. For example, for a given satellite, data describing an azimuth angle and an elevation angle of the satellite during prior satellite passes may be obtained. From the data, a curve, such as that described by Equation 4, may be fit to the data, and the fit parameters c1, c2, c3 from each fit curve may be extracted and stored as training data.

Each node in input layer 2410 may be fully connected to each node in hidden layer 2420. However, if hidden layer 2420 includes multiple layers, some or all of the layers may be fully connected. Each node in hidden layer 2420 may include an activation function, such as a binary step function, a ReLU function, a Sigmoid function, a Softmax function, or other activation functions. In some cases, one or more of the nodes may include different activation functions. The outputs of hidden layers 2420 may be provided to output layer 2430.

In some embodiments, a classification vector may be output from hidden layer 2420. The classification vector may be an n-dimensional classification vector, where each element includes a classification score representing a likelihood that the satellite pass will be successful (for example, data can be downlinked) or unsuccessful. In some embodiments, each element of the classification vector may include a classification score representing a likelihood that the satellite pass will be unsuccessful based on a given type of input provided to machine learning model 710. For example, if input layer 2410 includes input nodes 2400-2408, then the classification vector may include five elements each indicating whether the input data provided to a respective input node results in a successful satellite pass. In some embodiments, the scores of each element in the classification vector may be used to determine whether satellite pass is successful. For example, each element may be used by a voting mechanism to determine whether the satellite pass will be (or was) successful. In some cases, machine learning model 710 may be trained to detect solely whether the satellite pass will be (or was) successful. In such cases, the classification vector may be a 1-dimensional vector, storing a classification score indicating how likely it is that the satellite pass was successful. If the classification score is greater than a threshold classification score, then this may indicate that the satellite pass will be unsuccessful.

In some embodiments, output layer 2430 may include a SoftMax layer configured to take the outputs from the hidden layer 2420 and convert those classification scores to probabilities. Based on those probabilities, a determination may be made as to whether a given classification score satisfies a threshold condition. If so, then this indicates that the satellite pass will likely be, or was, successful (or unsuccessful). In some embodiments, the threshold condition may be satisfied if the probability, or classification score, is greater than or equal to a threshold value. For example, if the probability that the satellite pass was successful is greater than or equal to a threshold probability, then this indicates that the satellite and the satellite ground station were able to communicate (for example, downlink data). This may cause output node 2432 to output a result indicating that the satellite was successful (or unsuccessful), as well as, in some cases, the classification score, the probability, or both. In some embodiments, the result obtained from output node 2432 may further cause scheduling subsystem 114 to adjust a satellite access schedule of the satellite, satellite ground station, or other entity to allow for additional or alternative satellite accesses to be obtained such that the data unable to be downlinked during a failed satellite pass may then be downlinked. In some embodiments, the result from output node 2432 may be a numerical value between 0 and 1.0, a percentage, or other values.

In some embodiments, machine learning model 710 harnessed by unified analytics engine 420 may be configured receive feedback regarding the performance of the models and the models may be updated, retrained, reset, or have other operations performed thereto, to improve the model's performance. Some embodiments include a feedback system whereby an expert is capable of providing feedback regarding whether a candidate anomaly is an actual anomaly.

Figure 25:
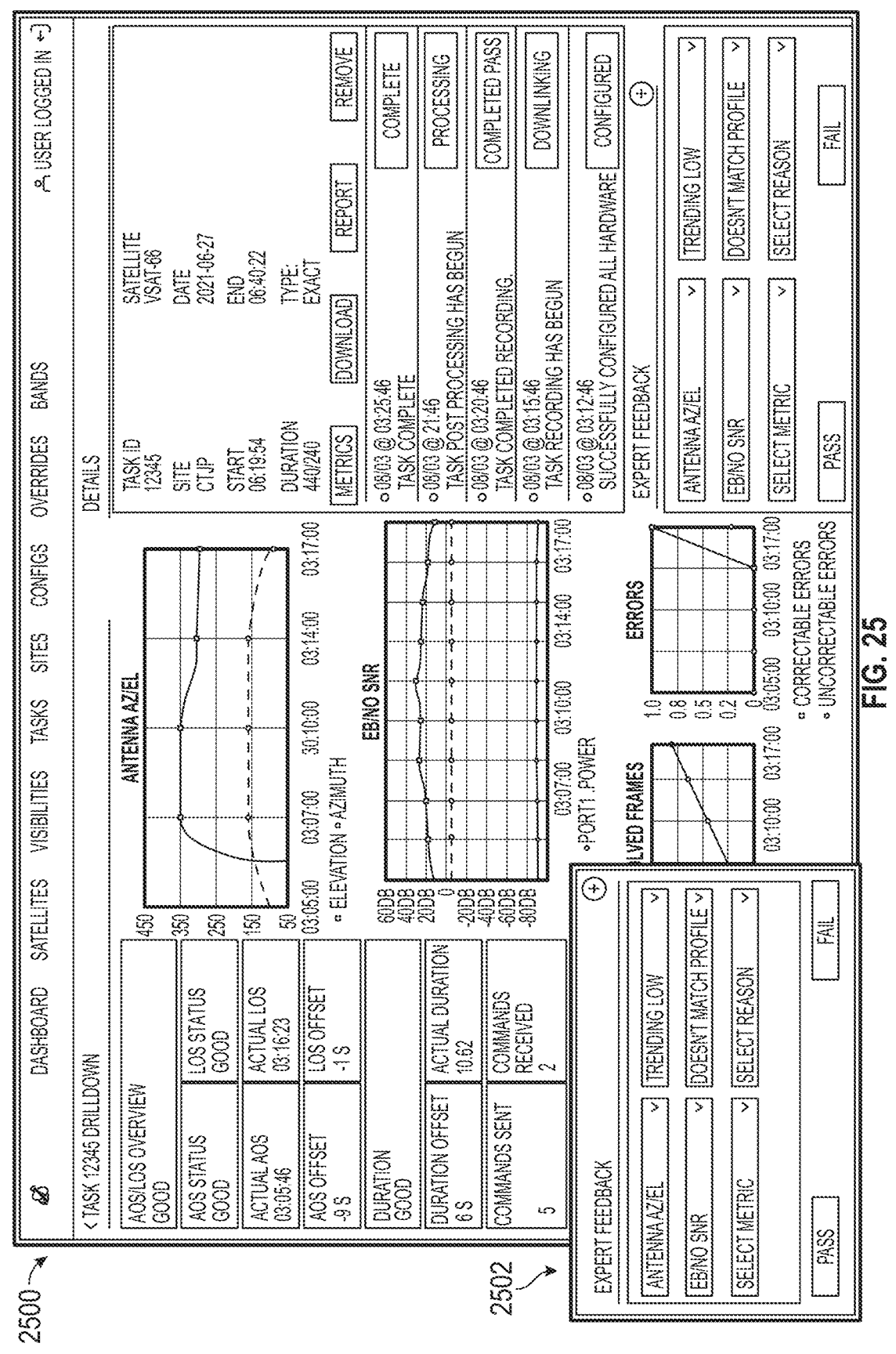

In some embodiments, a graphical user interface (GUI) may be generated that an expert can use to provide the feedback. As an example, with reference to FIG. 25, graphical user interface 2500 may include a region 2502 whereby an expert can select or otherwise provide a response to an inquiry regarding a detected anomaly. The expert, via their client device 104 upon which GUI 2500 is rendered, may provide their response, which may indicate whether the expert classified the anomaly as being a true event or a false positive (or a false negative). For example, the expert may select that a given satellite pass is to be classified as a "Pass," indicating that the satellite pass was successful or that the satellite pass is to be classified as a "Fail," indicating that the satellite pass was unsuccessful. The expert's response, which may, for binary decisions, be a logical I/O bit, may be transmitted back to unified analytics engine 420.

In some embodiments, unified analytics engine 420 can be used to create an overall quality of service (QoS) metric for each satellite ground station 120, satellite 160, and/or client account. In some cases, unified analytics engine 420 may determine a QoS metric for given pairs of satellite ground station 120, satellite 160, and/or client account. The QoS score, also referred to interchangeably as the QoS value, for an entity (e.g., satellite ground station, satellite, user account, pair thereof) may be used as an input to scheduling subsystem 114 to determine whether to modify satellite constellation access programs in the case of a dip in performance (e.g., a low QoS for a user account over a last week). As another example, the QoS score(s) for a satellite ground station may be used to make scheduling decisions (e.g., if the satellite ground station's QoS score is low for the satellite, scheduling subsystem 114 can choose a better performing satellite ground station 120 for transmitting data to).

In some embodiments, satellite constellation access requests, which are also referred to herein as "requests" or "client goals," may include one or more satellite constellation access requirements and satellite constellation access targets. Satellite constellation access requirements are also referred to herein interchangeably as "requirements," "access requirements," or "hard constraint goals." Satellite constellation access targets are also referred to herein interchangeably as "targets," "access targets," "conditions," or "soft constraint goals." In some embodiments, satellite constellation access requirements describe constraints that permit a client to access to a satellite constellation. For example, the client may indicate that access to the satellite constellation is needed at least once per day. A hard constraint goal that is not satisfied renders contact with the satellite constellation useless. Satellite constellation access targets may refer to preferences of a client accessing the satellite constellation. For example, the client may indicate a preference for contacts with the satellite constellation to last 8 minutes, however contacts lasting 6 minutes are acceptable. Satellite constellation access targets may be partially, fully, or not, satisfied, and the degree with which a given satellite constellation access targets is satisfied may be measured via a utility function.

In some embodiments, the utility function is a representation of a client's preference for contacting the satellite constellation. Each utility function can also be described as a model representing a client's preference for contacting a satellite constellation. Utility functions may be selected, by the client or by the system, based on each client's particular goals. The utility functions may be modified via tunable parameters to be tailored to the client's goals. For instance, a shape and an offset of the utility function may be modified by varying or tuning a value for each of the parameters. Various types of utility functions that may be used to represent satellite constellation access requests include logistic functions, Gaussian functions, truncated Gaussian functions, half-life (e.g., decay) functions, step functions, or others.

In some embodiments, a quality of service (QoS) metric may be computed based on the utility functions used to represent the satellite constellation access requests to indicate how satisfied a client is with the results of a given satellite constellation access program. The QoS metric is also referred to herein interchangeably as a "quality metric" or "quality score." Using the prior example of a client indicating a preference for contacts with a satellite constellation to last 8 minutes, but indicating that contacts lasting 6 minutes are also acceptable, if a given satellite constellation access program is generated that has the client contacting the satellite constellation for 8 minutes, the QoS metric may have a high value. For instance, the previously mentioned scenario may have a QoS=1.0, indicating 100% or full satisfaction of a client preference. Contacts for less than 8 minutes, in this example, may yield lower values for the QoS metric. For instance, a contact of 6 minutes may have a QoS=0.8, indicating 80% or partial satisfaction of the client preference. Depending on how frequently the scheduling system generates satellite constellation access programs for a client that have low QoS metric values, a boosting factor may be applied to the client.

The boosting factor, which may also be referred to herein as a "buoyancy factor" or "buoyancy," may boost (e.g., increase) a weight associated with a given client's goals to improve that client's QoS score. For example, if two clients each have satellite constellation access requests that conflict with one another (e.g., both clients seek to access the satellite network during a same temporal interval), then depending on each client's boosting factor, a resolution to the conflict may be determined. The boosting factor for a client may be computed based on prior values of the QoS metric values for that client for previous client goals. For instance, if a client has recently received unfavorable QoS scores, then the boosting factor for that client may be generated to increase the likelihood of the client receiving a favorable QoS score. Some embodiments may include the boosting factor being a weight applied to a client goal, which may be used as an input when determining a satellite constellation access program for contacting a satellite constellation.

Depending on a driving influence of the client (e.g., business, scientific, etc.), the satellite constellation access targets may vary. In some embodiments, the satellite constellation access targets may be metadata supporting the client's objectives. Scheduling subsystem 114, which may generate satellite constellation access programs for contacting satellite constellations for clients, may seek to get as close to each satellite constellation access target as possible while balancing all client needs.

In some embodiments, scheduling subsystem 114 may be configured to identify, select, and generate representations for satellite constellation access requests. For example, scheduling subsystem 114 may generate representations for satellite constellation access targets based on the satellite constellation access requests provided by the client. In some embodiments, the representations may express the client's preferences in a manner capable of being input into a computer-based scheduling system for generating candidate satellite constellation access programs and selecting a satellite constellation access program. The satellite constellation access requests may include various satellite constellation access targets, which may be tuned specifically to the needs of each client. In some embodiments, each representation may include configurable parameters that may be tuned based on the client's satellite constellation access targets. The representations, for instance, may be models described by the configurable parameters, which may be refined and modified based on feedback information. Different representations may be used to characterize different client satellite constellation access targets. A representation of a client goal, as referred to herein, may also be described, interchangeably, with a "utility function." A utility function corresponds to a mathematical representation, model, or description, of a client goal having a formulaic expression tuned based on the specifics of the client goal. Various different types of utility functions may be used including, but not limited to (which is not to imply that other lists are limiting), a logistic function, a Gaussian function, a truncated Gaussian function, a half-life function, or other functions.

In some embodiments, scheduling subsystem 114 may be configured to compute a score indicating how well a satellite constellation access program aligns with a client's satellite constellation access targets. The score that is computed may be referred to herein interchangeably as a quality score, quality of service (QoS) score, and/or a QoS value of a QoS metric. When a satellite constellation access program for a client produces a high quality score for a particular satellite constellation access target, this may indicate that the particular client satellite constellation access target was satisfied by the satellite constellation access program. For example, if a client's satellite constellation access target indicates a preference of 8 contacts with a satellite constellation per day, and the generated satellite constellation access program for the client has 8 contacts per day, then the quality score may be high (e.g., a score of 100% or 1.0) indicating a high level of satisfaction with the generated satellite constellation access program. If the satellite constellation access program for a client produces a low quality score for a particular satellite constellation access target, this may indicate that the particular satellite constellation access target was not satisfied. Using the previous example, if the generated satellite constellation access program for the client has 1 contact per day with the satellite constellation, then the computed quality score may be low (e.g., 10% or 0.1) indicating a low level of satisfaction with the generated satellite constellation access program.

In some embodiments, each of the satellite constellation access requests may be assigned a weight, $w_i$. The weights may be assigned by the client, scheduling subsystem 114, or both, and each satellite constellation access requirement and each satellite constellation access target may be assigned a weight. The weights may be normalized such that, when summed, they equal 1.0. A quality score for a client for a given satellite constellation access program may be computed based on the weights assigned to each satellite constellation access requirement and satellite constellation access target. Each satellite constellation access requirements may yield a quality score of 1.0 or 0.0, indicating complete satisfaction (e.g., 100% level of satisfaction) of a particular satellite constellation access target or complete non-satisfaction (e.g., 0% level of satisfaction) of the particular satellite constellation access target. If a satellite constellation access requirement receives a quality score of 0.0, then this indicates that a given satellite constellation access program is unacceptable to meet a client's requirements for satellite constellation access. Therefore, scheduling subsystem 114 may be configured to generate satellite constellation access programs where each client's satellite constellation access requirements produce a quality score of 1.0. Each satellite constellation access target may have a quality score within a range of 0.0 and 1.0. The closer to 1.0 the quality score is for a given satellite constellation access requirement, the greater the total quality score will be for a given satellite constellation access program.

In some embodiments, recent performance data including previous quality scores for a client may be retrieved from client score database 178 prior to computing system 102 generating satellite constellation access programs for satellite constellation access. For example, quality scores for a past N satellite constellation access programs (e.g., total quality score and/or individual quality scores for each requirement/target) may be retrieved from client score database 178. Some embodiments include scheduling subsystem 114 selecting an N most recent satellite constellation access programs for a client. Some embodiments include scheduling subsystem 114 selecting satellite constellation access programs generating for the client in a last N days.

In some embodiments, a client account with computing system 102 (e.g., a client of a satellite constellation scheduling system) may have a client score computed based on the client's previous quality scores. Each time a new satellite constellation access program is generated for the client, a client score for that client may be updated to reflect improvements or diminishments to the client score.

In some embodiments, previous quality scores for a client may be used as an input when determining candidate satellite constellation access programs for the client. For instance, if a client recently has received satellite constellation access programs that produced poor quality scores, lowering a value of the client score for that client, scheduling subsystem 114 may be configured to apply a boosting factor to increase the likelihood of the client's next satellite constellation access program yielding a high quality score, thus raising the client score. For example, if a client score for a particular client is low, then a boosting factor may be applied to the client's account such that the client receives preferential treatment when the scheduling subsystem 114 determines whether to allocate a time interval for satellite constellation access to the client or to a different client that has a higher client score.

Application of a boosting factor to a client's account when generating satellite constellation access programs may assist in resolving scheduling conflicts. For instance, if two clients submit satellite constellation access requests that indicate both seek to contact a satellite constellation during a same temporal interval, scheduling subsystem 114 can either partially satisfy the two users by giving each some of the desired temporal interval for accessing the satellite constellation, or scheduling subsystem 114 can allocate the temporal interval to one client and thus deny the temporal interval to the other client. In some cases, a partially satisfied satellite constellation access target is still acceptable for a client. For example, if a client has a satellite constellation access target for an average contact time with a satellite of a satellite network to be 30 minutes, but will accept anything greater than 10 minutes, then a satellite constellation access program allocating an average contact time of 15 minutes will partially satisfy the satellite constellation access target. However, continued or repeated allocation of satellite constellation access programs to a client having their satellite constellation access requests only partially met can lead to low user satisfaction with the satellite constellation scheduling system (e.g., computing system 102), and may cause clients to seek other services to obtain access to satellite constellations.

In some embodiments, a boosting factor may be introduced to balance out instances where a particular client continues to receive satellite constellation access programs producing low quality scores (as well as, or alternatively, high quality scores). The boosting factor may be a value between 0 and 1 indicating a degree with which a client deserves to have preferential treatment when scheduling satellite constellation access. When a client receives preferential treatment (i.e., the satellite constellation access target is satisfied), the client's corresponding boosting factor may be lowered, and vice versa in order to maintain balance. Some cases may include an oscillating pattern of the boosting factor raising and then decreasing over time in accordance with the client not receiving preferential treatment and receiving preferential treatment, respectively.

In some embodiments, the boosting factor, which may also be referred to herein interchangeably as a buoyancy score, may be computed for a client account or for a particular satellite. In the latter case, a particular satellite may receive a disproportionate amount of contacts when compared to other satellites, and the boosting factor may help ensure balanced load distribution amongst the other satellites.

In some embodiments, upon creation of a client account with computing system 102, the client account may be initialized with an initial value for a boosting factor. For example, the initial value of the boosting factor for a client may be any number before 0.0 and 1.0. In some cases, the initial value for the boosting factor may be 0.5. Some cases include the initial value for the boosting factor being 0.3 or 0.7. If a conflict is detected between two clients both attempting to access a same antenna system during a same temporal interval, scheduling subsystem 114 may determine the boosting factor for each client and apply the boosting factor to determine which client should be allocated the temporal interval. A given satellite ground station may have at least one antenna (e.g., satellite dish). One client may access the satellite ground station to communicate with a satellite using the antenna. In some embodiments, two or more clients may be able to communicate with two different satellites using a same antenna. In response to resolving a conflict between two clients, the boosting factor for each client may be updated.

In some embodiments, the boosting factor may serve as a global parameter for scheduling subsystem 114 when computing satellite constellation access programs. For example, a single parameter in the range of 0.0 to 1.0 may express a degree with which scheduling subsystem 114 may be influenced by the boosting factor. In some cases, a boosting factor of 0.0 indicates no effect whereas a boosting factor of 1.0 may indicate that the boosting factor is the only factor when making scheduling decisions.

In some embodiments, scheduling subsystem 114 may implement one or more different types of algorithmic solutions for generating and selecting satellite constellation access programs. The various algorithmic solutions, which may also be referred to herein interchangeably as "solvers," may be swapped out with one another depending on the particular configurations of system 100. For instance, some solvers may have increased accuracy but decreased speed, while other solvers may be fast but not as accurate. Example solvers that may be used include the Genetic Algorithm, a brute force approach, a custom solver, or other solvers. In some embodiments, algorithms that or the same or similar to Algorithms 1 and/or Algorithms 2, as described above, may be used as solvers for generating and selecting satellite constellation access programs.

Example Flowcharts

FIGS. 26A-C and 27 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 26A:
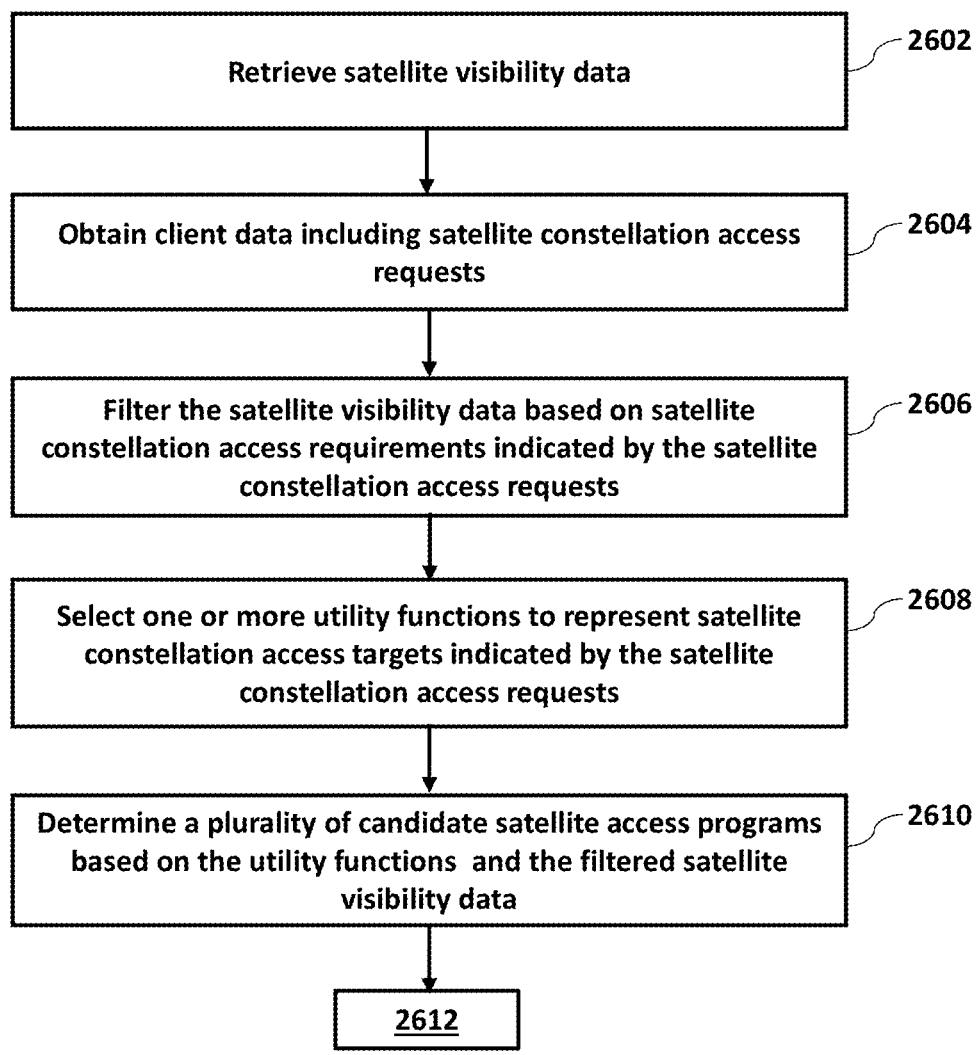
FIGS. 26A-26C are illustrative flowcharts of a process for generating satellite constellation access programs for communicating with a satellite constellation, in accordance with various embodiments.
Figure 26B:
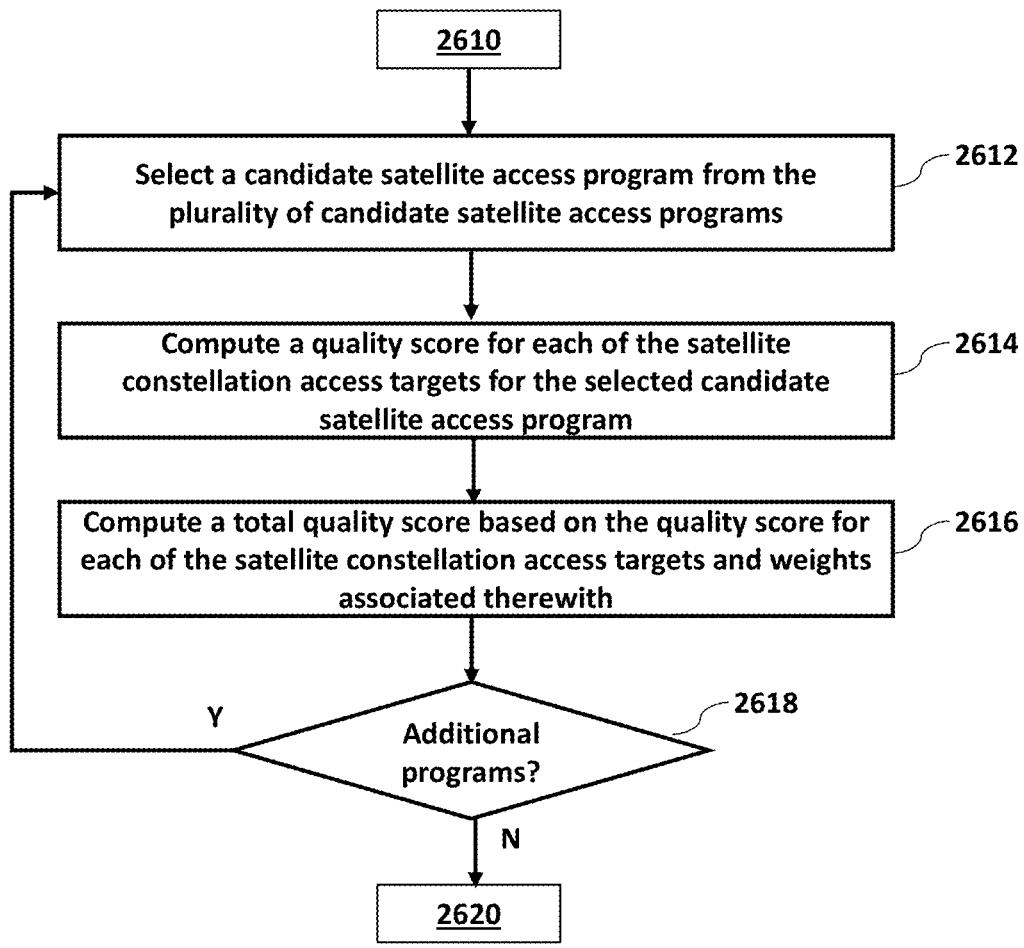
Figure 26C:
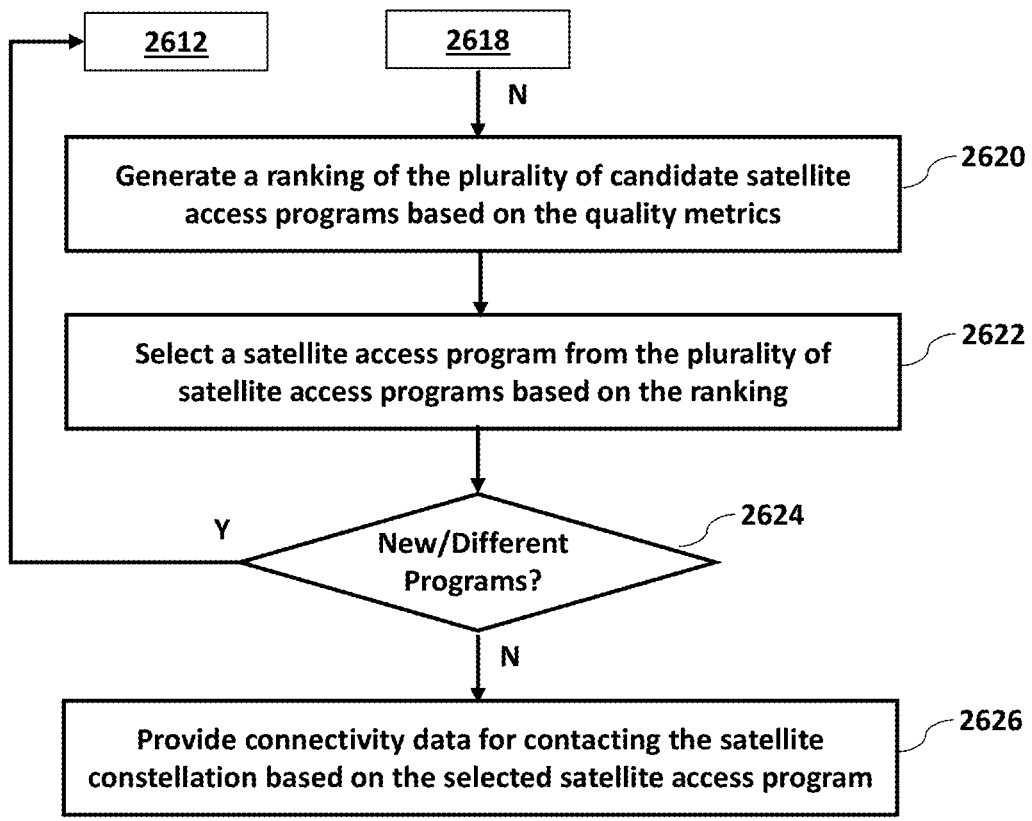

FIGS. 26A-C are illustrative flowcharts of a process 2600 for determining a satellite constellation access program for a client, in accordance with various embodiments. In some embodiments, process 2600 may begin at step 2602. At step 2602, satellite visibility data may be retrieved. Satellite visibility data may include information indicating when satellites of a satellite constellation will be visible by one or more satellite ground stations. A satellite that is "visible" by a satellite ground station refers to a satellite that is within a line of sight of at least one satellite dish (e.g., an antenna and receiver) at the satellite ground station with no objects (e.g., other spacecraft, geographical objects, etc.) impeding data signals from being transmitted to the satellite from the antenna and/or vice versa. In some embodiments, the satellite visibility data may be precomputed based on an orbital trajectory of a given satellite or satellites and a location (e.g., a longitude, latitude, elevation, etc.) of a satellite ground station. For example, based on the orbital trajectory of a satellite, the satellite visibility information may indicate that the satellite will pass within communication range of a satellite ground station between a first time and a second time on a given date such that data signals may be communicated to/from the satellite and the satellite ground station. In some embodiments, the satellite visibility data may be stored in satellite location database 174. The satellite visibility data may be updated periodically (e.g., daily, weekly, monthly, etc.), dynamically (e.g., in response to an event), and/or manually. In some embodiments, step 2602 may be performed by a subsystem that is the same or similar to scheduling subsystem 114.

At step 2604, client data including satellite constellation access requests of a client may be obtained. In some embodiments, the satellite constellation access requests may be provided to computing system 102 by client device 104. For example, the client may input the satellite constellation access requests via a user interface, via a message including plain text describing the satellite constellation access requests, via an audio message, and the like. The satellite constellation access requests may indicate requirements and targets of the client with respect to contacting satellites of the satellite constellation. In some embodiments, the satellite constellation access requests may include one or more satellite constellation access requirements and one or more satellite constellation access targets. Each satellite constellation access requirement indicates constraints of the client related to when the client can access to the satellite constellation, for how long the client can access the satellite constellation, how frequently the client can access the satellite constellation, or other requirements of the client. A satellite constellation access requirement that is not fulfilled may provide the client with an unusable or non-valuable access to the satellite constellation. For example, if the client only seeks to access the satellite constellation during the hours between 9:00 AM EST and 5:00 PM EST, providing the client access to the satellite constellation outside of those times would be meaningless. Each satellite constellation access target indicates preferences of the client related to accessing the satellite constellation. For example, the satellite constellation access targets may indicate a preferred number of contacts with the satellite constellation per day and a value that would be obtained by the client for contacts differing from the preferred number of contacts. In some embodiments, each of the satellite constellation access targets may include an associated weight that indicates a level of importance that particular target has for the client. For example, the client may prefer to have 3 contacts per day, each being approximately 2 hours in duration, but would rather have all 3 contacts and is less concerned about whether the duration of those contacts is 2 hours. Therefore, the client may assign a weight to each satellite constellation access target to reflect the importance of that target with respect to the client's overall mission. The weights may be initialized by the client, computing system 102, or both, and may be modified over time. In some embodiments, step 2604 may be performed by a subsystem or system that is the same or similar to scheduling subsystem 114.

At step 2606, the satellite visibility data may be filtered based on the satellite constellation access requirements indicated by the satellite constellation access requests. For example, based on the satellite constellation access requirements, certain visibilities that do not coincide with the needs of the client may be removed. Using the aforementioned example, a client that only seeks to access the satellite constellation during the hours between 9:00 AM EST to 5:00 PM EST may have visibilities removed that occur outside of those hours. In some embodiments, the satellite constellation access requirements may remove a large number of available temporal intervals for satellite constellation access. However, the remaining visibilities, represented by the filtered satellite visibility data, conform to the needs of the client and can provide value to the client's mission. In some embodiments, step 2606 may be performed by a subsystem or system that is the same or similar to scheduling subsystem 114.

At step 2608, one or more utility functions may be selected to represent the satellite constellation access targets of the client as specified by the satellite constellation access requests. In some embodiments, the utility functions may include parameters that are capable of being tuned to conform to the preferences of the client. The utility functions may include logistic functions, Gaussian functions, truncated Gaussian functions, half-life functions, or other functions. Each of the utility functions may include two (or more) parameters that are modified based on the satellite constellation access targets of the client. In some embodiments, a client may select the utility functions to represent the satellite constellation access targets. Alternatively or additionally, computing system 102 may select, or provide recommendations of, the utility functions to be used. For example, computing system 102 may provide an initial suggestion of a utility function to represent a particular target, and the client may accept the suggestion or may discard the suggestion and select a different utility function. Furthermore, depending on the utility function that is selected, the weight associated with the satellite constellation access target may be adjusted. In some embodiments, step 2608 may be performed by a subsystem or system that is the same or similar to scheduling subsystem 114.

At step 2610, a plurality of candidate satellite constellation access programs may be determined based on the utility functions that were selected and the filtered satellite visibility data. In some embodiments, the plurality of candidate satellite constellation access programs may be determined further based on the weights associated with each of the satellite constellation access targets. Each candidate satellite constellation access program may include temporal intervals (e.g., periods of time beginning at time t1 and ending at time t2) that may be allocated to the client to access a satellite ground station to contact satellites of a satellite constellation. The temporal intervals may be of a duration, frequency, separation, or other aspects to characterize the client's satellite constellation access targets. In some embodiments, temporal intervals, spacings, frequencies, etc., of contacts may be selected for each candidate satellite constellation access program to attempt to accommodate the satellite constellation access targets of the client given the weights assigned to each of the targets. In some embodiments, step 2610 may be performed by a subsystem or system that is the same or similar to scheduling subsystem 114.

After step 2610, process 2600 may proceed to step 2612, which is detailed in FIG. 26B. At step 2612, a candidate satellite constellation access program from the plurality of candidate satellite constellation access programs may be selected. Upon selection of the candidate satellite constellation access program, process 2600 may proceed to step 2614. In some embodiments, step 2612 may be performed by a subsystem or system that is the same or similar to scheduling subsystem 114.

At step 2614, a quality score may be computed for each of the satellite constellation access targets for the selected candidate satellite constellation access program. The quality score may indicate a level of compliance the selected candidate satellite constellation access program provides for a given satellite constellation access target. The level of compliance refers to how well the selected satellite constellation access program complies with the given satellite constellation access target. For example, if a given candidate satellite constellation access program provides an average amount of time between contacts of 6 hours, then the quality score for this satellite constellation access target is approximately 0.5. Depending on how many satellite constellation access targets a client provides with their client data, a corresponding number of quality scores may be computed for each candidate satellite constellation access program. In some embodiments, step 2614 may be performed by a subsystem or system that is the same or similar to scheduling subsystem 114.

At step 2616, a total quality score may be computed based on the quality score computed for each of the satellite constellation access targets and the weights associated therewith. In some embodiments, the quality metric may be computed based on a weighted combination of the quality score and weight associated with each of the satellite constellation access targets. As a result, the quality metric for the client for a given candidate satellite constellation access program may be obtained. In some embodiments, step 2616 may be performed by a subsystem or system that is the same or similar to scheduling subsystem 114.

At step 2618, a determination may be made as to whether additional satellite constellation access programs are to be analyzed (e.g., perform steps 2612-2616 again). If so, process 2600 may return to step 2612, where a new satellite constellation access program may be selected and steps 2614 and 2616 are performed for the new satellite constellation access program. This loop may repeat until some or all of the plurality of candidate satellite constellation access programs have been analyzed. In some embodiments, the number of iterations of steps 2612-2616 may be performed until a stopping criteria is met. For example, steps 2612-2616 may repeat until a threshold number of programs have been analyzed, or until a threshold amount of time has elapsed. If, however, at step 2618, it is determined that no additional programs are needed to be analyzed, process 2600 may proceed to step 2620.

At step 2620, a ranking of the plurality of candidate satellite constellation access programs may be generated based on the computed quality metrics. For instance, the plurality of candidate satellite constellation access programs may be ranked from lowest quality metric to highest quality metric. In some embodiments, step 2620 may be performed by a subsystem or system that is the same or similar to scheduling subsystem 114.

At step 2622, a satellite constellation access program may be selected from the plurality of satellite constellation access programs based on the ranking. For instance, a satellite constellation access program having a largest quality metric may be selected, indicating that that satellite constellation access program provides the most value to the client to meet the client's requests. In some embodiments, additional requests of additional clients may also be considered when determining which candidate satellite constellation access program to select. For example, if a given candidate satellite constellation access program provides high utility score for the client, but forces multiple other clients to have a low utility score (e.g., not achieving most of their satellite constellation access targets), then computing system 102 may reject the selected candidate satellite constellation access program and select a new/different satellite constellation access program. In some embodiments, step 2622 may be performed by a subsystem or system that is the same or similar to scheduling subsystem 114.

At step 2624, a determination may be made as to whether new or different satellite constellation access programs are needed. For example, a determination may be made as to whether the selected satellite constellation access program (e.g., selected at step 2622) causes the utility scores for other clients of system 100 to decrease below a threshold utility score. For example, while a selected satellite constellation access program for a client at step 2622 may produce a quality score of 0.9 for the client, other clients of system 100 may have satellite constellation access programs selected that produce quality scores less than 0.5. If the threshold quality score is 0.5, then this may indicate that new satellite constellation access programs may be needed. If, for example, it is determined that new or different satellite constellation access programs are needed, process 2600 may return to step 2612. However, if it is determined, at step 2624, that new satellite constellation access programs are needed, then process 2600 may proceed to step 2626.

At step 2626, connectivity data may be provided to a client device associated with the client for contacting the satellite constellation based on the selected satellite constellation access program. In some embodiments, the connectivity data may indicate temporal intervals during which the client is authorized to establish a secure connection to a satellite ground station in order to contact a satellite constellation based on the selected satellite constellation access program. In some embodiments, step 2624 may be performed by a subsystem or system that is the same or similar to scheduling subsystem 114.

In some embodiments, a boosting factor may be attributed to clients whose quality score is below a particular value after a particular satellite constellation access program has been selected. For example, if the satellite constellation access program selected for a client yields a quality score of 0.6, then this client may receive a boosting factor to increase the likelihood that a subsequent satellite constellation access program selected for the client produces a higher quality score (e.g., greater than 0.8, greater than 0.9, etc.).

Figure 27:
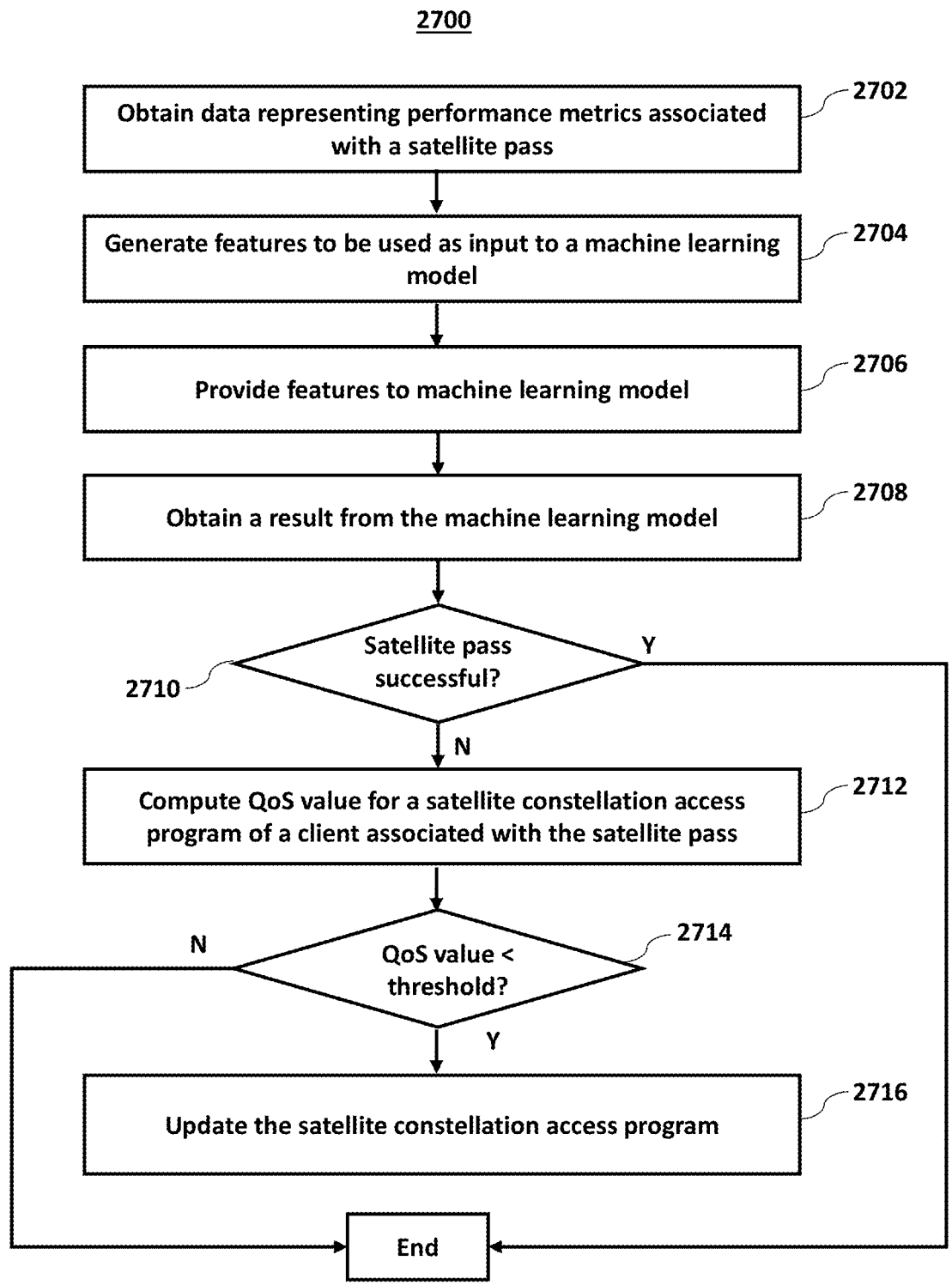
FIG. 27 is an illustrative flowchart of a process for predicting whether an error has or is likely to occur during a satellite pass, in accordance with various embodiments.

FIG. 27 is an illustrative flowchart of a process 2700 for determining whether a satellite pass was successful based on performance metric data and determining whether to update a satellite constellation access program, in accordance with various embodiments. In some embodiments, process 2700 may begin at operation 2702. In operation 2702, data representing one or more performance metrics associated with a satellite pass may be obtained. For example, a cumulative amount of bytes processed by a hardware device located at a satellite ground station during a satellite pass may be obtained. In some embodiments, operation 2702 may be performed by a system or subsystem that is the same or similar to analytics subsystem 110.

In operation 2704, features used as input to a machine learning model may be generated. For example, features may be generated that represent an amount of time that has elapsed from a start of a satellite pass until carrier lock with a corresponding satellite has been achieved. As another example, the number of times that carrier lock was lost (and/or regained) during a given satellite pass, the percentage of time spent in carrier lock with during a satellite pass, and/or other features may be generated. The generated features may be based on the performance metric data. For example, the performance metric data obtained may include data indicating whether a carrier lock signal transitions from a non-locked state (e.g., signal is 0.0) to a locked state (e.g., signal is 1.0), or vice versa. At a particular sampling frequency (e.g., every second, every 5 seconds, every 10 seconds, etc.) the carrier lock signal value may be measured and stored. In some embodiments, operation 2704 may be performed by a system or subsystem that is the same or similar to analytics subsystem 110.

In operation 2706, the generated features may be provided to the machine learning model. For example, features representing an amount of time between a start of a satellite pass and when carrier lock is achieved may be provided to machine learning model 710. In some cases, the machine learning model may be trained to determine whether a given satellite pass was successful. For example, a satellite pass may be classified as being successful if data signals transmitted from a satellite during the satellite pass are capable of being downlinked by a corresponding satellite ground station. In some embodiments, operation 2706 may be performed by a system or subsystem that is the same or similar to analytics subsystem 110.

In operation 2708, a result from the machine learning model may be obtained. The result may indicate whether the satellite pass was classified as a successful satellite pass. At operation 2710, it may be determined whether the satellite pass was successful. If, at operation 2710, it is determined that the satellite pass was successful, process 2700 may end. If, however, in operation 2710, it was determined that the satellite was not successful, process 2700 may proceed to operation 2712. In some embodiments, operations 2708-2710 may be performed by a system or subsystem that is the same or similar to analytics subsystem 110.

In operation 2712, a quality of service metric may be computed for a satellite constellation program of a client associated with the satellite pass. For example, a particular client may be capable of accessing a satellite ground station's communication device during a particular time window in order to downlink data from the satellite that is within communication range of the satellite ground station during the satellite pass. In some embodiments, the satellite constellation access program may specify the time window during which the client may access, via client device 104, the communication device (e.g., satellite modem) to downlink the data. The satellite constellation access program may be generated based on one or more satellite constellation access targets of the client. In some embodiments, the quality of service metric may be updated. For example, a client may have a quality of service score based on prior satellite accesses and, based on a current satellite pass, the quality of service score for the client may be updated. In some embodiments, operation 2712 may be performed by a system or subsystem that is the same or similar to scheduling subsystem 114.

In operation 2714, it may be determined as to whether the computed QoS value is less than a threshold QoS value. If, in operation 2714, it is determined that the QoS value is not less than the threshold QoS value, then process 2700 may end. If, however, in operation 2714, it is determined that the QoS value is less than the threshold QoS value, then process 2700 may proceed to operation 2716. In operation 2716, the satellite constellation program may be updated based on the computed QoS value for the QoS metric. In some embodiments, operations 2714-2716 may be performed by a system or subsystem that is the same or similar to scheduling subsystem 114.

Figure 28:
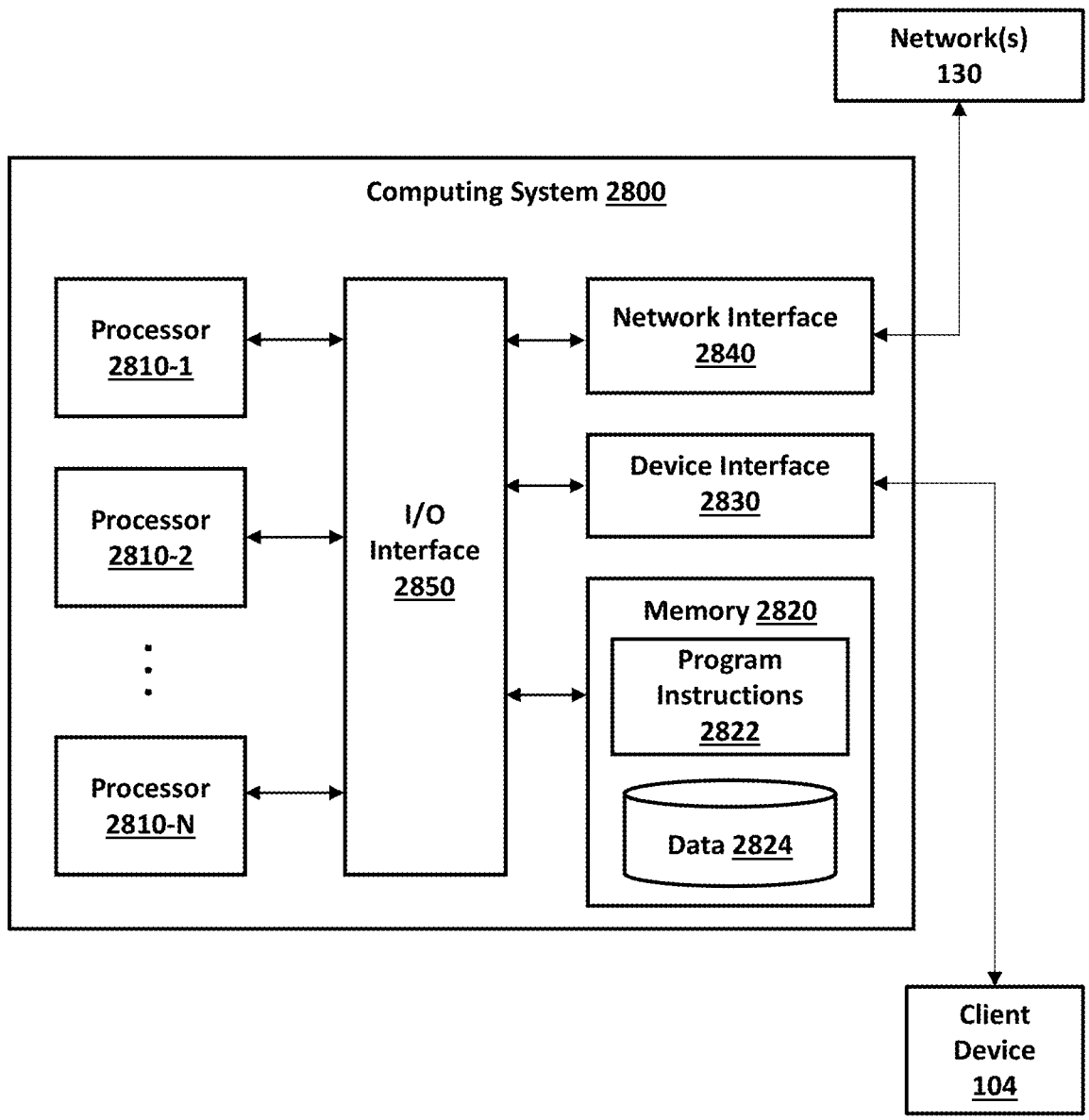
FIG. 28 is an illustrative diagram of an exemplary computing system upon which the present techniques may be implemented, in accordance with various embodiments.

FIG. 28 is an illustrative diagram of an exemplary computing device upon which the present techniques may be implemented, in accordance with various embodiments. In some cases, multiple instances of computing system 2800 may communicate via a network to implement the present techniques in a distributed fashion. In some cases, instances may include a mobile computing device (like a smartphone with a camera) that captures images upon which the present techniques operate. In some cases, the instances may include server-side instances (e.g., in a micro-services architecture or monolithic architecture) that execute training and analysis with trained models. Various portions of systems and methods described herein, may include or be executed on one or more computer systems similar to computing system 2800. Further, processes and modules described herein may be executed by one or more processing systems similar to that of computing system 2800. Still further, computing system 2800 may the same or similar to computing system 102 of FIG. 1 and the features described herein with respect to computing system 2800 may equally be implemented, in total or in part, by computing system 102.

Computing system 2800 may include one or more processors (e.g., processors 2810-1 to 2810-N) coupled to system memory 2820, an input/output I/O device interface 2830, and a network interface 2840 via an input/output (I/O) interface 2850. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 2800. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 2820). Computing system 2800 may be a uni-processor system including one processor (e.g., processor 2810-1), or a multi-processor system including any number of suitable processors (e.g., 2810-1 to 2810-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 2800 may include a plurality of computing devices (e.g., distributed computer systems) to implement various processing functions.

I/O device interface 2830 may provide an interface for connection of one or more I/O devices, such as client device 104 or satellite ground station 120 to computing system 2800. I/O devices may include devices that receive input (e.g., from a user) or output information (e.g., to a user). I/O devices, e.g., client device 104, may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices may be connected to computing system 2800 through a wired or wireless connection. I/O devices may be connected to computing system 2800 from a remote location. I/O devices located on remote computer system, for example, may be connected to computing system 2800 via a network and network interface 2840.

Network interface 2840 may include a network adapter that provides for connection of computing system 2800 to a network. Network interface 2840 may facilitate data exchange between computing system 2800 and other devices connected to the network. Network interface 2840 may support wired or wireless communication. The network may include an electronic communication network, such as the Internet, a local area network (LAN), a wide area network (WAN), a cellular communications network, or the like.

System memory 2820 may be configured to store program instructions 2822 or data 2824. Program instructions 2822 may be executable by a processor (e.g., one or more of processors 2810-1 to 2810-N) to implement one or more embodiments of the present techniques. Program instructions 2822 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a standalone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 2820 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 2820 may include a non-transitory computer readable storage medium that may have program instructions stored thereon that are executable by a computer processor (e.g., one or more of processors 2810-1 to 2810-N) to cause the subject matter and the functional operations described herein. A memory (e.g., system memory 2820) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 2850 may be configured to coordinate I/O traffic between processors 2810-1 to 2810-N, system memory 2820, network interface 2840, I/O devices (e.g., client device 104), and/or other peripheral devices. I/O interface 2850 may perform protocol, timing, or other data transformations to convert data signals from one component (e.g., system memory 2820) into a format suitable for use by another component (e.g., processors 2810-1 to 2810-N). I/O interface 2850 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 2800 or multiple computer systems 2800 configured to host different portions or instances of embodiments. Multiple computer systems 2800 may provide for parallel or sequential processing/execution of one or more portions of the techniques described herein.

Those skilled in the art will appreciate that computing system 2800 is merely illustrative and is not intended to limit the scope of the techniques described herein. Computing system 2800 may include any combination of devices or software that may perform or otherwise provide for the performance of the techniques described herein. For example, computing system 2800 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 2800 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 2800 may be transmitted to computing system 2800 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the conversation management techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The present techniques will be better understood with reference to the following enumerated embodiments:

A1. A method, comprising: obtaining, for each of a plurality of satellite passes, power consumption data representing an amount of power consumed by a digitizer during a respective satellite pass, wherein: the digitizer is located at a satellite ground station that is configured to receive data from a satellite during each respective satellite pass, the power consumption data comprises time series data indicating a cumulative amount of power consumed by the digitizer at each of a plurality of times during the respective satellite pass, and the plurality of satellite passes occur of over a first time period; computing, for each of the plurality of satellite passes, a mean power consumption value representing the amount of power consumed by the digitizer during the respective satellite pass; generating time series data comprising at least (i) a timestamp of a time that the respective satellite pass began and (ii) the mean power consumption value computed for the respective satellite pass; determining, using a changepoint detection model, a quantity of changepoints detected within the time series data and times associated with each of the detected changepoints; providing at least one of the quantity of changepoints or the times associated with each of the detected changepoints to a machine learning model configured to determine whether the digitizer experienced at least one of a power failure event or a power disruption event; obtaining, from the machine learning model, based on the at least one of the quantity of changepoints or the times associated with each of the detected changepoints, an indication that the digitizer experienced at least one of the power failure or the power disruption event; retrieving, from a client database, a quality of service (QoS) score of a client indicating how well satellite constellation access programs previously provided to the client complied with one or more satellite constellation access targets specified by the client; updating, based on the indication obtained from the machine learning model, the QoS score to obtain an updated QoS score for the client; and generating, using a scheduling system, based on the updated QoS score for the client, a satellite constellation access program for the client, wherein the satellite constellation access program indicates a time interval that the client is authorized to access the satellite ground station to receive data from the satellite during a subsequent satellite pass.

A2. The method of embodiment A1, further comprising: generating training data comprising power consumption data of the digitizer during a plurality of previous satellite passes of the satellite with respect to the satellite ground station, wherein for each of the previous satellite passes, the respective power consumption data indicating an amount of power consumed by the digitizer during a duration of the respective satellite pass; training an instance of a machine learning model to obtain the machine learning model; and storing the machine learning model in a model database.

A3. The method of any one of embodiments A1-A2, wherein the digitizer is configured to transform data signals received from a satellite into a digital format for processing by the computing system.

A4. The method of any one of embodiments A1-A3, wherein the changepoint detection model is trained to detect changepoints in the power consumption data during each of the plurality of satellite passes, wherein a changepoint being detected comprises an amount of power consumed by the digitizer at a given time during a satellite pass differing from an amount of power expected to be consumed by the digitizer at the given time by a threshold amount.

A5. The method of any one of embodiments A1-A4, further comprising: computing, based on the power consumption data for each satellite pass of the plurality of satellite passes, one or more performance metrics describing a respective satellite pass, wherein the one or more performance metrics are provided to the machine learning model, and wherein the indication that the digitizer experienced at least one of the power failure or the power disruption event is determined by the machine learning model based on the one or more performance metrics and the at least one of the quantity of changepoints or the times associated with each of the detected changepoints.

A6. The method of embodiment A5, wherein the one or more performance metrics comprise an amount of time that has elapsed from a start of a respective satellite pass of the plurality of satellite passes until a lock state is achieved, the method further comprises: obtaining real-time data comprising the amount of time that has elapsed from the start of the respective satellite pass until the lock state is achieved, wherein the machine learning model is further configured to determine that the respective satellite pass was a failed satellite pass or a successful satellite pass based on the respective amount of time that has elapsed and the at least one of the quantity of changepoints or the times associated with each of the detected changepoints, wherein a failed satellite pass comprises less than a threshold amount of data being downlinked during the respective satellite pass and a successful satellite pass comprises the threshold amount of data or more being downlinked during the respective satellite pass; obtaining, from the machine learning model, a notification that each of the plurality of satellite passes is a successful satellite pass or a failed satellite pass; and adjusting the updated QoS score for the client based on the notification.

A7. The method of claim A6, wherein the lock state comprises at least one of a carrier lock, Viterbi lock, or symbol lock.

A8. The method of any one of embodiments A5-A7, wherein the one or more performance metrics comprise an amount of bytes processed by a communications device located at the satellite ground station during each of the plurality of satellite passes, the method further comprises: obtaining real-time data from the communications device, the real-time data comprising an amount of bytes that has been cumulatively processed by the communication device during each respective satellite pass; generating, for each satellite pass of the plurality of satellite passes, tuples comprising (i) a timestamp representing a time that a measurement of the amount of bytes processed by the communication device was performed during the respective satellite pass and (ii) the cumulative amount of bytes processed by the communications device since the beginning of the respective satellite pass to the time associated with a given timestamp, wherein the machine learning model is further configured to determine that the respective satellite pass was a failed satellite pass or a successful satellite pass based on the respective tuple and the at least one of the quantity of changepoints or the times associated with each of the detected changepoints.

A9. The method of embodiment A8, further comprising: adjusting the updated QoS score for the client based on the machine learning model determining that the respective satellite pass was a failed satellite pass or a successful satellite pass.

A10. The method of any one of embodiments A1-A9, further comprising: determining whether the updated QoS score satisfies a threshold condition, wherein the threshold condition being satisfied comprises the updated QoS score being less than a threshold QoS score; determining that the updated QoS score satisfies the threshold condition; adjusting the updated QoS score based on the updated QoS score being determined to satisfy the threshold condition to obtain an adjusted QoS score; providing the adjusted QoS score to scheduling system to generate an updated satellite constellation access program for the client.

B1. A method, comprising: obtain data representing one or more performance metrics associated with a satellite pass for a satellite ground station; generating or extracting, based on the data representing the performance metrics, one or more sets of features to be used as input to a machine learning model trained to determine whether the satellite pass was successful; providing, as input, at least one of the one or more sets of features to the machine learning model to obtain a result indicating whether satellite pass for the satellite ground station was successful; and generating or updating a quality of service score associated with a client based on a satellite constellation access program generated for the client and one or more satellite constellation access targets of the client, wherein the client is authorized to access the satellite ground station to downlink the real-time data during the satellite pass, wherein the quality of service metric indicates a level of compliance of the satellite constellation access program with respect to the one or more satellite constellation access targets.

B2. The method of embodiment B1, further comprising: determining that the computed quality of service value satisfies a threshold condition, wherein the threshold condition is satisfied for the computed quality of service value for the quality of service metric being is less than a threshold quality of service value; and updating the satellite constellation access program to obtain an updated satellite constellation access program.

C1. A method, comprising: obtaining first data representing a performance of a hardware device during a satellite pass, wherein the hardware device is configured to receive the first data from a satellite during the satellite pass; computing one or more performance metrics for the satellite pass based on the first data; generating second data based on the one or more performance metrics; determining, using a first machine learning model, based on the second data, a quantity of changepoints detected within the second data and times associated with each of the detected changepoints; determining, using a second machine learning model, based on at least one of the quantity of changepoints or the times associated with each of the detected changepoints, a likelihood that the satellite pass will be a successful satellite; updating a quality of service (QoS) score of a client based on the determined likelihood to obtain an updated QoS score of the client, wherein the QoS score of the client indicates a level of compliance associated with satellite constellation access programs provided to the client with respect to one or more satellite constellation access targets specified by the client, and wherein the updated QoS score is used to generate a satellite constellation access program for the client indicating a time interval that the client is authorized to access the satellite ground station to receive data from the satellite during a subsequent satellite pass.

C2. The method of embodiment C1, wherein the first data comprises power consumption data representing an amount of power consumed by the hardware device during the satellite pass, the one or more performance metrics comprise a mean power consumption value, and the second data comprises time series data indicating a mean power consumption of the hardware device at each of the times.

C3. The method of any one of embodiments C1-C2, wherein the first machine learning model is configured to detect the changepoints within the second data and determine the quantity of changepoints based on historical power consumption data associated with the satellite, wherein detection of a changepoint via the first machine learning model comprises the first machine learning model: measuring, at a first time and a second time during the satellite pass, a first amount of power and a second amount of power respectively consumed by the hardware device; determining, based on the first time and the second time, a first predicted amount of power and a second predicted amount of power that the hardware device is expected to consume based on the historical power consumption data associated with the satellite; computing a power change between the first amount of power and the second amount of power; determining a difference between the computed power change and an expected power change based on the first predicted amount of power and the second predicted amount of power; and determining that the difference is greater than a threshold difference, wherein a changepoint is classified as having occurred from the first time to the second time based on the difference being greater than the threshold difference.

C4. The method of any one of embodiments C1-C3, further comprising: determining that the updated QoS score of the client satisfies a threshold condition, wherein the threshold condition being satisfied comprises the updated QoS score of the client being less than a threshold QoS score; and generating, based on the updated QoS score for the client, a new satellite constellation access program for the client indicating a time interval whereby the client is authorized to access the satellite ground station to receive data from the satellite during a subsequent satellite pass.

C5. The method of any one of embodiments C1-C4, wherein the first data comprises real-time data indicating an amount of time that has elapsed from a start of the satellite pass and whether a lock state was achieved by a given time, wherein the second machine learning model is further configured to determine the likelihood that the satellite pass will be a successful satellite pass based on the amount of time that has elapsed from the start of the satellite pass, an indication that the lock state was achieved or not achieved, and an amount of time predicted to elapse from a start of a given satellite pass until the lock state is achieved determined based on historical data of the satellite from prior satellite passes.

C6. The method of any one of embodiments C1-05, wherein the hardware device comprises a communications device configured to facilitate data downlinks from the satellite during the satellite pass, the one or more performance metrics comprise an amount of data processed by the communications device during the satellite pass, and wherein the second machine learning model is further configured to determine the likelihood that the satellite pass will be a successful satellite pass based on the amount of data processed by the communications device at a given time during the satellite pass and an amount of data predicted to be processed by the communications device from a start of a given satellite pass until the given time based on historical data of the satellite from prior satellite passes.

C7. The method of any one of embodiments C1-C6, wherein the hardware device is located at a satellite ground station, and the satellite pass comprises the satellite being within communication range of the satellite ground station, and the satellite constellation access program indicates a time interval during which the client is authorized to access the satellite ground station to obtain the first data transmitted from the satellite.

C8. The method of any one of embodiments C1-C7, wherein the second machine learning model is further configured to classify the satellite pass as being a first type of satellite pass or a second type of satellite pass based on the likelihood that the satellite pass will be a successful satellite pass.

D1. A method, comprising: obtaining first data representing a performance of a hardware device during a satellite pass; determining, using a machine learning model, based on the first data, a likelihood that the satellite pass will be a successful satellite pass; computing a quality of service (QoS) score of a client based on the determined likelihood, wherein the QoS score of the client indicates a level of compliance associated with satellite constellation access programs provided to the client with respect to one or more satellite constellation access targets specified by the client.

D2. The method of embodiment D1, wherein the QoS score is computed based on a previous QoS score of the client, the method further comprises: generating a satellite constellation access program for the client indicating a time interval that the client is authorized to access the satellite ground station to receive data from the satellite during a subsequent satellite pass.

D3. The method of any one of embodiments D1-D2, wherein the hardware device is configured to receive the first data from a satellite during the satellite pass E1. A system, comprising: a computing system comprising one or more processors configured to execute computer program instructions to cause the one or more processors to effectuate the method of any one of embodiments A1-A10, B1-B2, C1-C8, or D1-D3.

E2. One or more non-transitory computer-readable media storing computer program instructions that, when executed by one or more processors, effectuate operations comprising the method of any one of embodiments A1-A10, B1-B2, C1-C8, or D1-D3.

The invention claimed is:

1. A system for proactively detecting equipment failures at satellite ground stations, the system comprising:
 a computing system comprising one or more processors configured to execute computer program instructions stored in memory to cause the one or more processors to:
  obtain, for each of a plurality of satellite passes, power consumption data representing an amount of power consumed by a digitizer during a respective satellite pass, wherein:
   the digitizer is located at a satellite ground station that is configured to receive data from a satellite during each respective satellite pass,
   the power consumption data comprises time series data indicating a cumulative amount of power consumed by the digitizer at each of a plurality of times during the respective satellite pass, and
   the plurality of satellite passes occur of over a first time period;
  compute, for each of the plurality of satellite passes, a mean power consumption value representing the amount of power consumed by the digitizer during the respective satellite pass;
  generate time series data comprising at least (i) a timestamp of a time that the respective satellite pass began and (ii) the mean power consumption value computed for the respective satellite pass;
  determine, using a changepoint detection model, a quantity of changepoints detected within the time series data and times associated with each of the detected changepoints;
  provide at least one of the quantity of changepoints or the times associated with each of the detected changepoints to a machine learning model configured to determine whether the digitizer experienced at least one of a power failure event or a power disruption event;
  obtain, from the machine learning model, based on the at least one of the quantity of changepoints or the times associated with each of the detected changepoints, an indication that the digitizer experienced at least one of the power failure event or the power disruption event;
  retrieve, from a client database, a quality of service (QoS) score of a client indicating how well satellite constellation access programs previously provided to the client complied with one or more satellite constellation access targets specified by the client;
  update, based on the indication obtained from the machine learning model, the QoS score to obtain an updated QoS score for the client; and
  generate, using a scheduling system, based on the updated QoS score for the client, a satellite constellation access program for the client, wherein the satellite constellation access program indicates a time interval that the client is authorized to access the satellite ground station to receive data from the satellite during a subsequent satellite pass.

2. The system of claim 1, wherein one or more processors are further caused to:
 generate training data comprising power consumption data of the digitizer during a plurality of previous satellite passes of the satellite with respect to the satellite ground station, wherein for each previous satellite pass, the respective power consumption data indicating an amount of power consumed by the digitizer during a duration of the respective satellite pass;
 train an instance of a machine learning model to obtain the machine learning model; and
 store the machine learning model in a model database.

3. The system of claim 1, wherein the digitizer is configured to transform data signals received from a satellite into a digital format for processing by the computing system.

4. The system of claim 1, wherein the changepoint detection model is trained to detect changepoints in the power consumption data during each of the plurality of satellite passes, wherein a changepoint being detected comprises an amount of power consumed by the digitizer at a given time during a satellite pass differing from an amount of power expected to be consumed by the digitizer at the given time by a threshold amount.

5. The system of claim 1, wherein the one or more processors are further caused to:
 compute, based on the power consumption data for each satellite pass of the plurality of satellite passes, one or more performance metrics describing a respective satellite pass, wherein the one or more performance metrics are provided to the machine learning model, and wherein the indication that the digitizer experienced at least one of the power failure event or the power disruption event is determined by the machine learning model based on the one or more performance metrics and the at least one of the quantity of changepoints or the times associated with each of the detected changepoints.

6. The system of claim 5, wherein the one or more performance metrics comprise an amount of time that has elapsed from a start of a respective satellite pass of the plurality of satellite passes until a lock state is achieved, the one or more processors are further caused to:

obtain real-time data comprising the amount of time that has elapsed from the start of the respective satellite pass until the lock state is achieved, wherein the machine learning model is further configured to determine that the respective satellite pass was a failed satellite pass or a successful satellite pass based on the respective amount of time that has elapsed and the at least one of the quantity of changepoints or the times associated with each of the detected changepoints, wherein a failed satellite pass comprises less than a threshold amount of data being downlinked during the respective satellite pass and a successful satellite pass comprises the threshold amount of data or more being downlinked during the respective satellite pass; and obtain, from the machine learning model, a notification that each of the plurality of satellite passes is a successful satellite pass or a failed satellite pass; and adjust the updated QoS score for the client based on the notification.

7. The system of claim 6, wherein the lock state comprises at least one of a carrier lock, Viterbi lock, or symbol lock.

8. The system of claim 5, wherein the one or more performance metrics comprise an amount of bytes processed by a communications device located at the satellite ground station during each of the plurality of satellite passes, the one or more processors are further caused to:

obtain real-time data from the communications device, the real-time data comprising an amount of bytes that has been cumulatively processed by the communications device during each respective satellite pass;

generate, for each satellite pass of the plurality of satellite passes, tuples comprising (i) a timestamp representing a time that a measurement of the amount of bytes processed by the communications device was performed during the respective satellite pass and (ii) the cumulative amount of bytes processed by the communications device since a beginning of the respective satellite pass to the time associated with a given timestamp, wherein the machine learning model is further configured to determine that the respective satellite pass was a failed satellite pass or a successful satellite pass based on the respective tuple and the at least one of the quantity of changepoints or the times associated with each of the detected changepoints.

9. The system of claim 8, wherein the one or more processors are further caused to:

adjust the updated QoS score for the client based on the machine learning model determining that the respective satellite pass was a failed satellite pass or a successful satellite pass.

10. The system of claim 1, wherein the one or more processors are further caused to:

determine whether the updated QoS score satisfies a threshold condition, wherein the threshold condition being satisfied comprises the updated QoS score being less than a threshold QoS score;

determine that the updated QoS score satisfies the threshold condition; and adjust the updated QoS score based on the updated QoS score being determined to satisfy the threshold condition to obtain an adjusted QoS score;

provide the adjusted QoS score to scheduling system to generate an updated satellite constellation access program for the client.

11. A method for proactively detecting equipment failures at satellite ground stations, the method comprising:

obtaining, for each of a plurality of satellite passes, power consumption data representing an amount of power consumed by a digitizer during a respective satellite pass, wherein:
the digitizer is located at a satellite ground station that is configured to receive data from a satellite during each respective satellite pass,
the power consumption data comprises time series data indicating a cumulative amount of power consumed by the digitizer at each of a plurality of times during the respective satellite pass, and
the plurality of satellite passes occur of over a first time period;

computing, for each of the plurality of satellite passes, a mean power consumption value representing the amount of power consumed by the digitizer during the respective satellite pass;

generating time series data comprising at least (i) a timestamp of a time that the respective satellite pass began and (ii) the mean power consumption value computed for the respective satellite pass;

determining, using a changepoint detection model, a quantity of changepoints detected within the time series data and times associated with each of the detected changepoints;

providing at least one of the quantity of changepoints or the times associated with each of the detected changepoints to a machine learning model configured to determine whether the digitizer experienced at least one of a power failure event or a power disruption event;

obtaining, from the machine learning model, based on the at least one of the quantity of changepoints or the times associated with each of the detected changepoints, an indication that the digitizer experienced at least one of the power failure event or the power disruption event;

retrieving, from a client database, a quality of service (QoS) score of a client indicating how well satellite constellation access programs previously provided to the client complied with one or more satellite constellation access targets specified by the client;

updating, based on the indication obtained from the machine learning model, the QoS score to obtain an updated QoS score for the client; and generating, using a scheduling system, based on the updated QoS score for the client, a satellite constellation access program for the client, wherein the satellite constellation access program indicates a time interval that the client is authorized to access the satellite ground station to receive data from the satellite during a subsequent satellite pass.

12. The method of claim 11, further comprising:

generating training data comprising power consumption data of the digitizer during a plurality of previous satellite passes of the satellite with respect to the satellite ground station, wherein for each previous satellite pass, the respective power consumption data indicating an amount of power consumed by the digitizer during a duration of the respective satellite pass;

training an instance of a machine learning model to obtain the machine learning model; and storing the machine learning model in a model database.

13. The method of claim 11, further comprising:

computing, based on the power consumption data for each satellite pass of the plurality of satellite passes, one or more performance metrics describing a respective satellite pass, wherein the one or more performance metrics are provided to the machine learning model, and wherein the indication that the digitizer experienced at least one of the power failure event or the power disruption event is determined by the machine learning model based on the one or more performance metrics and the at least one of the quantity of changepoints or the times associated with each of the detected changepoints.

14. The method of claim 13, wherein the one or more performance metrics comprise an amount of time that has elapsed from a start of a respective satellite pass of the plurality of satellite passes until a lock state is achieved, wherein the method further comprises:
obtaining real-time data comprising the amount of time that has elapsed from the start of the respective satellite pass until the lock state is achieved, wherein the machine learning model is further configured to determine that the respective satellite pass was a failed satellite pass or a successful satellite pass based on the respective amount of time that has elapsed and the at least one of the quantity of changepoints or the times associated with each of the detected changepoints, wherein a failed satellite pass comprises less than a threshold amount of data being downlinked during the respective satellite pass and a successful satellite pass comprises the threshold amount of data or more being downlinked during the respective satellite pass; and
obtaining, from the machine learning model, a notification that each of the plurality of satellite passes is a successful satellite pass or a failed satellite pass; and
adjusting the updated QoS score for the client based on the notification.

15. The method of claim 13, wherein the one or more performance metrics comprise an amount of bytes processed by a communications device located at the satellite ground station during each of the plurality of satellite passes, wherein the method further comprises:
obtaining real-time data from the communications device, the real-time data comprising an amount of bytes that has been cumulatively processed by the communications device during each respective satellite pass; and
generating, for each satellite pass of the plurality of satellite passes, tuples comprising (i) a timestamp representing a time that a measurement of the amount of bytes processed by the communications device was performed during the respective satellite pass and (ii) the cumulative amount of bytes processed by the communications device since a beginning of the respective satellite pass to the time associated with a given timestamp, wherein the machine learning model is further configured to determine that the respective satellite pass was a failed satellite pass or a successful satellite pass based on the respective tuple and the at least one of the quantity of changepoints or the times associated with each of the detected changepoints.

16. The method of claim 11, further comprising:
determining whether the updated QoS score satisfies a threshold condition, wherein the threshold condition being satisfied comprises the updated QoS score being less than a threshold QoS score;
determining that the updated QoS score satisfies the threshold condition; and
adjusting the updated QoS score based on the updated QoS score being determined to satisfy the threshold condition to obtain an adjusted QoS score; and
providing the adjusted QoS score to scheduling system to generate an updated satellite constellation access program for the client.

17. A non-transitory computer readable storage medium storing instructions for proactively detecting equipment failures at satellite ground stations that, when executed by one or more processors, cause the one or more processors to:
obtain, for each of a plurality of satellite passes, power consumption data representing an amount of power consumed by a digitizer during a respective satellite pass, wherein:
the digitizer is located at a satellite ground station that is configured to receive data from a satellite during each respective satellite pass,
the power consumption data comprises time series data indicating a cumulative amount of power consumed by the digitizer at each of a plurality of times during the respective satellite pass, and
the plurality of satellite passes occur of over a first time period;
compute, for each of the plurality of satellite passes, a mean power consumption value representing the amount of power consumed by the digitizer during the respective satellite pass;
generate time series data comprising at least (i) a timestamp of a time that the respective satellite pass began and (ii) the mean power consumption value computed for the respective satellite pass;
determine, using a changepoint detection model, a quantity of changepoints detected within the time series data and times associated with each of the detected changepoints;
provide at least one of the quantity of changepoints or the times associated with each of the detected changepoints to a machine learning model configured to determine whether the digitizer experienced at least one of a power failure event or a power disruption event;
obtain, from the machine learning model, based on the at least one of the quantity of changepoints or the times associated with each of the detected changepoints, an indication that the digitizer experienced at least one of the power failure event or the power disruption event;
retrieve, from a client database, a quality of service (QoS) score of a client indicating how well satellite constellation access programs previously provided to the client complied with one or more satellite constellation access targets specified by the client;
update, based on the indication obtained from the machine learning model, the QoS score to obtain an updated QoS score for the client; and
generate, using a scheduling system, based on the updated QoS score for the client, a satellite constellation access program for the client, wherein the satellite constellation access program indicates a time interval that the client is authorized to access the satellite ground station to receive data from the satellite during a subsequent satellite pass.

18. The non-transitory computer readable storage medium of claim 17, wherein the instructions cause the one or more processors to:
compute, based on the power consumption data for each satellite pass of the plurality of satellite passes, one or more performance metrics describing a respective satellite pass, wherein the one or more performance metrics are provided to the machine learning model, and wherein the indication that the digitizer experienced at least one of the power failure event or the power disruption event is determined by the machine learning model based on the one or more performance metrics and the at least one of the quantity of changepoints or the times associated with each of the detected changepoints.

19. The non-transitory computer readable storage medium of claim 18, wherein the one or more performance metrics comprise an amount of bytes processed by a communications device located at the satellite ground station during each of the plurality of satellite passes, wherein the instructions cause the one or more processors to:
   obtain real-time data from the communications device, the real-time data comprising an amount of bytes that has been cumulatively processed by the communications device during each respective satellite pass; and
   generate, for each satellite pass of the plurality of satellite passes, tuples comprising (i) a timestamp representing a time that a measurement of the amount of bytes processed by the communications device was performed during the respective satellite pass and (ii) the cumulative amount of bytes processed by the communications device since a beginning of the respective satellite pass to the time associated with a given timestamp, wherein the machine learning model is further configured to determine that the respective satellite pass was a failed satellite pass or a successful satellite pass based on the respective tuple and the at least one of the quantity of changepoints or the times associated with each of the detected changepoints.

20. The non-transitory computer readable storage medium of claim 17, wherein the instructions cause the one or more processors to:
   determine whether the updated QoS score satisfies a threshold condition, wherein the threshold condition being satisfied comprises the updated QoS score being less than a threshold QoS score;
   determine that the updated QoS score satisfies the threshold condition; and
   adjust the updated QoS score based on the updated QoS score being determined to satisfy the threshold condition to obtain an adjusted QoS score; and
   provide the adjusted QoS score to scheduling system to generate an updated satellite constellation access program for the client.

\* \* \* \* \*